(12) United States Patent
Nakayama

(10) Patent No.: US 12,341,644 B2
(45) Date of Patent: *Jun. 24, 2025

(54) BASE STATION, TERMINAL APPARATUS, COMMUNICATION METHOD AND RECORDING MEDIUM

(71) Applicant: Sony Mobile Communications Inc., Tokyo (JP)

(72) Inventor: Takashi Nakayama, Chiba (JP)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/674,395

(22) Filed: May 24, 2024

(65) Prior Publication Data

US 2024/0314015 A1 Sep. 19, 2024

Related U.S. Application Data

(63) Continuation of application No. 18/301,993, filed on Apr. 18, 2023, now Pat. No. 12,034,583, which is a (Continued)

(30) Foreign Application Priority Data

Jul. 6, 2016 (JP) .................................. 2016-134132
Sep. 5, 2016 (JP) .................................. 2016-172511

(51) Int. Cl.
*H04L 27/26* (2006.01)
*H04B 7/0413* (2017.01)
(Continued)

(52) U.S. Cl.
CPC ....... *H04L 27/2657* (2013.01); *H04B 7/0413* (2013.01); *H04B 7/0617* (2013.01);
(Continued)

(58) Field of Classification Search
CPC ............ H04L 27/2657; H04L 27/2691; H04B 7/0413; H04B 7/0617; H04B 7/10;
(Continued)

(56) References Cited

U.S. PATENT DOCUMENTS

| 10,056,958 B2 | 8/2018 | Rajagopal et al. |
| 2005/0176468 A1 | 8/2005 | Iacono et al. |

(Continued)

FOREIGN PATENT DOCUMENTS

| CN | 1390398 A | 1/2003 |
| CN | 101341771 A | 1/2009 |

(Continued)

OTHER PUBLICATIONS

Naurakami, T. et al., "Multiuser MIMO with implicit channel feedback in massive antenna systems," IEICE Communications Express, 2013, vol. 2, No. 8, pp. 336-342.

(Continued)

*Primary Examiner* — Faisal Choudhury
(74) *Attorney, Agent, or Firm* — XSENSUS LLP

(57) ABSTRACT

A method and device for selecting a beam used in communication in an environment in which massive-MIMO beamforming is performed, to include a base station including: a communication unit configured to form multiple beams and perform communication with a terminal apparatus; and a control unit configured to transmit, to the terminal apparatus, first identification information of a group that is used in communication with the terminal apparatus among the first identification information allocated to groups each of which includes multiple beams to be formed.

8 Claims, 36 Drawing Sheets

Related U.S. Application Data continuation of application No. 17/530,462, filed on Nov. 19, 2021, now Pat. No. 11,671,302, which is a continuation of application No. 16/313,646, filed as application No. PCT/JP2017/013802 on Mar. 31, 2017, now Pat. No. 11,212,153.

(51) Int. Cl.

| | | |
|---|---|---|
| *H04B 7/06* | (2006.01) | |
| *H04B 7/10* | (2017.01) | |
| *H04W 16/28* | (2009.01) | |
| *H04W 36/08* | (2009.01) | |
| *H04W 56/00* | (2009.01) | |
| *H04W 72/044* | (2023.01) | |
| *H04W 72/0446* | (2023.01) | |
| *H04W 88/08* | (2009.01) | |
| *H04J 13/00* | (2011.01) | |

(52) U.S. Cl.
CPC ............ *H04B 7/10* (2013.01); *H04L 27/2691* (2013.01); *H04W 16/28* (2013.01); *H04W 36/085* (2023.05); *H04W 56/001* (2013.01); *H04W 72/0446* (2013.01); *H04W 72/046* (2013.01); *H04W 88/08* (2013.01); *H04W 88/085* (2013.01); *H04J 13/0062* (2013.01); *H04W 36/08* (2013.01)

(58) Field of Classification Search
CPC ............ H04W 56/001; H04W 16/28; H04W 72/0446; H04W 72/046; H04W 88/08; H04W 88/085
USPC ............................................................ 370/329
See application file for complete search history.

(56) References Cited

U.S. PATENT DOCUMENTS

| | | | |
|---|---|---|---|
| 2010/0267341 A1 | 10/2010 | Bergel et al. | |
| 2016/0174244 A1 | 6/2016 | Kim et al. | |
| 2016/0197659 A1 | 7/2016 | Yu et al. | |
| 2016/0345216 A1* | 11/2016 | Kishiyama | ........ H04W 36/0085 |
| 2017/0195998 A1 | 7/2017 | Zhang et al. | |
| 2017/0238222 A1* | 8/2017 | Jiang | ..................... H04W 76/10 370/331 |
| 2018/0309496 A1 | 10/2018 | Lee et al. | |
| 2019/0045377 A1* | 2/2019 | Kakishima | ............ H04W 16/28 |
| 2019/0159230 A1 | 5/2019 | Kim et al. | |
| 2019/0222288 A1* | 7/2019 | Zhou | ................... H04B 7/0665 |
| 2019/0281510 A1 | 9/2019 | Yilmaz et al. | |
| 2019/0297601 A1 | 9/2019 | You et al. | |
| 2020/0037385 A1 | 1/2020 | Park et al. | |

FOREIGN PATENT DOCUMENTS

| | | |
|---|---|---|
| CN | 103999421 A | 8/2014 |
| CN | 104052532 A | 9/2014 |
| CN | 104620551 A | 5/2015 |
| CN | 104734759 A | 6/2015 |
| CN | 104735685 A | 6/2015 |
| JP | 2007-525893 A | 9/2007 |
| JP | 2015-109692 A | 6/2015 |
| JP | 2015-185914 A | 10/2015 |
| WO | 2015/025839 A1 | 2/2015 |
| WO | 2015/115376 A1 | 8/2015 |
| WO | 2015/141066 A1 | 9/2015 |
| WO | 2015/166840 A1 | 11/2015 |
| WO | 2016/013608 A1 | 1/2016 |
| WO | 2016/065590 A1 | 5/2016 |

OTHER PUBLICATIONS

International Search Report mailed on Jun. 27, 2017 for PCT/JP2017/013802 filed on Mar. 31, 2017, 11 pages including English translation.
Extended European Search Report issued Jun. 6, 2019, in corresponding European Application No. 17823820.0, 8 pages.
CMCC, On Gradual UE-Specific (GUS) beamformed control channel, 3GPP TSG RAN WG1 Meeting #85, R1-164891, May 13, 2016 <URL:http://www.3gpp.org/ftp/tsg_ran/WG1_RL1/TSGR1_1002/Docs/r1-164891.zip>.

* cited by examiner

BASE STATION, TERMINAL APPARATUS, COMMUNICATION METHOD AND RECORDING MEDIUM

CROSS-REFERENCE TO RELATED APPLICATIONS

This application is a continuation of U.S. application Ser. No. 18/301,993, filed on Apr. 18, 2023, which is a continuation of U.S. application Ser. No. 17/530,462, filed on Nov. 19, 2021 (now U.S. Pat. No. 11,671,302, issued Jun. 6, 2023), which is a continuation of U.S. application Ser. No. 16/313,646, filed on Dec. 27, 2018 (now U.S. Pat. No. 11,212,153, issued Dec. 28, 2021), which is based on PCT/JP2017/013802, filed on Mar. 31, 2017, and claims priority to Japanese Patent Application No. 2016-134132, filed on Jul. 6, 2016, and Japanese Patent Application No. 2016-172511, filed on Sep. 5, 2016, the entire contents of each are incorporated herein by reference.

TECHNICAL FIELD

The present disclosure relates to a base station, a terminal apparatus, a communication method and a recording medium.

BACKGROUND ART

In recent years, in order to realize a highly sophisticated information society while coping with rapid increases in traffic, in the Third Generation Partnership Project (3GPP), a next generation communication standard, 5G, has been discussed. There is a communication technology using non-orthogonal resources called multi-user superposition transmission (MUST) or non-orthogonal multiple access (NOMA) as a leading technology of 5G. Since a communication scheme using non-orthogonal resources can increase a cell capacity compared to a communication scheme using orthogonal resources, various technologies are developed for implementation. In addition, for example, use of millimeter waves, an extension of device-to-device (D2D) communication, group communication, a relay node, preparation of a machine-to-machine (M2M) communication platform and traffic offloading are also discussed.

Currently, there is massive multiple-input and multiple-output (massive-MIMO) as a technology that is almost decided to be used in addition to MUST. The massive-MIMO is a technology for performing beamforming using multiple antennas and is a technology developed from MIMO using multiple antennas and 3D (or full dimension)-MIMO through which beamforming is possible in a 3-dimensional direction. For example, many technologies related to MIMO have been developed as shown in Non-Patent Literature 1.

CITATION LIST

Non-Patent Literature

Non-Patent Literature 1: T. Murakami, et al., "Multiuser MIMO with implicit channel feedback in massive antenna systems," IEICE Communications Express, 2013, Vol. 2, No. 8, pp. 336-342

DISCLOSURE OF INVENTION

Technical Problem

However, the technology related to massive-MIMO proposed in the above-listed Non-Patent Literature and the like is still in discussion and it is hard to say that adequate proposals have been made. For example, a technology for appropriately selecting a beam used in communication in an environment in which massive-MIMO beamforming is performed is one of technologies that are not adequately proposed.

Solution to Problem

According to an embodiment of the present disclosure, there is provided a base station including: a communication unit configured to form multiple beams and perform communication with a terminal apparatus; and a control unit configured to transmit, to the terminal apparatus, first identification information of a group that is used in communication with the terminal apparatus among the first identification information allocated to groups each of which includes multiple beams to be formed.

According to an embodiment of the present disclosure, there is provided a terminal apparatus including: a communication unit configured to perform communication with a base station that forms multiple beams and performs communication; and a control unit configured to transmit, to the base station, first identification information of a group available for communication with the base station among the first identification information allocated to groups each of which includes multiple beams to be formed.

According to an embodiment of the present disclosure, there is provided a communication method that is performed by a processor, the communication method including: forming multiple beams and performing communication with a terminal apparatus; and transmitting, to the terminal apparatus, first identification information of a group that is used in communication with the terminal apparatus among the first identification information allocated to groups each of which includes multiple beams to be formed.

According to an embodiment of the present disclosure, there is provided a communication method that is performed by a processor, the communication method including: performing communication with a base station that forms multiple beams and performs communication; and transmitting, to the base station, first identification information of a group available for communication with the base station among the first identification information allocated to groups each of which includes multiple beams to be formed.

According to an embodiment of the present disclosure, there is provided a recording medium having a program recorded therein, the program causing a computer to function as: a communication unit configured to form multiple beams and perform communication with a terminal apparatus; and a control unit configured to transmit, to the terminal apparatus, first identification information of a group that is used in communication with the terminal apparatus among the first identification information allocated to groups each of which includes multiple beams to be formed.

According to an embodiment of the present disclosure, there is provided a recording medium having a program recorded therein, the program causing a computer to function as: a communication unit configured to perform communication with a base station that forms multiple beams and performs communication; and a control unit configured to transmit, to the base station, first identification information of a group available for communication with the base station among the first identification information allocated to groups each of which includes multiple beams to be formed.

Advantageous Effects of Invention

As described above, according to embodiments of the present disclosure, there is provided a mechanism through which it is possible to appropriately select a beam used in communication in an environment in which massive-MIMO beamforming is performed. The above effects are not necessarily limited, and any effect shown in this specification or other effects that may be understood from this specification may be achieved along with these effects or instead of these effects.

MODE(S) FOR CARRYING OUT THE INVENTION

Figure 1:
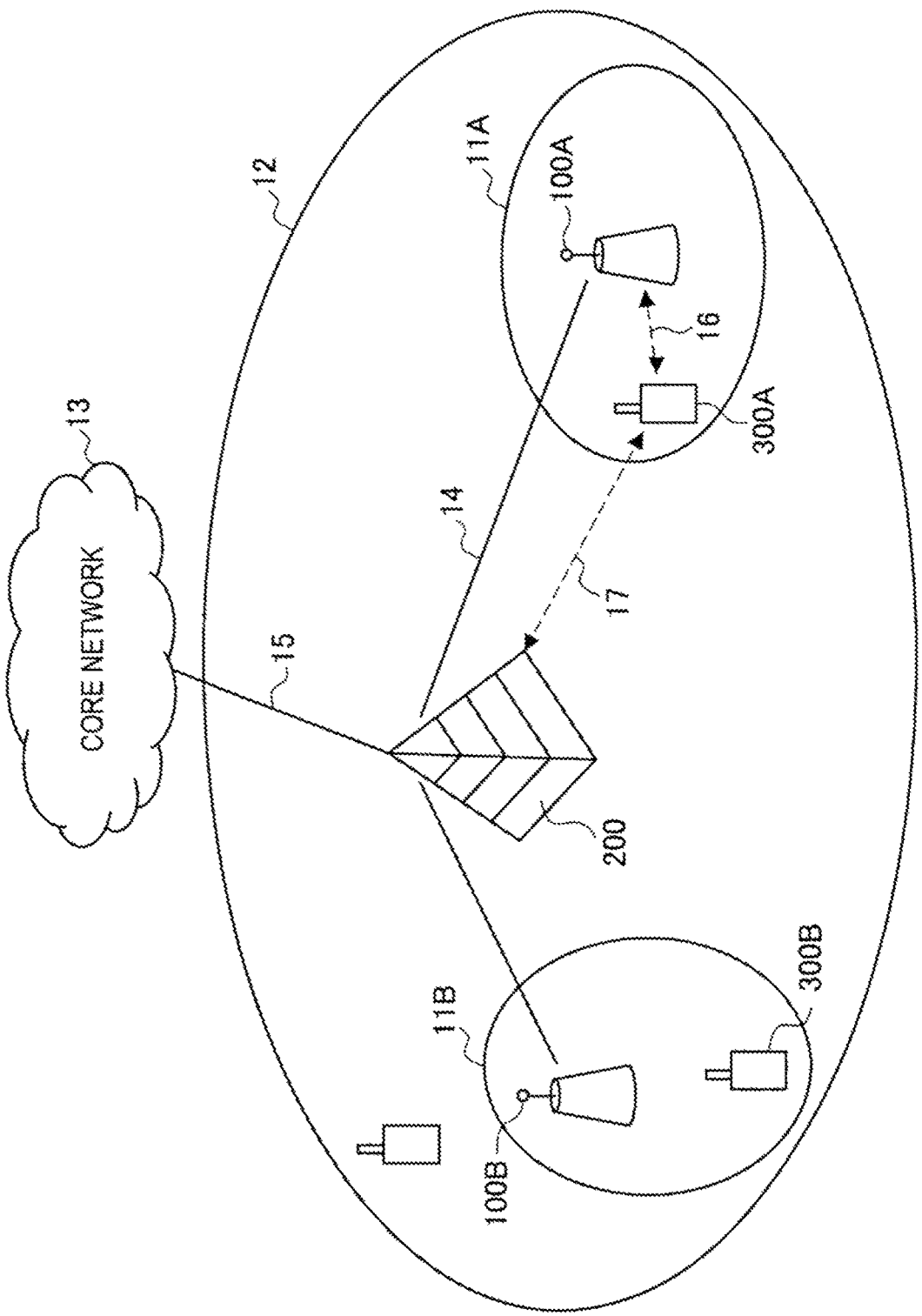
FIG. 1 is a diagram for describing an example of a configuration of a system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, in this specification and the appended drawings, elements having substantially the same function and structure may in some cases be distinguished by different letters appended to the same sign. For example, multiple elements having substantially the same function and structure are distinguished as terminal apparatuses 300A, 300B, and 300C as appropriate. On the other hand, when not particularly distinguishing each of multiple elements having substantially the same function and structure, only the same sign will be given. For example, the terminal apparatuses 300A, 300B, and 300C will be simply designated the terminal apparatus 300 when not being particularly distinguished.

The description will proceed in the following order.
1. Introduction
 1.1. System configuration
 1.2. Massive-MIMO
 1.3. MUST
 1.4. CU separation
 1.5. Technical problems
2. Configuration examples of apparatuses
 2.1. Configuration example of small cell base station
 2.2. Configuration example of macro cell base station
 2.3. Configuration example of terminal apparatus 3. Technical features
3.1. Information sharing
3.2. Group beamforming
3.3. First eNB beamforming synchronization procedure
3.4. TDD/self-contained frame
3.5. UE beamforming
3.6. Second eNB beamforming
3.7. Process flow
3.8. SIC execution instruction
3.9. Handover
4. Application examples
5. Conclusion

1. Introduction

<1.1. System Configuration>

First, an example of a configuration of a system according to an embodiment of the present disclosure will be described with reference to FIG. 1. FIG. 1 is a diagram for describing an example of a configuration of a system according to the present embodiment. As illustrated in FIG. 1, a system 1 according to the present embodiment includes a base station 100, a base station 200 and a terminal apparatus 300.

The base station 100 is an apparatus that operates a cell 11 and provides a radio communication service to the terminal apparatus 300 within the cell 11. As illustrated in FIG. 1, a plurality of the base stations 100 may be located, and a base station 100A operates a cell 11A and provides a radio communication service to a terminal apparatus 300A and a base station 100B operates a cell 11B and provides a radio communication service to a terminal apparatus 300B. In the example shown in FIG. 1, the base station 100 is a small cell base station and the cell 11 is a small cell. The small cell base station 100 is operated according to, for example, a 5G radio access technology. Since millimeter waves assumed to be used in 5G is in a high frequency band and have a short distance in which communication is possible, the 5G radio access technology is considered to be used in a small cell and the like. Massive-MIMO, NOMA and CU separation, which will be described, are applied to the small cell base station 100. The small cell base station 100 is simply referred to as a small cell in some cases. For example, connection to the small cell base station 100 is referred to as connection to a small cell in some cases.

The base station 200 is an apparatus that operates a cell 12 and provides a radio communication service to the terminal apparatus 300 within the cell 12. In the example shown in FIG. 1, the base station 200 is a macro cell base station, and the cell 12 is a macro cell. The macro cell 12 is operated according to, for example, LTE or LTE-Advanced (LTE-A). While a single small cell base station 100 is shown in FIG. 1, multiple small cell base stations 100 may be located within the macro cell 12. The macro cell base station 200 is simply referred to as a macro cell in some cases. For example, connection to the macro cell base station 200 is referred to as connection to a macro cell in some cases.

The terminal apparatus 300 is an apparatus that communicates with a base station. The terminal apparatus 300 can perform communication by establishing a radio link 16 with the small cell base station 100. In addition, the terminal apparatus 300 can perform communication by establishing a radio link 17 with the macro cell base station 200. The terminal apparatus 300 is also referred to as user equipment (UE) or a user.

A core network 13 includes a control node configured to control the small cell base station 100, the macro cell base station 200 and the like. The core network 13 may include, for example, an evolved packet core (EPC) or a 5G architecture. The core network 13 is connected to a packet data network through a gateway device.

The small cell base station 100 and the macro cell base station 200 are connected by an X2 interface 14. In addition, the macro cell base station 200 and the core network 13 are connected by an S1 interface 15.

According to the present 3GPP discussion (as of June 2016), a change to a 5G network configuration from an LTE network configuration is not considered to be significant. That is, an X2 interface, an X1 interface and the like are considered to be included in the 5G network configuration.

In addition, in MUST, which will be described, it is assumed that different frequency bands are used in a macro cell and a small cell, and the same frequency band is used in multiple small cells within the same macro cell. Accordingly, different frequency bands are used in the macro cell 12 and the small cell 11, and the same frequency band is used in the small cells 11A and 11B.

Hereinafter, the 5G radio access technology applied to the system 1 will be described.

<1.2. Massive-MIMO>

Figure 2:
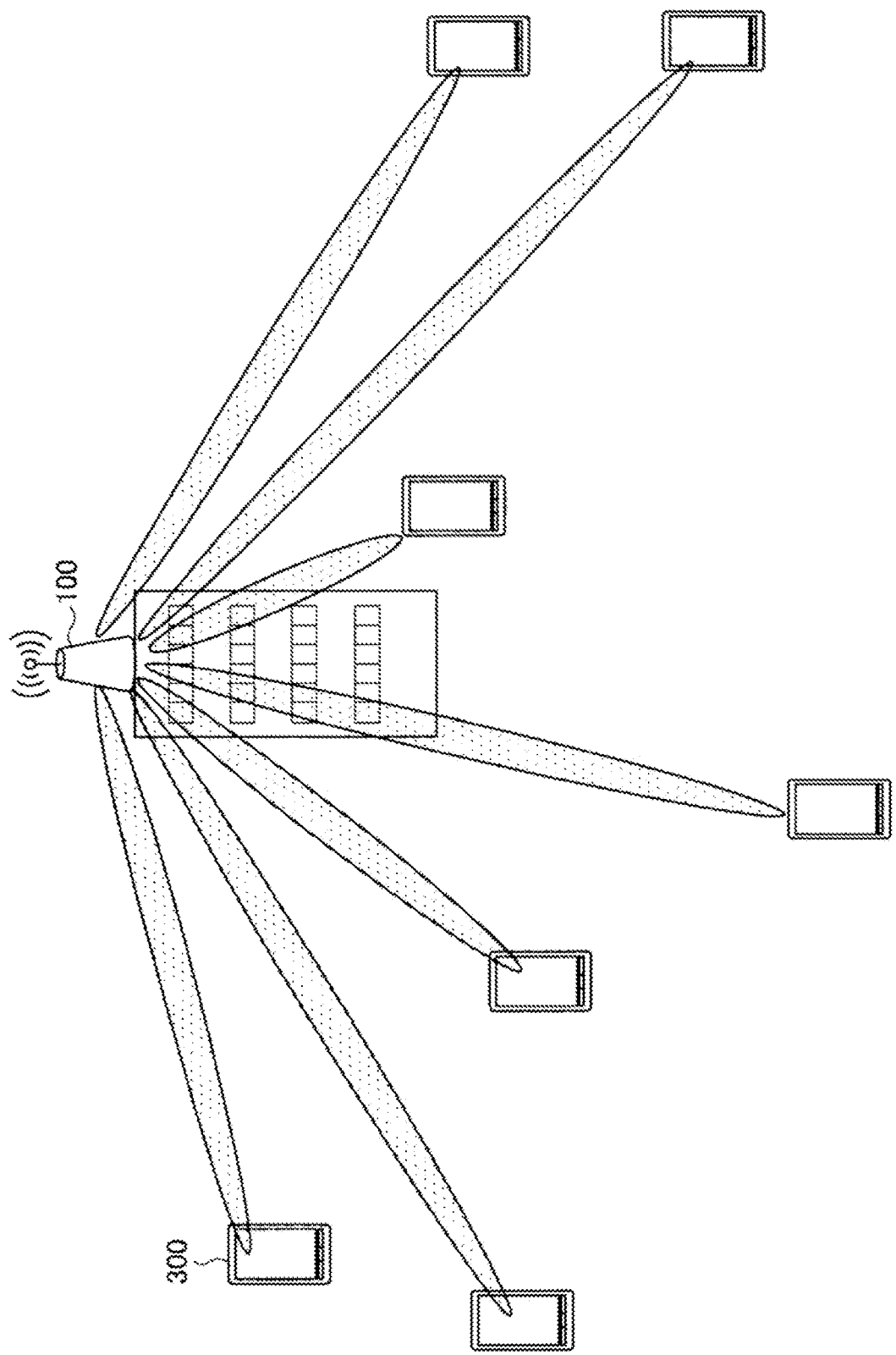
FIG. 2 is a diagram for describing massive-MIMO.

FIG. 2 is a diagram for describing massive-MIMO. The massive-MIMO is a technology for forming beams having sharp directivity by an array antenna including multiple antenna elements. As illustrated in FIG. 2, the base station 100 performs spatial beamforming on multiple users when the massive-MIMO is applied. Therefore, it is possible to increase the number of terminal apparatuses 300 that can perform communication simultaneously at a very high data rate. Accordingly, it is possible to significantly increase a cell capacity of an enhanced mobile broadband (eMBB). In addition, in the massive-MIMO, it is possible to improve an antenna gain and reduce interference according to communication in a pinpoint using beams. It was decided to use the massive-MIMO in 5G since it is possible to compensate for a path loss of millimeter waves and achieve cell capacity conditions that are 5G requirements.

In the following table, examples of the number of antennas (more specifically, the number of antenna elements) in LTE 3D-MIMO and 5G massive-MIMO are shown. In the following table, the number of antenna elements provided on a two-dimensional plane of 20 cm (centimeters)×20 cm and intervals of antenna elements are shown.

TABLE 1

| Antenna element interval | LTE 3D-MIMO 3.5 GHz ($\lambda$ = 8.6 cm) | Massive-MIMO | |
|---|---|---|---|
| | | 10 GHz ($\lambda$ = 3 cm) | 20 GHz ($\lambda$ = 1.5 cm) |
| 0.5 $\lambda$ | 16 | 169 | 676 |
| 0.7 $\lambda$ | 9 | 81 | 361 |

According to the above table, the number of antenna elements increases and beams having sharp directivity can be formed in higher frequency bands. Therefore, it should be noted that an effect of massive-MIMO is greater in higher frequency bands.

<1.3. MUST>

MUST is a communication scheme using non-orthogonal resources. At least partially overlapping resources are allocated to each of the terminal apparatuses 300 within a cell in the MUST. For example, resource blocks that overlap in a frequency direction are allocated to multiple terminal apparatuses 300. Signals that are transmitted and received by the terminal apparatuses 300 within the cell may interfere with each other in a radio space when the MUST is used. However, it is possible to acquire information for each user by a predetermined decoding process on a reception side. Thus, it is theoretically known that it is possible to achieve a higher communication capacity (or a cell communication capacity) in the MUST when resources are appropriately allocated than in a communication scheme using orthogonal resources.

Figure 3:
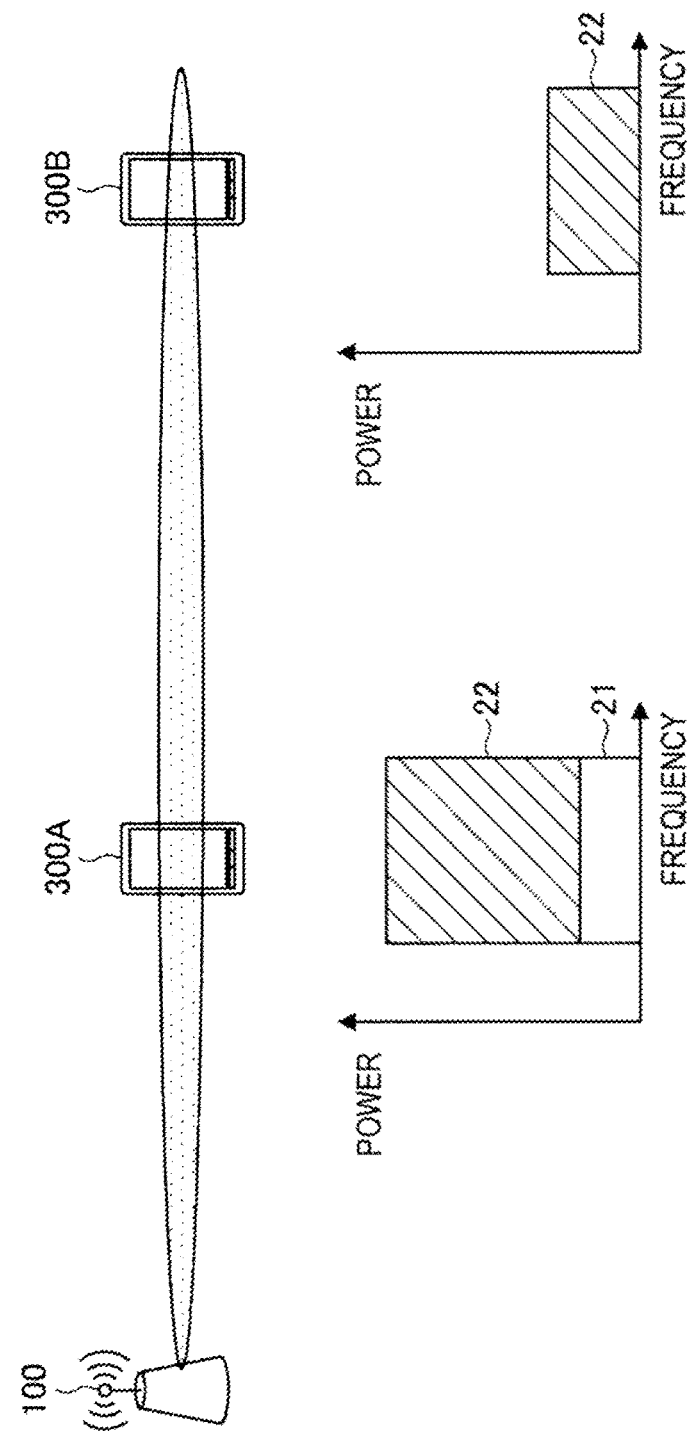
FIG. 3 is a diagram for describing MUST.

FIG. 3 is a diagram for describing MUST. As illustrated in FIG. 3, an example in which the base station 100 multiplexes the terminal apparatus 300A that is positioned at a center of a cell and the terminal apparatus 300B that is positioned at an edge of the cell using non-orthogonal resources is assumed. The terminal apparatus 300A is positioned close to the base station 100 and thus receives both a signal 21 addressed to the terminal apparatus 300A and a signal 22 addressed to the terminal apparatus 300B. Since a received signal level is high and a necessary carrier to noise ratio (C/N) is sufficiently small, the terminal apparatus 300A can perform successive interference cancellation (SIC) and acquire and decode the self-addressed signal 21. Here, the SIC is a method in which an interference replica addressed to another user is generated and removed from received signals which are successively performed, and thus a self-addressed signal is acquired. Conversely, since the terminal apparatus 300B is positioned far from the base station 100, the signal 21 addressed to the terminal apparatus 300A is sufficiently attenuated when received. Therefore, the terminal apparatus 300B can receive and decode the self-addressed signal 22 without using the SIC. UE that removes interference using the SIC is also referred to as Near-UE. In addition, UE that can acquire a self-addressed signal without using the SIC is also referred to as Far-UE.

<1.4. CU Separation>

CU separation is technology in which a control plane signal and a user plane signal are processed in a separate manner. For example, in the system 1 shown in FIG. 1, the small cell base station 100 performs a process of a user plane and transmits and receives user data to and from the terminal apparatus 300. That is, the user plane signal is transmitted and received through the radio link 16. On the other hand, the macro cell base station 200 performs a process of a control plane and transmits and receives control information to and from the terminal apparatus 300. That is, the control plane signal is transmitted and received through the radio link 17.

In this manner, by cooperation between base stations, it is possible to stably transmit and receive control information while user data is transmitted and received through the 5G radio access technology at a high speed. In addition, as a technology for the cooperation between base stations, aggregation between base stations (dual connectivity) may be applied to the small cell base station 100 and the macro cell base station 200.

<1.5. Technical Problems>

(1) First Problem

The first problem is that a mechanism of establishing synchronization between a terminal apparatus and a small cell base station serving as a communication partner of a user plane signal when massive-MIMO and CU separation are combined is not clarified. It is considered that it is possible to establish synchronization of a terminal apparatus with a macro cell base station serving as a communication partner of a control plane signal by using the control plane signal. Conversely, it is considered to be difficult to establish synchronization of a terminal apparatus with a small cell base station serving as a communication partner of a user plane signal since no control plane signal is transmitted and received. In particular, it is considered to be difficult to appropriately select a beam used in communication among beams formed by massive-MIMO, that is, to establish beamforming synchronization, which will be described.

(2) Second Problem

The second problem is that a mechanism for a terminal apparatus to handover between small cell base stations serving as communication partners of a user plane signal when massive-MIMO and CU separation are combined is not clarified. For example, a case in which a terminal apparatus transmits and receives a control plane signal to and from a macro cell base station and transmits and receives a user plane signal to and from a small cell base station on a beam is assumed. In this case, a radio link is established between the terminal apparatus and the small cell base station. A mechanism for performing a handover between the small cell base stations while maintaining this connection state is not clarified.

(3) Third Problem

The third problem is that a mechanism for instructing a terminal apparatus to perform SIC when massive-MIMO and MUST are combined is not clarified. In an environment in which such a combination is performed, for example, multiple terminal apparatuses that are positioned on the same beam from a base station are multiplexed using non-orthogonal resources. In this case, a terminal apparatus that is positioned close to the base station among the multiple terminal apparatuses performs SIC. However, a timing at which SIC will be performed is not known to the terminal apparatus.

2. Configuration Examples of Apparatuses

Hereinafter, configuration examples of apparatuses will be described with reference to FIG. 4 to FIG. 7.

<2.1. Configuration Example of Small Cell Base Station>

Figure 4:
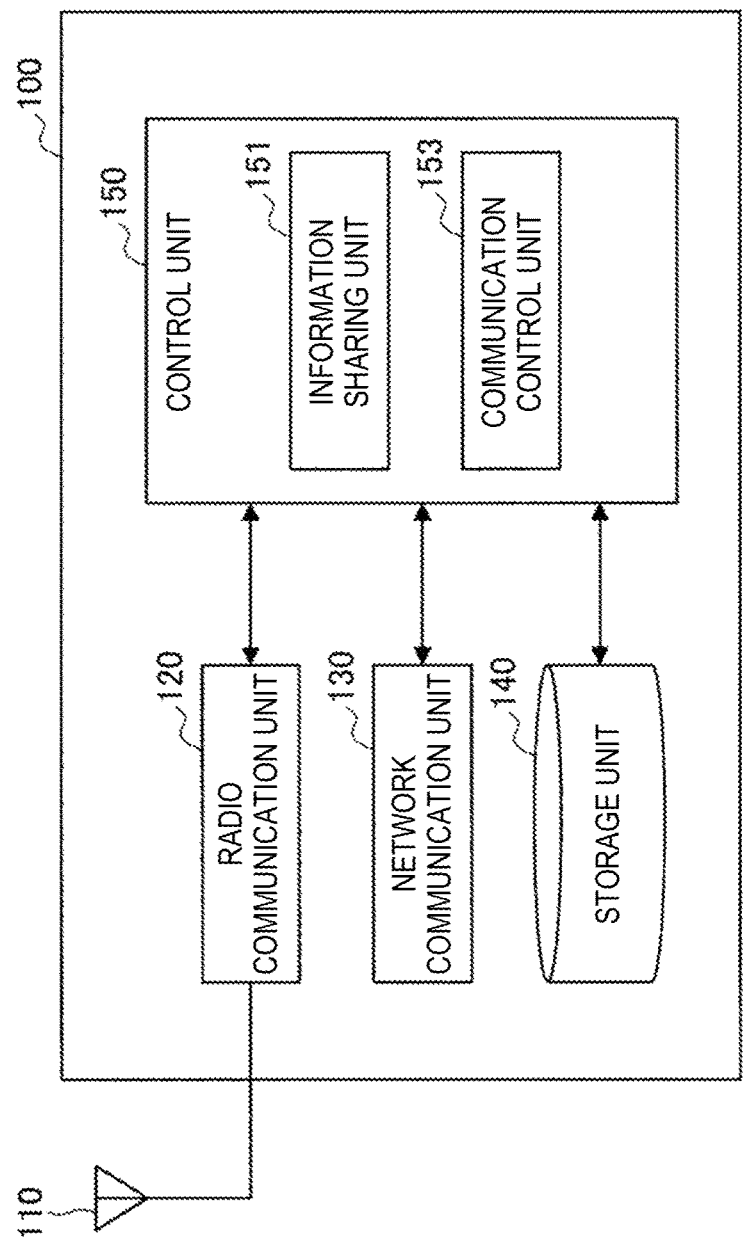
FIG. 4 is a block diagram illustrating an example of a configuration of a small cell base station according to the present embodiment.

FIG. 4 is a block diagram illustrating an example of a configuration of the small cell base station 100 according to the present embodiment. As illustrated in FIG. 4, the small cell base station 100 includes an antenna unit 110, a radio communication unit 120, a network communication unit 130, a storage unit 140 and a control unit 150.

(Antenna Unit 110)

The antenna unit 110 emits a signal to be output by the radio communication unit 120 into space as radio waves. In addition, the antenna unit 110 converts spatial radio waves into a signal and outputs the signal to the radio communication unit 120.

Here, the antenna unit 110 according to the present embodiment includes a massive-MIMO array antenna, which will be described. When a cell is divided into multiple sectors, the antenna unit 110 may include multiple array antennas that correspond one-to-one with the divided sectors.

(Radio Communication Unit 120)

The radio communication unit 120 transmits and receives signals. For example, the radio communication unit 120 transmits a downlink signal to the terminal apparatus 300 and receives an uplink signal from the terminal apparatus 300.

A radio communication unit 220 according to the present embodiment forms multiple beams through massive-MIMO and communicates with the terminal apparatus 300.

(Network Communication Unit 130)

The network communication unit 130 transmits and receives information. For example, the network communication unit 130 transmits information to another node and receives information from the other node. For example, the other node includes another base station (for example, the macro cell base station 200) and a core network node.

(Storage Unit 140)

The storage unit 140 stores programs and data for operations of the small cell base station 100.

(Control Unit 150)

The control unit 150 provides various functions of the small cell base station 100. The control unit 150 includes an information sharing unit 151 and a communication control unit 153. Alternatively, the control unit 150 may further include a component other than these components. That is, the control unit 150 may perform an operation other than operations of these components.

Specific operations of the information sharing unit 151 and the communication control unit 153 will be described below in detail.

<2.2. Configuration Example of Macro Cell Base Station>

Figure 5:
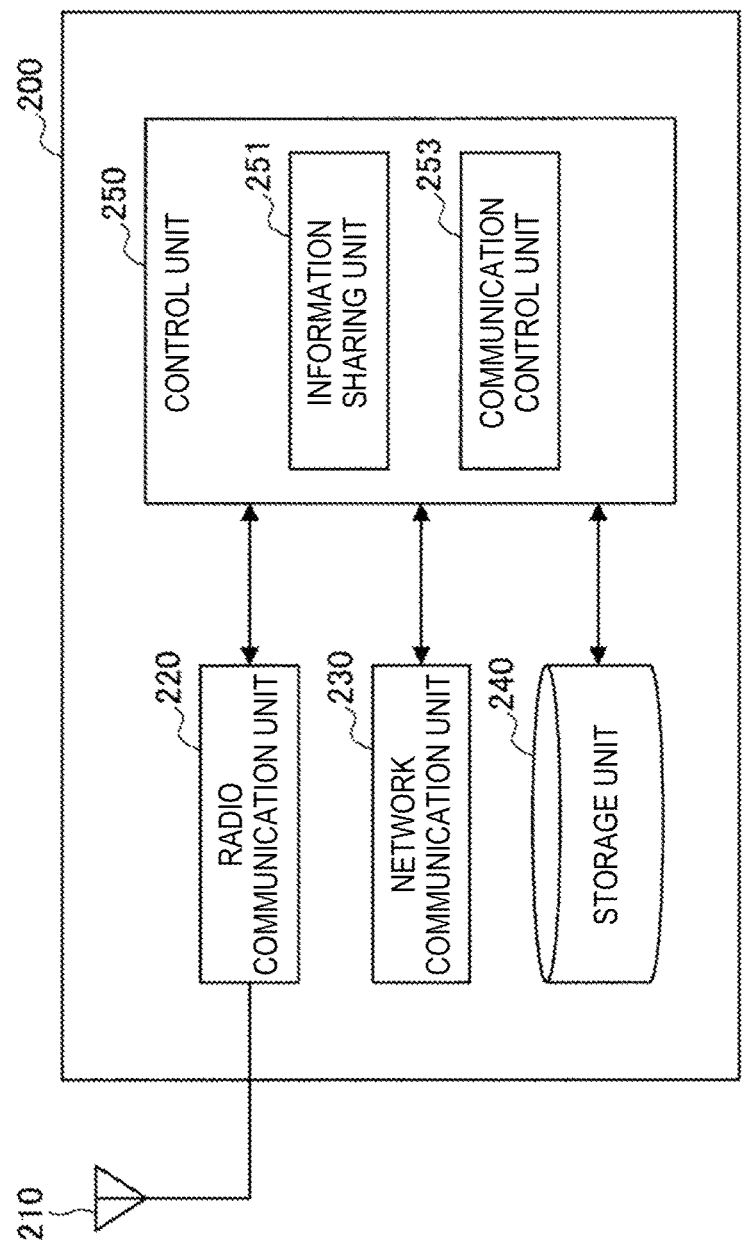
FIG. 5 is a block diagram illustrating an example of a configuration of a macro cell base station according to the present embodiment.

FIG. 5 is a block diagram illustrating an example of a configuration of the macro cell base station 200 according to the present embodiment. As illustrated in FIG. 5, the macro cell base station 200 includes an antenna unit 210, the radio communication unit 220, a network communication unit 230, a storage unit 240 and a control unit 250.

(Antenna Unit 210)

The antenna unit 210 emits a signal to be output by the radio communication unit 220 into space as radio waves. In addition, the antenna unit 210 converts spatial radio waves into a signal and outputs the signal to the radio communication unit 220.

The antenna unit 210 according to the present embodiment may include an FD-MIMO array antenna.

(Radio Communication Unit 220)

The radio communication unit 220 transmits and receives signals. For example, the radio communication unit 220 transmits a downlink signal to the terminal apparatus 300 and receives an uplink signal from the terminal apparatus 300.

The radio communication unit 220 according to the present embodiment forms multiple beams through FD-MIMO and communicates with the terminal apparatus 300.

(Network Communication Unit 230)

The network communication unit 230 transmits and receives information. For example, the network communication unit 230 transmits information to another node and receives information from the other node. For example, the other node includes another base station (for example, the small cell base station 100) and a core network node.

(Storage Unit 240)

The storage unit 240 stores programs and data for operations of the macro cell base station 200.

(Control Unit 250)

The control unit 150 provides various functions of the macro cell base station 200. The control unit 250 includes an information sharing unit 251 and a communication control unit 253. Alternatively, the control unit 250 may further include a component other than these components. That is, the control unit 250 may perform an operation other than operations of these components.

Specific operations of the information sharing unit 251 and the communication control unit 253 will be described below in detail.

<2.3. Configuration Example of Terminal Apparatus>

Figure 6:
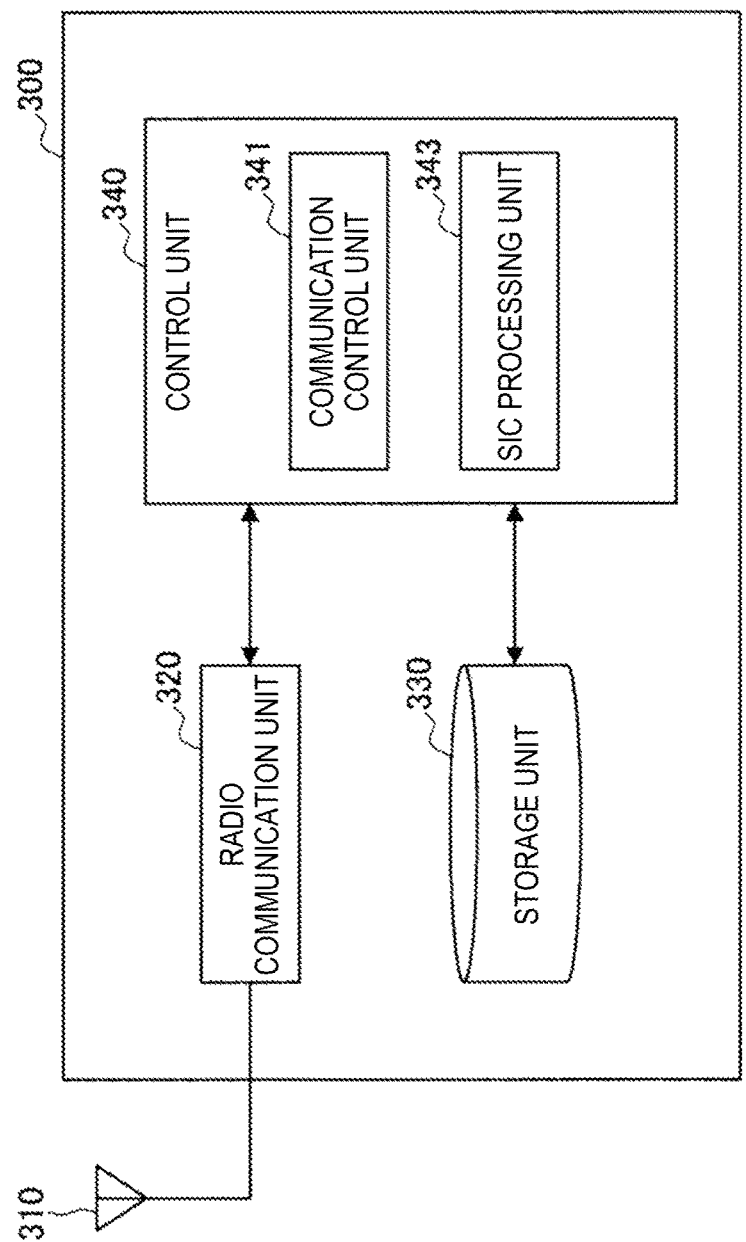
FIG. 6 is a block diagram illustrating an example of a configuration of a terminal apparatus according to the present embodiment.

FIG. 6 is a block diagram illustrating an example of a configuration of the terminal apparatus 300 according to the present embodiment. As illustrated in FIG. 6, the terminal apparatus 300 includes an antenna unit 310, a radio communication unit 320, a storage unit 330 and a control unit 340.

(Antenna Unit 310)

The antenna unit 310 emits a signal to be output by the radio communication unit 320 into space as radio waves. In addition, the antenna unit 310 converts spatial radio waves into a signal and outputs the signal to the radio communication unit 320.

(Radio Communication Unit 320)

The radio communication unit 320 transmits and receives signals. For example, the radio communication unit 320 communicates with the small cell base station 100 or the terminal apparatus 300. Specifically, the radio communication unit 320 receives a downlink signal from the small cell base station 100 or the macro cell base station 200 and transmits an uplink signal to the small cell base station 100 or the macro cell base station 200.

(Storage Unit 330)

The storage unit 330 stores programs and data for operations of the terminal apparatus 300.

(Control Unit 340)

The control unit 340 provides various functions of the terminal apparatus 300. The control unit 340 includes a communication control unit 341 and an SIC processing unit 343. Alternatively, the control unit 340 may further include a component other than these components. That is, the control unit 340 may perform an operation other than operations of these components.

Specific operations of the communication control unit 341 and the SIC processing unit 343 will be described below in detail.

3. Technical Features

Hereinafter, technical features of the system 1 according to the present embodiment will be described.

<3.1. Information Sharing>

First Synchronization Information

The small cell base station 100 (for example, the information sharing unit 151) and the macro cell base station 200 (for example, the information sharing unit 251) share information with each other using an S1 interface, an X2 interface and the like. For example, the small cell base station 100 and the macro cell base station 200 transmit information for synchronization with the terminal apparatus 300 (hereinafter also referred to as first synchronization information) to each other.

For example, the first synchronization information may include a cell-radio network temporary identifier (C-RNTI) that is identification information allocated to the terminal apparatus 300 by the macro cell base station 200 that has established a connection of a control plane.

For example, the first synchronization information may include timing information for temporal synchronization between the macro cell base station 200 that has established the connection of a control plane and the terminal apparatus 300. The timing information may include, for example, frame timing information and symbol timing information.

For example, the first synchronization information may include frequency channel information of a user plane used in the small cell base station 100. Accordingly, the terminal apparatus 300 can establish frequency synchronization.

For example, the first synchronization information may include information for beamforming synchronization. Beamforming synchronization refers to the fact that a reception device is captured on a beam formed by a transmission device. Small cell candidate information, which will be described, is considered as the information for beamforming synchronization.

FD-MIMO may be applied to the macro cell base station 200. In FD-MIMO that is being discussed in Release 13, the number of antennas of a base station is 64. In addition, a sequence diagram shown in FIG. 7 is being discussed.

Figure 7:
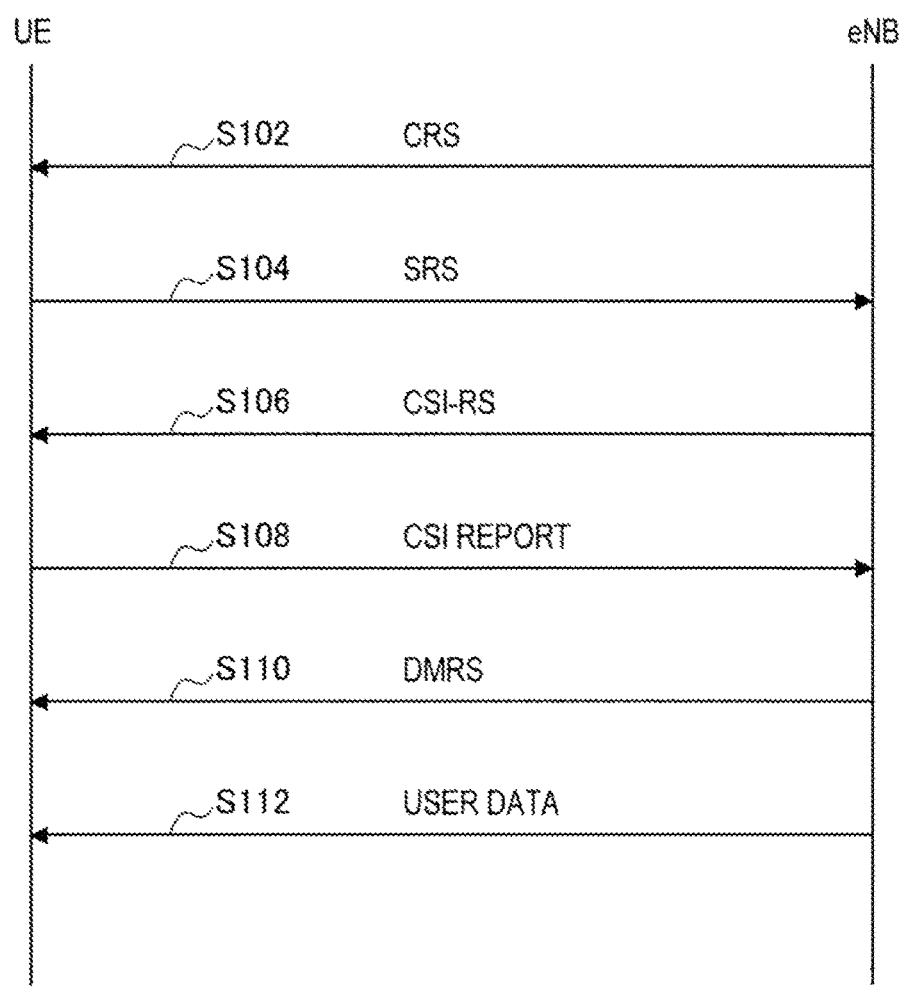
FIG. 7 is a diagram illustrating an example of a synchronization process flow that is being discussed in Release 13.

FIG. 7 is a diagram illustrating an example of a synchronization process flow that is being discussed in Release 13. As illustrated in FIG. 7, first, an eNB (that is, a base station) transmits a cell-specific reference signal (CRS) to UE (that is, a terminal apparatus) (Step S102). The UE can learn about rough channel quality for radio resource management (RRM) measurement by the CRS. Next, the UE transmits a sounding reference signal (SRS) to the eNB (Step S104). The eNB can learn about detailed channel quality of an uplink by the SRS. Next, the eNB transmits a channel state information reference signal (CSI-RS) to the UE (Step S106). The UE can learn about detailed channel quality by the CSI-RS. Next, the UE transmits a CSI report to the eNB (Step S108). Accordingly, the UE can request a preferable beam and modulation and coding scheme (MCS). Next, the eNB transmits a demodulation reference signal (DMRS) to the UE (Step S110). The UE can decode user data by using the DMRS. Then, the eNB transmits the user data to the UE (Step S112). Accordingly, the process ends. As shown in this sequence, in the case of FD-MIMO, the eNB and the UE perform beamforming according to multi user MIMO (MU-MIMO) through CSI feedback including transmission of a CSI measurement signal and reception of a CSI report.

The macro cell base station 200 (for example, the communication control unit 253) performs the synchronization process described with reference to FIG. 7, and establishes a connection of a control plane using FD-MIMO. In this case, since the terminal apparatus 300 is positioned in a direction of a beam and a distance can also be estimated using a reception strength of a signal, the macro cell base station 200 can estimate position information of the terminal apparatus 300. Then, the macro cell base station 200 extracts a candidate for a small cell with which the terminal apparatus 300 will establish the connection of a user plane based on the position information of the terminal apparatus 300 and position information of the small cell. When there are multiple extracted candidates, the macro cell base station 200 extracts a candidate by assigning a priority thereto. Information indicating the candidate for the small cell that is extracted by assigning the priority is also referred to as small cell candidate information. The small cell base station 100 can also estimate the position information of the terminal apparatus 300 by a similar method.

It is possible to specify the small cell base station 100 that will form a beam addressed to the terminal apparatus 300 by assigning a priority according to the small cell candidate information. The small cell candidate information may further include information indicating an estimated result of a position of the terminal apparatus 300 within the small cell. The information indicating the estimated result of the position of the terminal apparatus 300 within the small cell may be a beam group ID and a sector ID, which will be described. In this case, the small cell base station 100 may form a beam in a direction of a limited candidate based on a beam group ID and a sector ID of the candidate and realize efficiency thereby. However, in some cases, the terminal apparatus 300 moves, or the way in which the terminal apparatus 300 is held by a user changes. Then, in these cases, it may be preferable that a beam be formed in a direction corresponding to a movement destination, and the beam be reflected by a reflector and arrive at the terminal apparatus 300 from a different direction. Therefore, the small cell base station 100 may use a beam group ID and/or a sector ID different from a beam group ID or a sector ID indicated by the small cell candidate information even while referring to the small cell candidate information.

Second Synchronization Information

The macro cell base station 200 (for example, the information sharing unit 251) notifies the terminal apparatus 300 of information for synchronization between the small cell base station 100 and the terminal apparatus 300 (hereinafter, also referred to as second synchronization information). For example, the second synchronization information includes the above-described first synchronization information. Further, the second synchronization information may include information about a beam of a small cell candidate (for example, information and the like indicating a ZC sequence transmitted in the small cell candidate), which will be described. In addition, the second synchronization information can include timing information and delay information, which will be described. By using the control plane of the macro cell base station 200 and the terminal apparatus 300 established by the CU separation described above, a second synchronization signal is communicated.

<3.2. Group Beamforming>

The small cell base station 100 (for example, the communication control unit 153) forms beams through massive-MIMO. The beams may be grouped. It is possible to improve reception quality when multiple beams are grouped and used together. Hereinafter, a simulation that is performed to improve reception quality according to grouping will be described with reference to FIG. 8 and FIG. 9.

Figure 8:
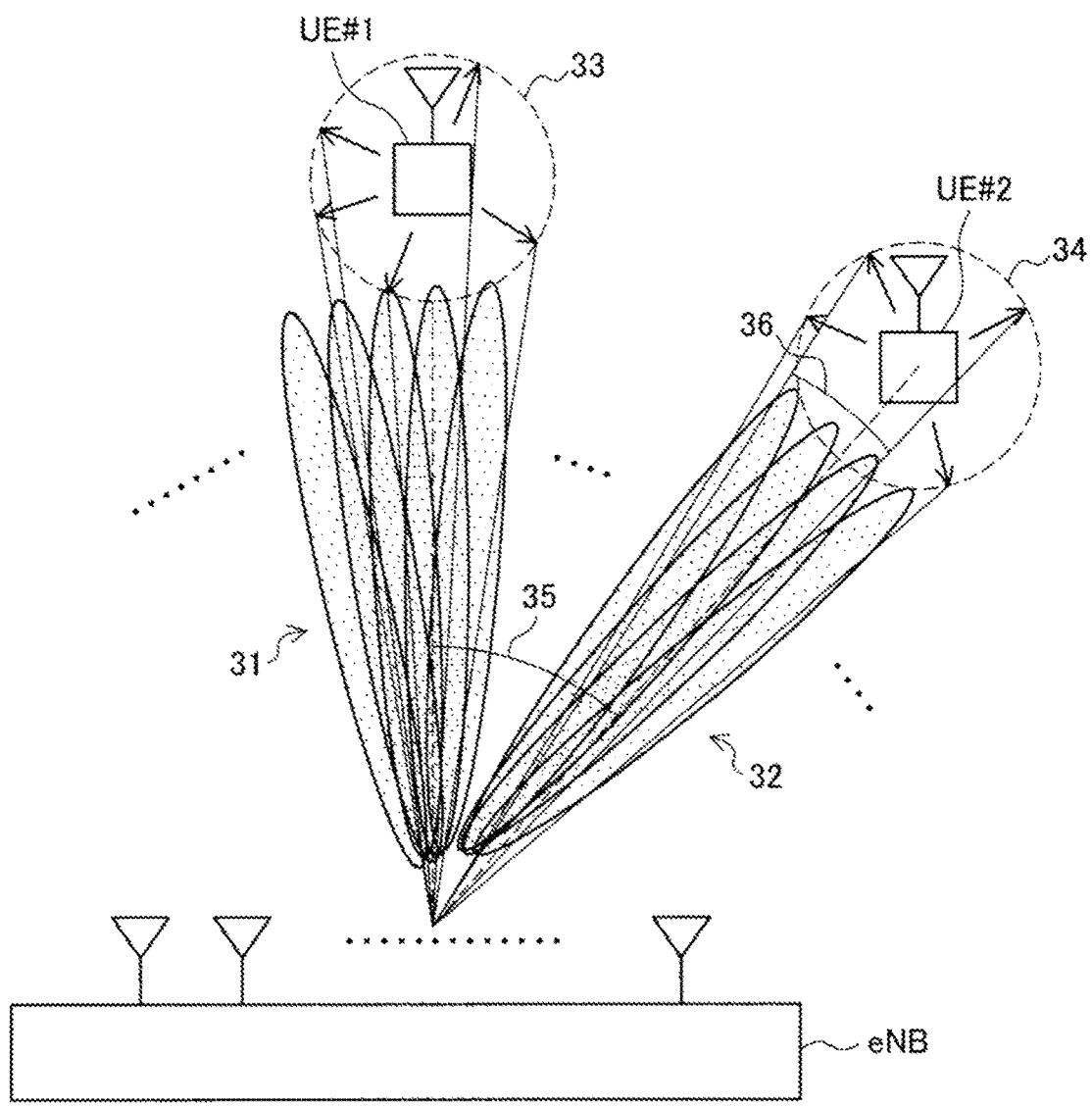
FIG. 8 is a diagram for describing a simulation environment of massive-MIMO.

FIG. 8 is a diagram for describing a simulation environment of massive-MIMO. As illustrated in FIG. 8, the simulation environment is an environment in which a scattering ring model is assumed and an eNB forms beams toward two UEs and performs communication. The eNB forms beams through massive-MIMO, performs communication with UE #1 using at least one beam 31 and performs communication with UE #2 using at least one beam 32 in a similar manner. On the other hand, each of the UEs forms an omnidirectional antenna pattern using an omnidirectional antenna and performs communication with the eNB. More specifically, the UE #1 forms an antenna pattern 33 and the UE #2 forms an antenna pattern 34. Since there is a possibility of UE being located at any place within a serving cell in general mobile communication, a case in which an omnidirectional antenna is used until a radio link is established for the first time is favorable to establish synchronization with an eNB in an initial access procedure. In addition, the number of antenna elements was 64, an element interval was 0.5λ, the number of users was 2, an average signal-noise ratio (SNR) was 20 dB, a modulation scheme was quadrature phase shift keying (QPSK), and the number of trials was 10000.

In the environment, a simulation for evaluating a signal-to-interference plus noise power ratio (SINR) was performed under conditions in which an arrival angle difference 35 between users, an angular spread magnitude 36 of beams, and the number of beams allocated to one user were changed. The results are shown in FIG. 9.

Figure 9:
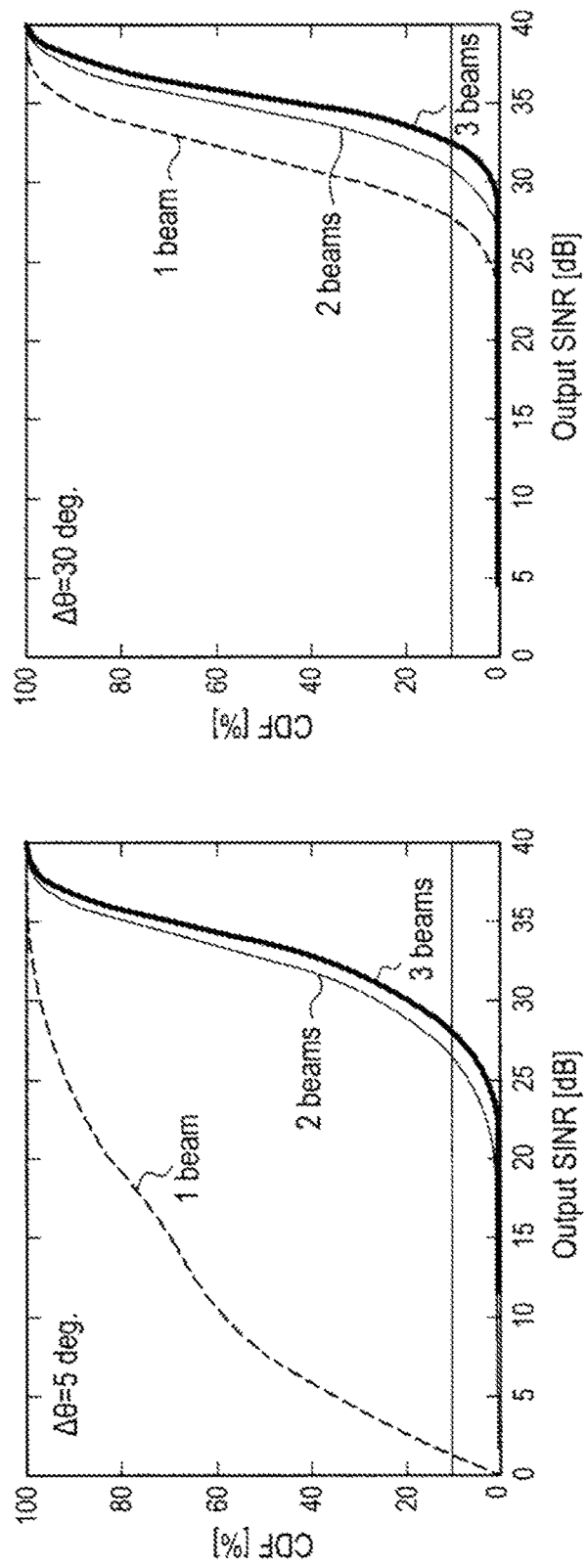
FIG. 9 is a diagram for describing simulation results of massive-MIMO.

FIG. 9 is a diagram for describing simulation results of massive-MIMO. The left graph shows cumulative distribution function (CDF) characteristics with respect to the SINR for each number of beams when the arrival angle difference is 5 degrees. The right graph shows CDF characteristics with respect to the SINR for each number of beams when the arrival angle difference is 30 degrees. According to the simulation results, it should be understood that the SINR is further improved in multiple beams than in a single beam. Further, it should be understood that, when the arrival angle difference is small, performance degradation is severe if there is a single beam and performance degradation is suppressed if there are multiple beams. For example, when the arrival angle difference is 5 degrees, the SINR (CDF=10%) is 1.1 dB when the number of beams is 1 and is 28 dB when the number of beams is 3. In addition, when the arrival angle difference is 30 degrees, the SINR (CDF=10%) is 27.7 dB if the number of beams is 1 and is 32.5 dB if the number of beams is 3. As described above, in the massive-MIMO, it should be noted that multiple beams are preferably allocated to one user when UE is assumed to use the omnidirectional antenna.

Therefore, in the present embodiment, a group including multiple beams (hereinafter, also referred to as a beam group) is defined. The small cell base station 100 communicates with the terminal apparatus 300 using all of the multiple beams included in the beam group. A beam direction is different for each beam group, the small cell base station 100 selects a beam group suitable for the position of the terminal apparatus 300, and performs communication using the selected beam group. When the multiple terminal apparatuses 300 are positioned on beams, the small cell base station 100 multiplexes the multiple terminal apparatuses 300 on a single beam and performs communication. Identification information is allocated to each beam group. The identification information is also referred to as a beam group ID (corresponding to first identification information). In addition, identification information may be allocated to each beam. The identification information is also referred to as a beam ID (corresponding to third identification information). An example in which the number of beams included in one beam group is 4 will be described with reference to FIG. 10 as an example.

Figure 10:
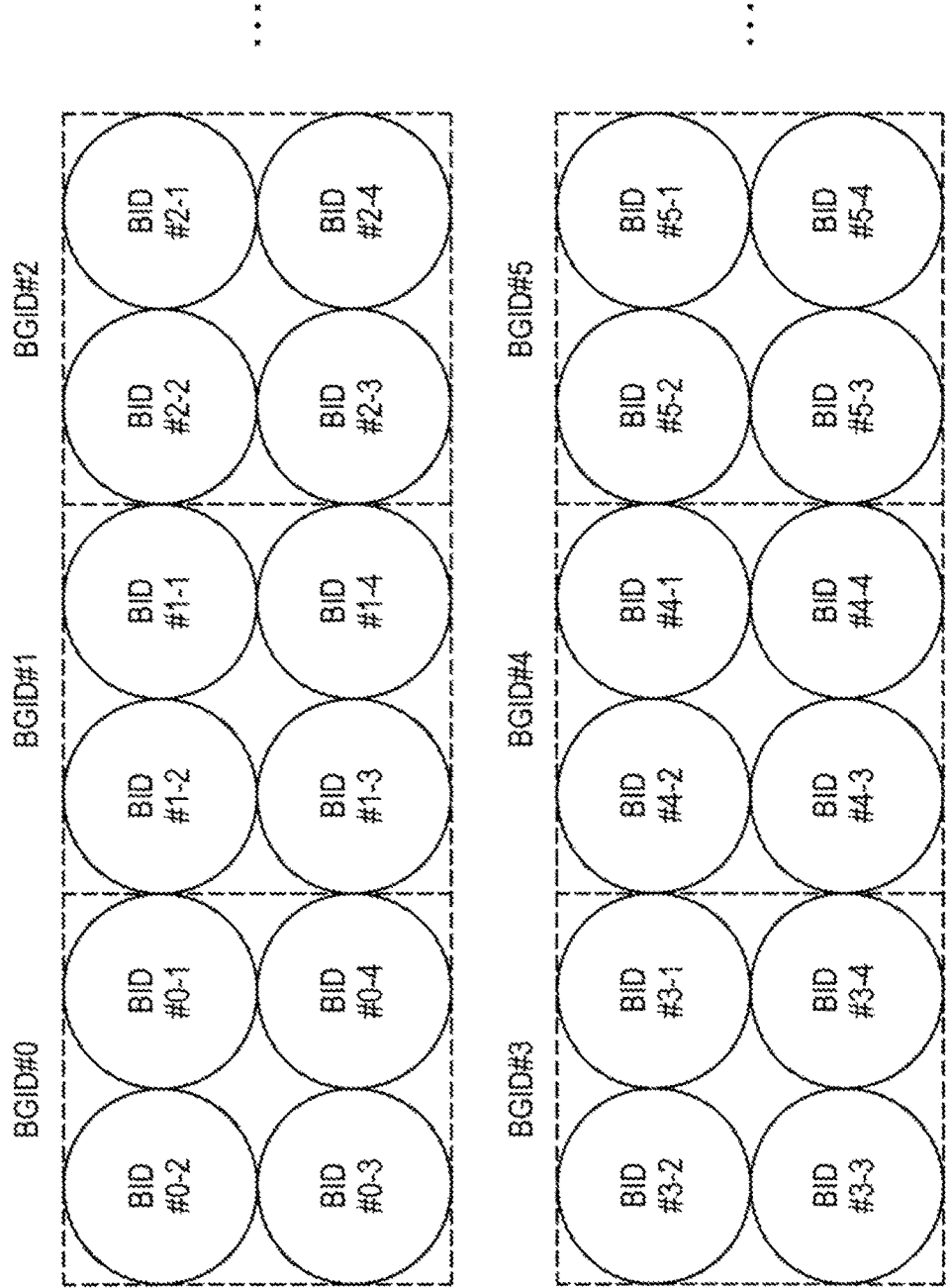
FIG. 10 is a diagram for describing an example of beam grouping according to the present embodiment.

FIG. 10 is a diagram for describing an example of a beam grouping according to the present embodiment. In FIG. 10, circles indicate beams and rectangular dashed lines indicate beam groups. That is, four beams are included in each beam group. A beam group ID (denoted as a beamforming group ID (BGID) in the drawing) such as #0, #1, . . . , #5 is allocated to each beam group. In addition, when the beam group ID is set to "X" and an index of the beam group is set to "Y," a beam ID such as "#X-Y" (denoted as a beamforming ID (BID) in the drawing) is allocated to each beam. It should be understood that the number of beams may be any number, for example, 2, 5 or 9, in addition to 4.

For example, 256 antenna elements may be mounted in the massive-MIMO array antenna. This number is presently indicated in a 5G key performance indicator (KPI) (as of June 2016) as the number of antenna elements of an eNB of a 30 GHz band and a 4 GHz band. When the number of beams included in one beam group is 4, a maximum of 64 beam groups are defined for each single massive-MIMO array antenna allocated to a single sector, and a maximum of 64 beam group IDs are defined.

<3.3. First eNB Beamforming Synchronization Procedure>

It is preferable that symbol synchronization, frame synchronization and beamforming synchronization be established in an initial access procedure of a small cell. The terminal apparatus 300 establishes synchronization in a control plane of a macro cell and then learns about frame timing information and symbol timing information of the small cell from the macro cell. Accordingly, it is considered that the terminal apparatus 300 can establish symbol synchronization and frame synchronization with the small cell with some extent of accuracy. A procedure of the terminal apparatus 300 establishing beamforming synchronization with a small cell will be described below. Hereinafter, beamforming performed by a base station will be also referred to as eNB beamforming. Specifically, eNB beamforming performed by the small cell base station 100 using a beam group is also referred to as first eNB beamforming.

Sector Configuration

The small cell base station 100 is assumed to include multiple massive-MIMO array antennas to form omnidirectional directivity. For example, it is assumed that the small cell base station 100 divides a cell into three sectors and an array antenna is allocated to one sector. This example is shown in FIG. 11.

Figure 11:
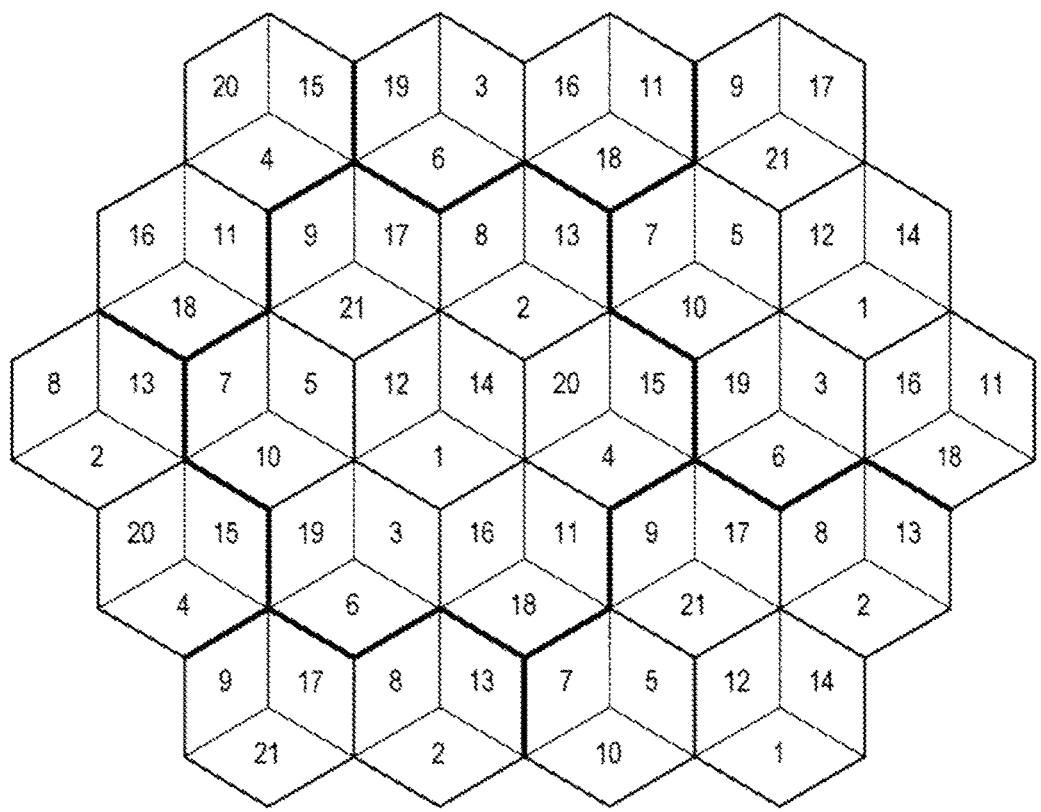
FIG. 11 is a diagram for describing an example of a cell configuration of 7 cells×3 sectors.

FIG. 11 is a diagram for describing an example of a cell configuration of 7 cells×3 sectors. A cell is represented as a hexagon and one cell is divided into three sectors. A number assigned to each sector indicates an index. The configuration example shown in FIG. 11 shows a cell arrangement in which 21 sectors (7 cells×3 sectors) are repeated to realize sufficient orthogonality.

In LTE, the same frequency band is used between adjacent cells and between adjacent sectors in many cases. Coordinated multi point (COMP), which is a technology for avoiding interference from other cells or other sectors at a cell edge and improving throughput using this avoidance, is defined in the 3GPP. It should be noted that cooperative communication between a macro cell and a small cell according to the above-described 5G CU separation is a technique of an extension of coordinated scheduling/coordinated beamforming (CS/CB) that is one of COMP schemes.

ZC Sequence

A constant amplitude zero auto-correlation (CAZAC) sequence is an orthogonal spreading sequence using cyclic shift and is a sequence having an excellent autocorrelation characteristic and cross-correlation characteristic. Here a Zadoff-Chu sequence (hereinafter. also referred to as a ZC sequence) that is a type of the CAZAC sequence will be exemplified as an example.

A cross-correlation that is a constant value, which is one feature of the ZC sequence, will be described with reference to the following expression.

[Math. 1]

$$a_q(n) = e^{-j2\pi q \frac{n\frac{n+1}{2}+l \cdot n}{N_{ZC}}} \quad (1)$$

Here, $N_{ZC}$ denotes a sequence length. q denotes a sequence number. n denotes an index of an element of a sequence. When the sequence length $N_{ZC}$ is a prime number, $N_{ZC}-1$ ZC sequences are available. In addition, a cross-correlation between any two sequences among available sequences has a constant value as follows.

$$\frac{1}{\sqrt{N_{ZC}}}$$

In addition, orthogonality, which is one feature of the ZC sequence, will be described with reference to the following expression.

[Math. 2]

$$r_{u,v}^{(\alpha)}(n) = e^{j\alpha n} \cdot \bar{r}_{u,v}(n) \qquad (2)$$

α denotes an amount of cyclic shift.

$\bar{r}_{u,v}(n)$ is a ZC sequence serving as an origin (hereinafter, also referred to as a root ZC sequence). $r^{\alpha}_{u,v}(n)$ denotes a sequence that is obtained by cyclically shifting the root ZC sequence by α.

When the same root ZC sequence is cyclically shifted by a different cyclic shift amount α, a different orthogonal sequence is generated. User separation is implemented using orthogonality of the ZC sequence if amounts of cyclic shifts are different among the multiplexed users even when multiple users are multiplexed using non-orthogonal resources.

Information for First eNB Beamforming Synchronization

The small cell base station 100 (for example, the communication control unit 153) transmits information for first eNB beamforming synchronization to the terminal apparatus 300. More specifically, the small cell base station 100 transmits a beam group ID of a beam group used in communication with the terminal apparatus 300 among beam group IDs allocated to beam groups including multiple beams to be formed to the terminal apparatus 300. Accordingly, the terminal apparatus 300 can learn about a beam group ID of a beam group used in communication with the terminal apparatus 300.

One beam group ID corresponds to one partial area in a communication target area (for example, a cell or a sector) of the small cell base station 100. This will be described with reference to FIG. 12.

Figure 12:
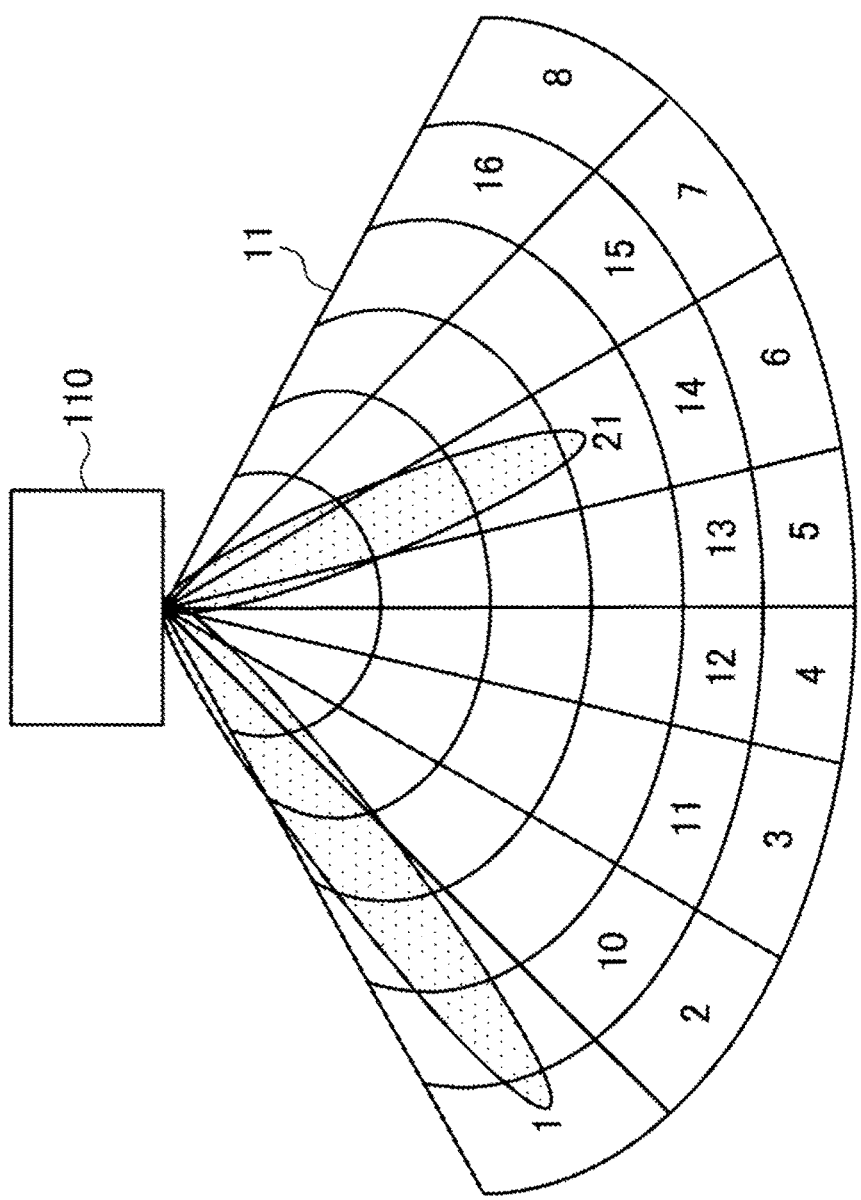
FIG. 12 is a diagram for describing beam group IDs according to the present embodiment.

FIG. 12 is a diagram for describing beam group IDs according to the present embodiment. As illustrated in FIG. 12, a sector 11 which is a communication target area of an array antenna 110 of the small cell base station 100 is divided into a plurality of partial areas. Then, a signal transmitted by using a plurality of beams included in a beam group corresponding to one beam group ID is transmitted to one partial area. For example, as illustrated in FIG. 12, a signal transmitted by using a plurality of beams included in a beam group ID corresponding to a partial area of an index 1 is transmitted to the partial area of the index 1. In addition, a signal transmitted by using a plurality of beams included in a beam group ID corresponding to a partial area of an index 21 is transmitted to the partial area of the index 21. In this manner, beam group IDs correspond one-to-one with partial areas in a communication target area.

This is the same for beam IDs. That is, a beam ID corresponds to one of a plurality of areas obtained by subdividing a partial area corresponding to a beam group ID. Here, the partial area corresponding to the beam group ID is larger than the area corresponding to the beam ID. In other words, a signal transmitted by using a beam group corresponding to a beam group ID has a beam width which is not sharper than a beam width of a signal transmitted by using one beam and is broad to a certain degree.

Here, the small cell base station 100 transmits the beam group ID using multiple beams included in a beam group corresponding to the beam group ID. For example, the beam group ID that is included in a synchronization signal, which will be described, and a self-contained frame, which will be described, is transmitted using multiple beams included in the beam group corresponding to the beam group ID. Accordingly, when the beams are received, the terminal apparatus 300 can learn about the beam group ID of the beam group including the beams. In addition, it is possible to establish first eNB beamforming synchronization based on the synchronization signal, which will be described, and track first eNB beamforming synchronization based on the self-contained frame, which will be described. Hereinafter, transmission using multiple beams included in a beam group will also simply be referred to as transmission using a beam group.

In the beam group ID, cyclically shifted sequences may be transmitted in correspondence to sequences having orthogonality with each other. For example, the beam group ID may correspond to the ZC sequence. More specifically, an amount of cyclic shift of a sequence to be transmitted may correspond to the beam group ID. Further, a root sequence (for example, the root ZC sequence) of the sequence to be transmitted may correspond to the sector ID. In this manner, it is possible to reliably notify the terminal apparatus 300 of the beam group ID and the sector ID when the beam group ID and the sector ID correspond to the ZC sequence.

Hereinafter, the beam group ID and the sector ID corresponding to the ZC sequence will be described.

$N_{ZC}$-1 ZC sequences that uniquely correspond one-to-one with C-RNTIs allocated to the terminal apparatuses 300 in the macro cell are defined if the sequence length $N_{ZC}$ is a prime number. The sequences are allocated to sectors in one-to-one correspondence. That is, one ZC sequence that is a unique ZC sequence corresponding to the C-RNTI and is different for each sector is allocated to each sector.

The ZC sequence allocated to each sector is handled as the root ZC sequence in the sector. Then, a plurality of different orthogonal sequences are generated when cyclic shift is performed using the root ZC sequence as an origin. Each of the cyclically shifted ZC sequences corresponds to the beam group ID within the sector.

Here, it is preferable that an amount of cyclic shift between any two ZC sequences (that is, a difference of amounts of cyclic shifts) satisfy the following relational expression in order to maintain orthogonality within a cell.

Amount of cyclic shift>maximum round trip propagation delay time+multipath delay time This is because, it is possible to avoid collision if the relational expression is satisfied even when one of the two ZC sequences is delayed and the other thereof is not delayed.

In the system 1, a macro cell and a small cell perform cooperative communication according to CU separation. A delay time due to delay dispersion in the small cell and a round trip propagation time from a cell edge are sufficiently small compared to the macro cell. Accordingly, a magnitude of an amount of cyclic shift calculated by the relational expression can be set to a sufficiently small value. That is, ZC sequences that correspond one-to-one with beam group IDs and are orthogonal to each other can be allocated according to an amount of cyclic shift set based on a relational expression from a root ZC sequence allocated to one sector. Therefore, the terminal apparatus 300 specifies the beam group ID based on an amount of cyclic shift and can establish first eNB beamforming synchronization.

Conversely, different root ZC sequences among multiple ZC sequences that uniquely correspond one-to-one with C-RNTIs are allocated between adjacent sectors. Therefore, even when the terminal apparatus 300 has moved to an adjacent sector, it is possible to establish first eNB beamforming synchronization based on a root ZC sequence of a sector after movement and an amount of cyclic shift.

First eNB Beamforming Synchronization Procedure

The small cell base station 100 (for example, the communication control unit 153) transmits a synchronization signal (corresponding to a first synchronization signal) including a beam group ID of a beam group using multiple beams included in the beam group to each beam group candidate. Information about the beam group candidate may be shared in the macro cell base station 200 or the other small cell base station 100. The synchronization signal includes the above-described ZC sequence, and is transmitted using a beam group corresponding to the ZC sequence. The synchronization signal may be used for a cell search.

The small cell base station 100 can sweepingly transmit a synchronization signal. This will be described in detail below.

One synchronization signal is transmitted by using a plurality of beams included in a beam group corresponding to one beam group ID. Therefore, as described above with reference to FIG. 12, one synchronization signal is transmitted to one partial area included in a communication target area (for example, a cell or a sector) of the small cell base station 100. The small cell base station 100 transmits a synchronization signal to each of partial areas included in the communication target area periodically and sequentially over time. That is, a part of the communication target area is covered by one synchronization signal. Also, since the synchronization signal is transmitted sequentially over time, the communication target area is covered part by part sequentially, and as a result, the entire area is covered. In addition, the synchronization signal is periodically transmitted, and thus the entire communication target area is periodically covered. This will be described in detail with reference to FIG. 13.

Figure 13:
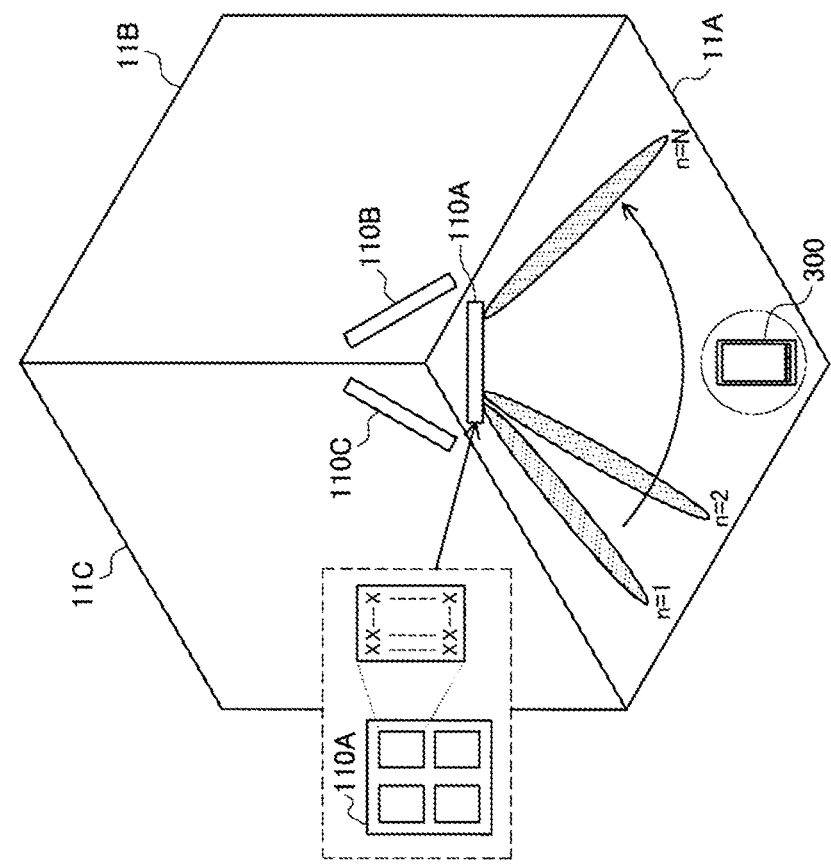
FIG. 13 is a diagram for describing a first eNB beamforming synchronization procedure according to the present embodiment.

FIG. 13 is a diagram for describing a first eNB beamforming synchronization procedure according to the present embodiment. As illustrated in FIG. 13, the small cell base station 100 divides one small cell 11 into three sectors (11A, 11B, and 11C) and allocates an array antenna 110A, 110B or 110C to each sector. For example, the small cell base station 100 communicates with the terminal apparatus 300 included in each of the sectors 11A to 11C by using each of the array antennas 110A to 110C. Transmission of a synchronization signal in the first eNB beamforming synchronization procedure will be described focusing on the array antenna 110A and the sector 11A. As illustrated in FIG. 13, a uniform rectangular panel array (URPA) which is discussed in 3GPP RAN1 meetings is used as a configuration of the array antenna 110A. When an index of a synchronization signal is n, a total number of beam groups is N, and n=1, 2, . . . , N, the small cell base station 100 transmits synchronization signals of indices 1 to N sequentially over time. One synchronization signal transmitted from the array antenna 110A of the small cell base station 100 covers one partial area in the sector 11A (that is, a synchronization signal is transmitted to one partial area of the sector 11A). Also, the synchronization signals of indices 1 to N are transmitted sequentially over time, and thus the entire area of the sector 11A is covered as if swept sequentially over time. In this manner, the fact that the entire area of the sector 11A is covered as if swept in sequence can be understood, from the viewpoint of the array antenna 110A, as comprehensively moving a beam across a 3D direction. This is as if a searchlight of a lighthouse sweeps an entire range of a sector in a 3D manner as described above with reference to FIG. 12. Such a method of sweepingly transmitting a synchronization signal may be periodically repeated a predetermined number of times. In addition, in order to reduce a time for covering the entire area of the sector 11A and avoid blocking from an obstacle, while simultaneously transmitting a plurality of beams, the small cell base station 100 may perform sweeping transmission so that the beams do not overlap. Here, the number of times of repetition, the number of beams sweepingly transmitted at the same time, and the like can be set by, for example, the small cell base station 100.

Meanwhile, as illustrated in FIG. 13, the terminal apparatus 300 receives a beam from the array antenna 110A by using an omnidirectional antenna. As will be described, by using the omnidirectional antenna in an initial access procedure, the terminal apparatus 300 can receive one or a plurality of sweepingly transmitted synchronization signals with ease. Accordingly, the terminal apparatus 300 can first select, a rough and coarse beam (that is, a beam group) in order to establish second eNB beamforming synchronization with a beam which is optimal at the current location.

In addition, a synchronization signal for symbol synchronization and a synchronization signal for frame synchronization besides a synchronization signal for establishing beamforming synchronization may be mapped to synchronization signals. Further, a broadcast signal (for example, Physical Broadcast Channel (PBCH) and a reference signal) necessary for an initial access procedure may be additionally mapped to a synchronization signal.

Sweeping transmission has been described above. Subsequently, a range in which a synchronization signal is transmitted will be described with reference to FIG. 14.

Figure 14:
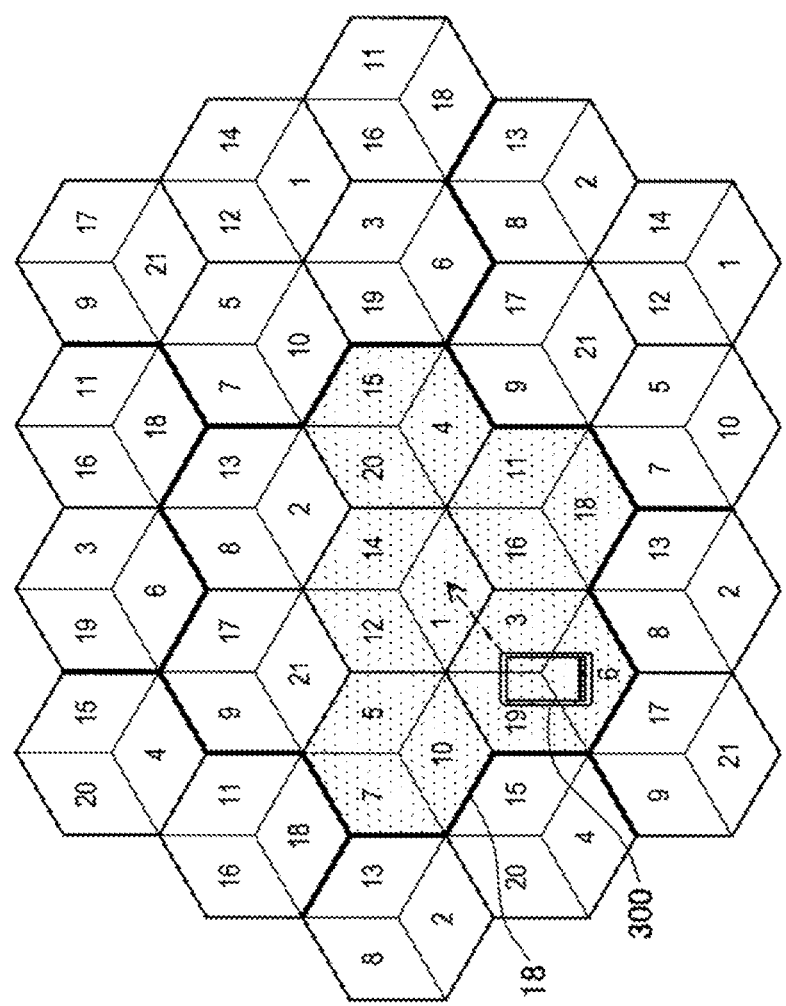
FIG. 14 is a diagram for describing the first eNB beamforming synchronization procedure according to the present embodiment.

FIG. 14 is a diagram for describing the first eNB beamforming synchronization procedure according to the present embodiment. As illustrated in FIG. 14, a cell configuration (or a cell arrangement (deployment scenario)) of 7 cells×3 sectors is used. In addition, it is assumed that a user plane connection request is transmitted to the terminal apparatus 300 as an RRC message of individual signaling (dedicated signaling). As illustrated in FIG. 14, the terminal apparatus 300 has mobility in some cases. The location of the terminal apparatus 300 can be specified to a certain degree through FD-MIMO, but in consideration of mobility of the terminal apparatus 300, a range in which a synchronization signal is transmitted should be determined to have a certain degree of size. Therefore, in the present embodiment, a synchronization signal for the terminal apparatus 300 is transmitted in a range 18 according to mobility of the terminal apparatus 300. In other words, a plurality of small cell base stations 100 within the range 18 transmit synchronization signals to the terminal apparatus 300. That is, when a communication target area of a small cell base station 100 (that is, a cell or a sector) is within the range 18 according to mobility of the terminal apparatus 300, the small cell base station 100 transmits a synchronization signal in the communication target area within the corresponding range. For example, the small cell base station 100 transmits a synchronization signal in the entire communication target area when the entire communication target area is within the range 18, and transmits a synchronization signal in only a part of the communication target area (for example, some of a plurality of sectors) when the corresponding part of the communication target area is within the range 18. The range 18 can have a shape that is long in a direction in which there is a high possibility of the terminal apparatus 300 moving and short in a direction in which there is a low possibility of the terminal apparatus 300 moving. In addition, the range 18 can have a size according to a speed at which the terminal apparatus 300 moves. Accordingly, even when the terminal apparatus 300 moves, it is possible to continuously receive a synchronization signal, and stable communication is possible.

Here, the range 18 corresponds to a plurality of small cells which are some of a plurality of small cells included in a macro cell. That is, a synchronization signal is not transmitted in all the small cells in the macro cell, but is transmitted in only some of the small cells. Accordingly, an area in which a synchronization signal is transmitted is limited, and thus it is possible to effectively use radio resources.

In addition, by sharing the first synchronization information described above, a plurality of small cell base stations 100 can transmit synchronization signals including a ZC sequence to the terminal apparatus 300. The macro cell base station 200 may share a first synchronization signal with only a plurality of small cell base stations 100 included in the range 18, or may instruct the plurality of small cell base stations 100 included in the range 18 to transmit a synchronization signal. In addition, by sharing the second synchronization information described above, the terminal apparatus 300 can learn about a candidate for a received ZC sequence.

A range in which a synchronization signal is transmitted has been described above.

Conversely, the terminal apparatus 300 (the communication control unit 341) transmits a beam group ID of a beam group available for communication with the small cell base station 100 among beam group IDs allocated to beam groups to the small cell base station 100. Accordingly, the small cell base station 100 can learn about the beam group ID of the beam group available for communication with the terminal apparatus 300.

Specifically, the terminal apparatus 300 transmits an acknowledgment including a beam group ID of a beam group available for communication with the small cell base station 100 based on a reception result of the synchronization signal including the beam group ID of the beam group using multiple beams included in the beam group that is transmitted for each beam group to the small cell base station 100. For example, the terminal apparatus 300 first learns about a beam group ID corresponding to an amount of cyclic shift of a ZC sequence that is included in a synchronization signal whose reception quality is most favorable among received synchronization signals as an optimal (that is, an available) beam group ID for communication with the small cell base station 100. Then, the terminal apparatus 300 feeds the learned optimal beam group ID back to the small cell base station 100 as an acknowledgment for the received synchronization signal. The ZC sequence may be used in this feedback. That is, the terminal apparatus 300 may feed back the ZC sequence corresponding to the optimal beam group ID. In this case, feedback signals from the multiple terminal apparatuses 300 within a small cell can be temporally separated.

Figure 15:
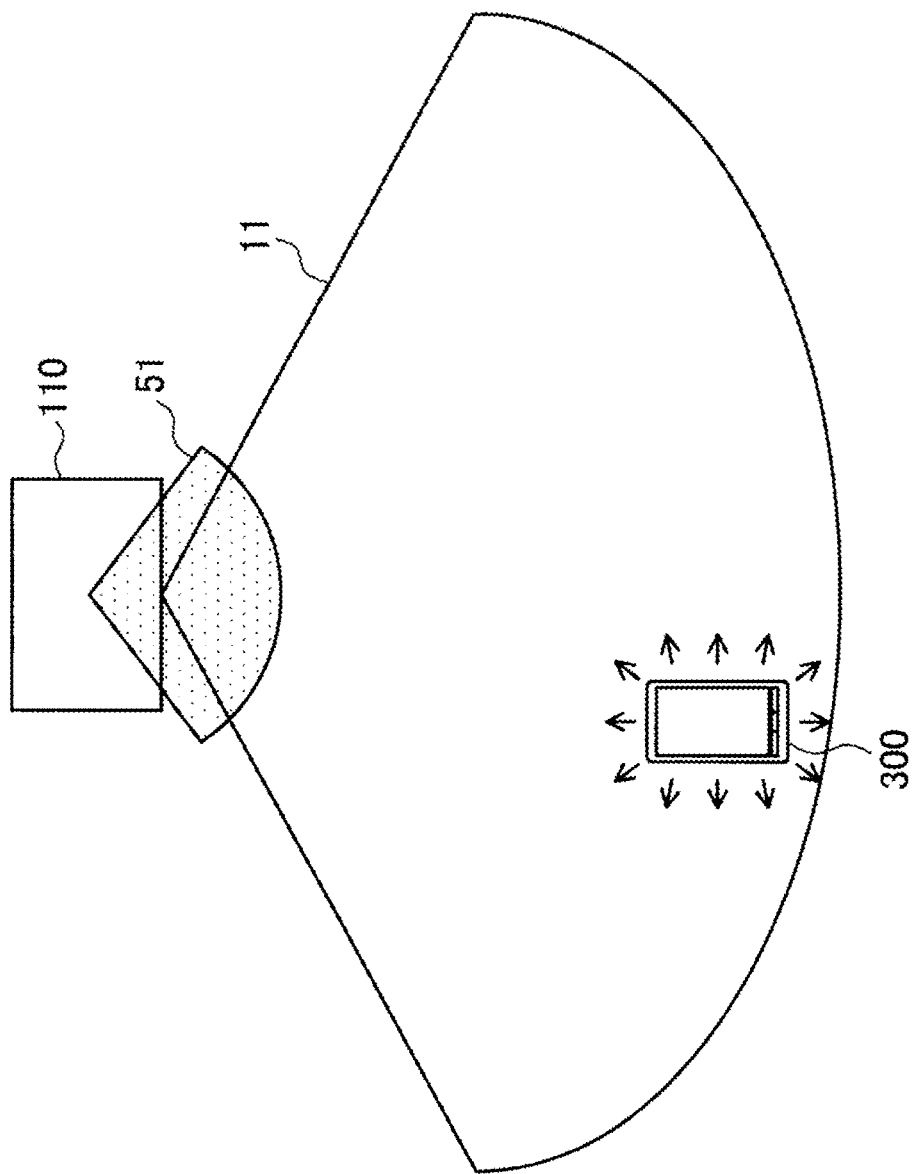
FIG. 15 is a diagram for describing antenna directivity of a small cell base station according to the present embodiment.

The small cell base station 100 receives the acknowledgment for the synchronization signal from the terminal apparatus 300. In order to be able to reliably receive this acknowledgment, the small cell base station 100 sets antenna directivity 51 of the array antenna 110 to quasi-omni directivity as illustrated in FIG. 15. FIG. 15 is a diagram for describing antenna directivity of the small cell base station 100 according to the present embodiment. As illustrated in FIG. 15, the terminal apparatus 300 transmits an ACK signal in all directions by using a quasi-omnidirectional antenna 44 which will be described. Conversely, for the small cell base station 100, the location of the terminal apparatus 300 is unknown, and it is unknown from which direction an ACK signal arrives. Therefore, the small cell base station 100 sets the antenna directivity 51 to quasi-omni directivity in order to be able to reliably receive an ACK signal even when the ACK signal arrives from any location in the sector 11 which is the communication target area. In this case, as one example of a method of setting the antenna directivity 51 to quasi-omni directivity, it is possible to set directivity of respective antennas to different directions without uniforming phases of the directivity.

Then, the small cell base station 100 decides a beam group to be used in communication with the terminal apparatus 300 based on the received acknowledgment and transmits a beam group ID of the beam group to the terminal apparatus 300, which is typically decided as the beam group ID included in the acknowledgment. Accordingly, the terminal apparatus 300 can confirm the beam group that is allocated to the terminal apparatus 300 by the small cell base station 100.

According to such procedures, first eNB beamforming synchronization between the small cell base station 100 and the terminal apparatus 300 is established. Hereinafter, a first eNB beamforming synchronization procedure using a ZC sequence will be described in detail with reference to FIG. 16 and FIG. 17. Here, for simplification, a case of sweepingly transmitting one synchronization signal sequentially over time is used as an example.

Figure 16:
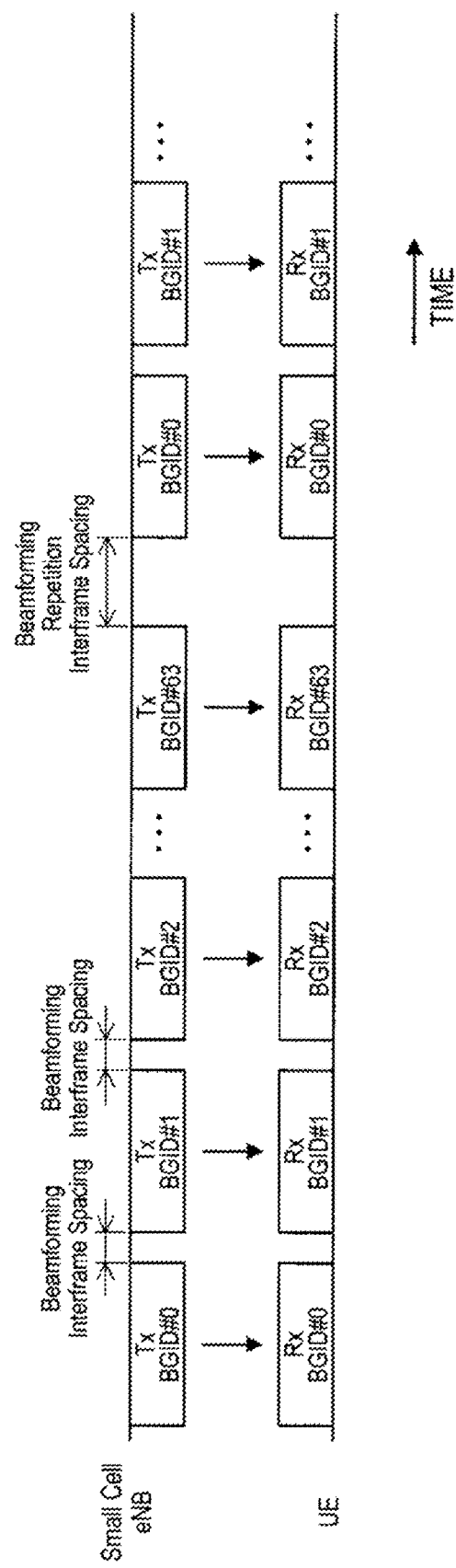
FIG. 16 is a diagram for describing an example of the first eNB beamforming synchronization procedure according to the present embodiment.

FIG. 16 is a diagram for describing an example of the first eNB beamforming synchronization procedure according to the present embodiment. As illustrated in FIG. 16, the small cell base station 100 transmits a synchronization signal including a ZC sequence corresponding to a beam group ID to the terminal apparatus 300 using a beam group corresponding to the beam group ID. Specifically, the small cell base station 100 sequentially transmits multiple ZC sequences that are generated from a root ZC sequence corresponding to a single sector and that correspond to beam groups at intervals of beamforming inter-frame spacing (BIS) using corresponding beam groups. For example, when 64 beam groups are defined, 64 synchronization signals including ZC sequences corresponding to beam groups IDs #0 to #63 are sequentially transmitted. In addition, the small cell base station 100 repeatedly transmits radio frames including multiple ZC sequences of several beam groups at intervals of beamforming repetition inter-frame spacing (BRIS) a predetermined number of times. Here, as for transmission of a synchronization signal, the sweeping transmission described above is performed.

As described above, the terminal apparatus 300 learns about a beam group ID corresponding to an amount of cyclic shift of a ZC sequence whose reception quality is most favorable among received ZC sequences as an optimal beam group ID for communication with the small cell base station 100. Then, the terminal apparatus 300 repeatedly transmits an ACK signal including information indicating the optimal beam group ID to the small cell base station 100 a predetermined number of times. In order to be able to reliably receive this ACK signal, the small cell base station 100 sets antenna directivity to quasi-omni directivity. In addition, the small cell base station 100 repeatedly transmits an ACK signal including information indicating that a feedback of the beam group ID is received, that is, that first eNB beamforming synchronization is established, to the terminal apparatus 300 a predetermined number of times.

Figure 17:
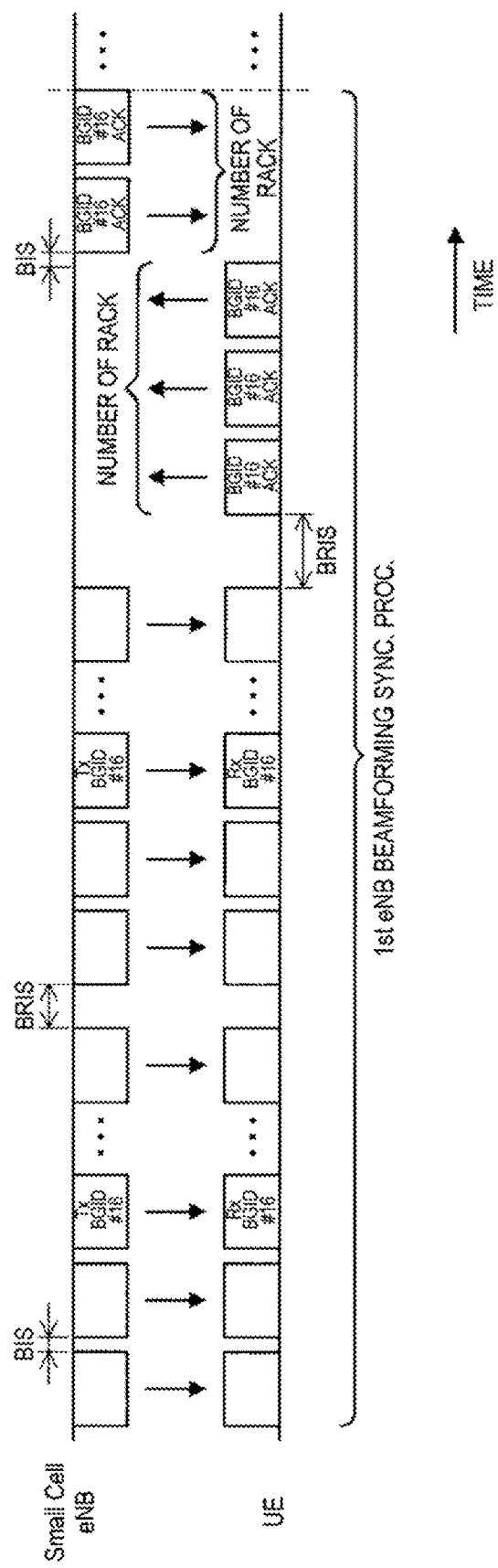
FIG. 17 is a diagram for describing an example of the first eNB beamforming synchronization procedure according to the present embodiment.

FIG. 17 is a diagram for describing an example of the first eNB beamforming synchronization procedure according to the present embodiment. As illustrated in FIG. 17, radio frames including multiple ZC sequences of several beam groups at intervals of BIS are repeatedly transmitted by the small cell base station 100 at intervals of BRIS. Here, as for transmission of a synchronization signal, the sweeping transmission described above is performed. After that, the small cell base station 100 sets antenna directivity to quasi-omni directivity in order to be able to reliably receive an ACK signal from the terminal apparatus 300. Then, when it is determined that reception quality of the beam group of beam group ID #16 is most favorable, the terminal apparatus 300 repeatedly transmits an ACK signal including information indicating the beam group ID #16 to the small cell base station 100 the predetermined number of times (a number of repetition acknowledgement (RACK)). Then, the small cell base station 100 repeatedly transmits the ACK signal including information indicating the beam group ID #16 as an ACK signal indicating that the ACK signal has been received to the terminal apparatus 300 the predetermined number of times.

According to the above procedure, first eNB beamforming synchronization is established.

The above-described BIS, BRIS and number of repetitions are set in advance by the macro cell base station 200, and the small cell base station 100 and the terminal apparatus 300 acquire such information from the macro cell base station 200. In addition, the BIS, the BRIS, and the number of repetitions of the small cell base station 100 side may be the same as or different from those of the terminal apparatus 300 side.

<3.4. TDD/Self-Contained Frame>

TDD

It is assumed that a time division duplex (TDD) scheme is used in Massive-MIMO.

When MU-MIMO according to massive-MIMO is applied, an eNB preferably learns about a channel environment (that is, CSI) of UEs that are scattered in various locations within a cell. Therefore, the eNB individually transmits a signal for CSI measurement to each UE, and each UE is considered to perform CSI measurement and perform CSI feedback on the eNB.

However, a time during which the eNB individually transmits a signal for CSI measurement to all UEs within a cell and receives a CSI feedback from each UE increases according to the number of UEs. Therefore, there is a risk of temporal transmission efficiency being significantly reduced because a delay occurs before transmission and reception of an actual user plane signal start.

In this respect, since frequency bands of an uplink and a downlink are the same in a TDD scheme, the channel environment can be considered to be almost the same when a time difference in transmission and reception is small. Accordingly, when the TDD scheme is used, the eNB can omit a CSI measurement procedure of a downlink with each UE. Accordingly, it is possible to satisfy low latency that is a 5G requirement.

Self-Contained Frame

The small cell base station 100 and the terminal apparatus 300 can start data transmission and reception in a user plane after symbol synchronization, frame synchronization, and first eNB beamforming synchronization are established and initial access is established. Like the first synchronization information and the second synchronization information described above, the terminal apparatus 300 may be notified of system information (master information block (MIB)) and other information (system information block (SIB)) necessary in the small cell base station 100, or the system information and the other information may be transmitted to the terminal apparatus 300 as signaling information in downlink data (DL data) of a user plane in a self-contained frame, which will be described.

The small cell base station 100 (for example, the communication control unit 153) transmits a beam group ID of a beam group that is used to transmit the downlink data along with downlink data. On the other hand, the terminal apparatus 300 (for example, the communication control unit 341) transmits an acknowledgment including a beam group ID of a beam group that is used to receive the downlink data from the small cell base station 100 to the small cell base station 100. Then, the small cell base station 100 receives the acknowledgment including a beam group ID of a beam group that is used by the terminal apparatus 300 with respect to the downlink data to receive the downlink data. In this manner, when the small cell base station 100 and the terminal apparatus 300 notify each other of the beam group ID of the beam group that is used to transmit and receive user data, tracking of first eNB beamforming synchronization, that is, establishment of first eNB beamforming synchronization performed in initial access, can be continuously implemented. For example, when reception quality of the reception side is degraded, the small cell base station 100 can search for an optimal beam group whose reception quality is favorable while changing a beam group to be used for transmission. Specifically, the small cell base station 100 can learn about detailed channel quality by using a signal of a beam group ID and the like of a beam group transmitted as an ACK signal from the terminal apparatus 300, and thus can precode a beam group which is optimal for the terminal apparatus 300. In addition, the small cell base station 100 acknowledges reception of a precoding matrix indicator (PMI) of an optimal beam from the terminal apparatus 300, and thus can track an optimal beam group by using the PMI, like LTE-A. Transmission of the beam group ID may be performed by transmission of the above-described ZC sequence. In this case, it is possible to continuously establish frame synchronization, timing synchronization and first eNB beamforming synchronization with ease.

For a user plane signal, the self-contained frame is being presently discussed in 5G meetings (as of June 2016) as a configuration of a radio frame of the TDD scheme for satisfying the above-described low latency requirement. The small cell base station 100 may perform transmission of downlink data and a beam group ID and reception of an acknowledgment in a single self-contained frame. Here, the self-contained frame may be a subframe of the TDD scheme. Hereinafter, an example of a configuration of the self-contained frame will be described with reference to FIG. 18 and FIG. 19.

Figure 18:
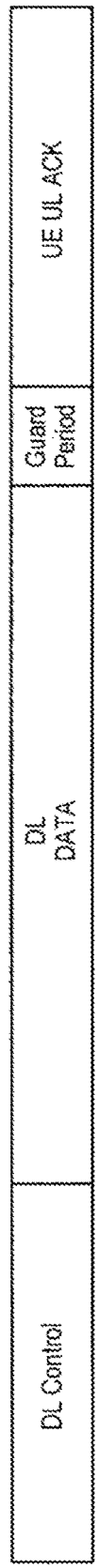
FIG. 18 is a diagram illustrating an example of a configuration of a general self-contained frame.

FIG. 18 is a diagram illustrating an example of a configuration of a general self-contained frame. As illustrated in FIG. 18, one radio frame includes downlink control information (DL Control), downlink data (DL DATA), a guard period and a UE uplink acknowledgment (UE UL ACK). The terminal apparatus 300 performs a reception process of downlink data at a high speed, and includes a response thereof in a UE uplink acknowledgment in the same radio frame.

Figure 19:
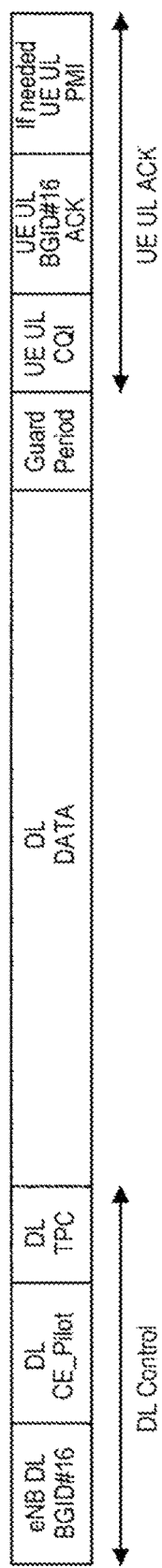
FIG. 19 is a diagram illustrating an example of a configuration of a self-contained frame according to the present embodiment.

FIG. 19 is a diagram illustrating an example of a configuration of the self-contained frame according to the present embodiment. As illustrated in FIG. 19, downlink control information includes a beam group ID (eNB DL BGID) of a DL signal in which first eNB beamforming synchronization is currently established. In addition, a UE uplink acknowledgment includes a beam group ID (UE UL BGID) of a DL signal in which first eNB beamforming synchronization is currently established. In this manner, the beam group ID in which first eNB beamforming synchronization is established in a self-contained frame is transmitted and received. In addition, as necessary, a downlink channel estimation (CE) pilot, a UE uplink channel quality indicator (CQI), a UE uplink precoding matrix indicator (PMI) and the like may be included in the downlink control information or the UE uplink acknowledgment and transmitted and received. As described above, in beam tracking of first eNB beamforming synchronization, an optimal beam group may be searched for on an initiative of the terminal apparatus 300 according to the PMI, or an optimal beam group may be searched for on an initiative of the small cell base station 100 by precoding an optimal beam group according to the CQI and a beam group ID signal of a beam group transmitted as an ACK signal.

<3.5. UE Beamforming>

Combination of Directional Antenna and Quasi-Omnidirectional Antenna

The terminal apparatus 300 (for example, the antenna unit 310) according to the present embodiment includes a directional antenna and an omnidirectional antenna. Then, while communicating with the small cell base station 100 using the omnidirectional antenna, the terminal apparatus 300 (for example, the communication control unit 341) selectively (that is, optionally) communicates with the small cell base station 100 using the directional antenna. Accordingly, the terminal apparatus 300 can perform communication at a high data rate as necessary while stably communicating with the small cell base station 100. The omnidirectional antenna may be exactly a quasi-omnidirectional (Quasi-Omni) antenna. Hereinafter, beamforming performed by the terminal apparatus 300 will also be referred to as UE beamforming.

Hereinafter, first, a simulation performed with a directional antenna will be described with reference to FIG. 20 and FIG. 21.

Figure 20:
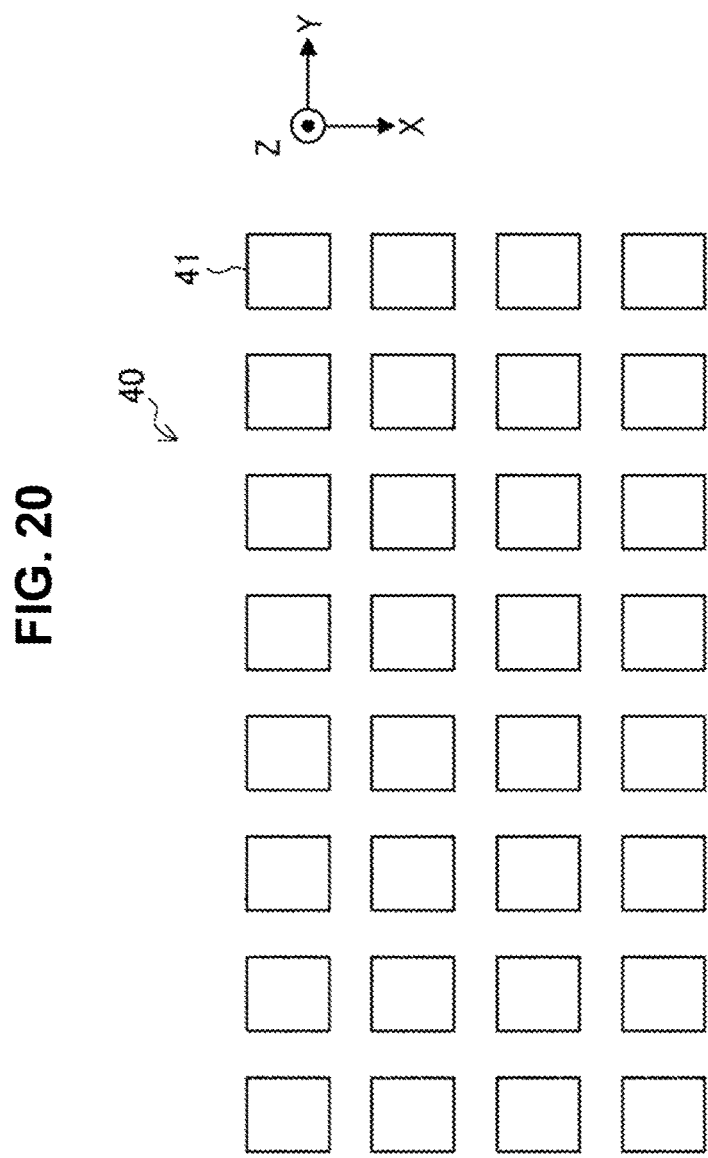
FIG. 20 is a diagram for describing a simulation environment of a directional antenna.

FIG. 20 is a diagram for describing a simulation environment of a directional antenna. As illustrated in FIG. 20, in the simulation environment, a patch antenna 40 including a total of 32 (4×8) antenna elements 41 is used. In a present 5G key performance indicator (KPI) (as of June 2016), the number of antenna elements to be installed in UE is 32 in a 30 GHz band and in a 4 GHz band is 8.

Figure 21:
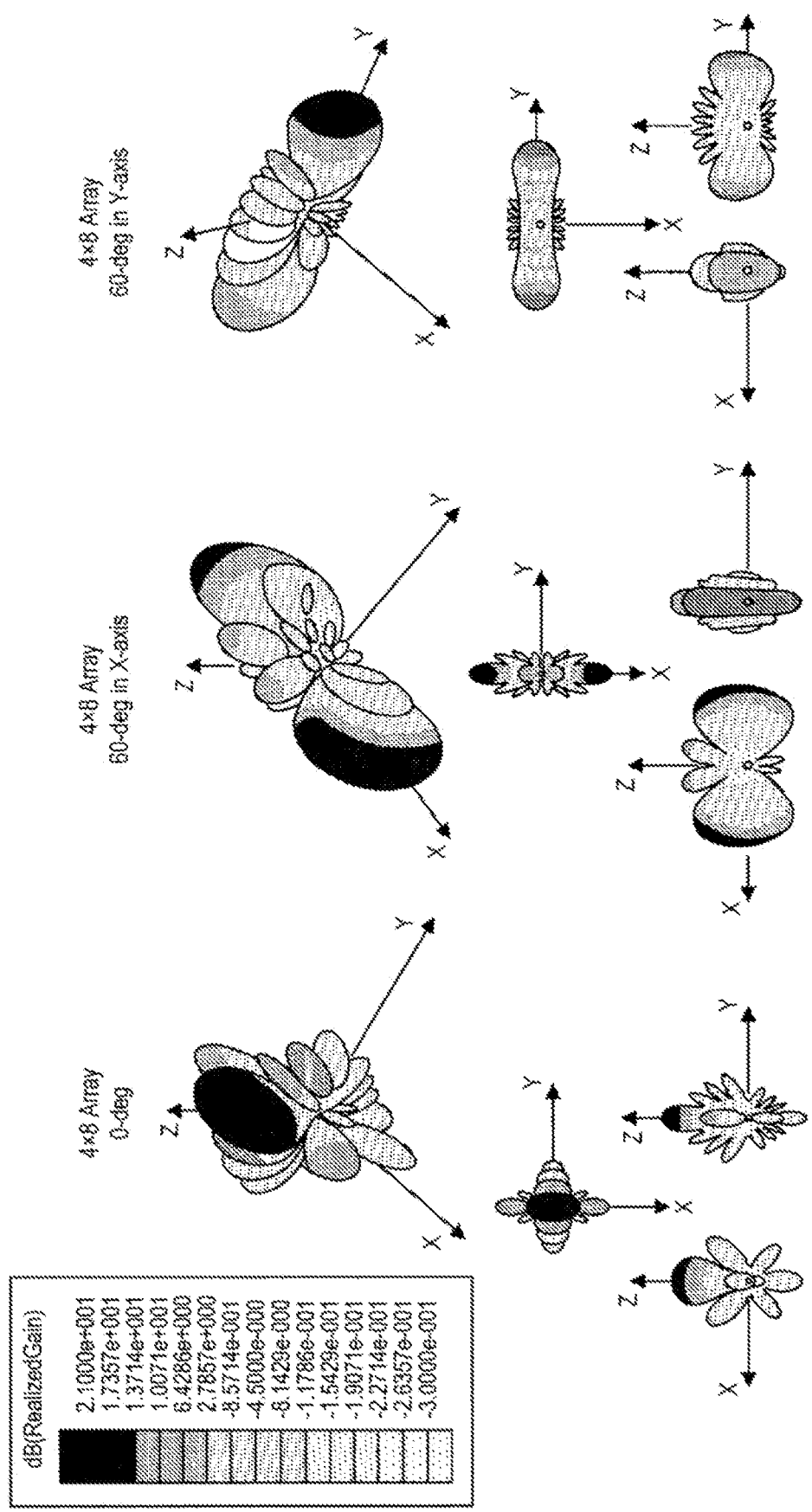
FIG. 21 is a diagram for describing simulation results of a directional antenna.

FIG. 21 is a diagram for describing simulation results of a directional antenna. In FIG. 21, antenna patterns formed by a patch array shown in FIG. 20 are illustrated. As illustrated in FIG. 21, it should be understood that, an antenna pattern is stably formed only in a Z axis direction in a 4×8 patch array. However, since UE is a mobile terminal and is handled by a user in various manners, it is preferable to stably form an antenna pattern in all directions.

Here, the terminal apparatus 300 according to the present embodiment includes a directional antenna and a quasi-omnidirectional antenna. Hereinafter, an example of an antenna configuration of the terminal apparatus 300 will be described with reference to FIG. 22.

Figure 22:
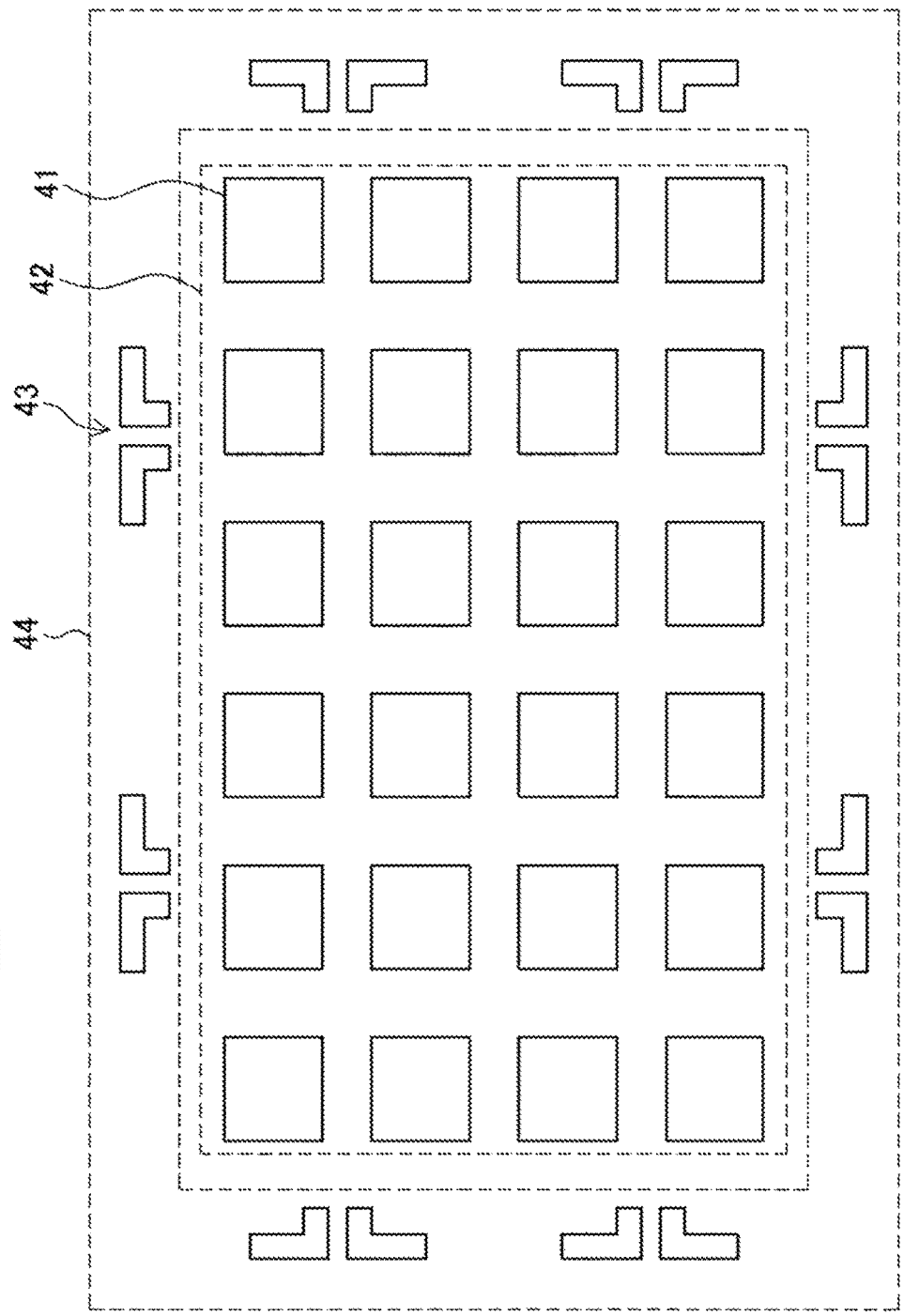
FIG. 22 is a diagram illustrating an example of an antenna configuration of the terminal apparatus according to the present embodiment.

FIG. 22 is a diagram illustrating an example of an antenna configuration of the terminal apparatus 300 according to the present embodiment. As illustrated in FIG. 22, the antenna unit 310 according to the present embodiment includes a patch antenna 42 including a total of 24 (4×6) antenna elements 41 and a quasi-omnidirectional antenna 44 including 8 antenna elements 43.

When the terminal apparatus 300 is powered on and initially establishes connection with the small cell base station 100, it receives the above-described synchronization signal using the quasi-omnidirectional antenna. By using the quasi-omnidirectional antenna, the terminal apparatus 300 can easily receive a synchronization signal for eNB beamforming synchronization even in a situation in which eNB beamforming synchronization is not established. Here, the synchronization signal for eNB beamforming synchronization may include a synchronization signal transmitted through massive-MIMO (5G) and FD-MIMO (LTE), that is, from the small cell base station 100 and the macro cell base station 200. The terminal apparatus 300 establishes symbol synchronization, frame synchronization and first eNB beamforming synchronization as an initial access procedure. As described above, the terminal apparatus 300 can approximately predict a symbol synchronization timing and a frame synchronization timing with the small cell in relation to the macro cell. Then, the terminal apparatus 300 reliably receives the synchronization signal sweepingly transmitted by the quasi-omnidirectional antenna, and thus can rapidly establish first eNB beamforming synchronization, which is symbol synchronization, frame synchronization and beamforming synchronization, with accuracy.

The terminal apparatus 300 may perform UE beamforming using the directional antenna (for example, the patch antenna 42). In this case, the terminal apparatus 300 can further improve quality of communication with the small cell base station 100. The UE beamforming is performed after first eNB beamforming synchronization is established.

Here, the small cell base station 100 or the macro cell base station 200 determines whether UE beamforming is performed in the terminal apparatus 300 based on a channel environment within the small cell. Therefore, the following two communication modes are provided according to an actual field channel environment within the small cell.

In a first communication mode, the small cell base station 100 performs first eNB beamforming for communication. In addition, the terminal apparatus 300 performs communication using the quasi-omnidirectional antenna without beamforming.

In a second communication mode, the small cell base station 100 performs first eNB beamforming for communication. In addition, the terminal apparatus 300 performs communication using the quasi-omnidirectional antenna and performs communication by performing UE beamforming using the directional antenna in parallel therewith.

In the second communication mode, since 2-stream MIMO communication is performed in parallel, it is possible to achieve a very high data rate. Here, UE beamforming is optional. In general, the first communication mode is used and transition to the second communication mode is attempted when UE beamforming is necessary or available. If a radio link of the UE beamforming is disconnected, the mode is returned to the first communication mode, and transition to the second communication mode is attempted again when beamforming is necessary or available thereafter.

Conversely, in the first communication mode, only 1-stream MIMO communication, that is, massive-MIMO communication according to a so-called 5G small cell eNB, is performed. However, in the first communication mode, it is preferable to maintain a stable radio link constantly after connection is established once since only the 1-stream MIMO communication is performed.

It is preferable that the terminal apparatus 300 perform communication with the small cell base station 100 by using an omnidirectional antenna at least at a time of an initial access procedure and a handover procedure. By using an omnidirectional antenna during an initial access procedure, it is possible to rapidly establish first eNB beamforming synchronization as described above. In addition, by using an omnidirectional antenna during a handover procedure, it is possible to receive beams from a plurality of directions of a handover source and a handover destination with ease as will be described, and CoMP is also possible.

Hereinafter, the first communication mode and the second communication mode will be described in further detail with reference to FIG. 23 to FIG. 25.

Figure 23:
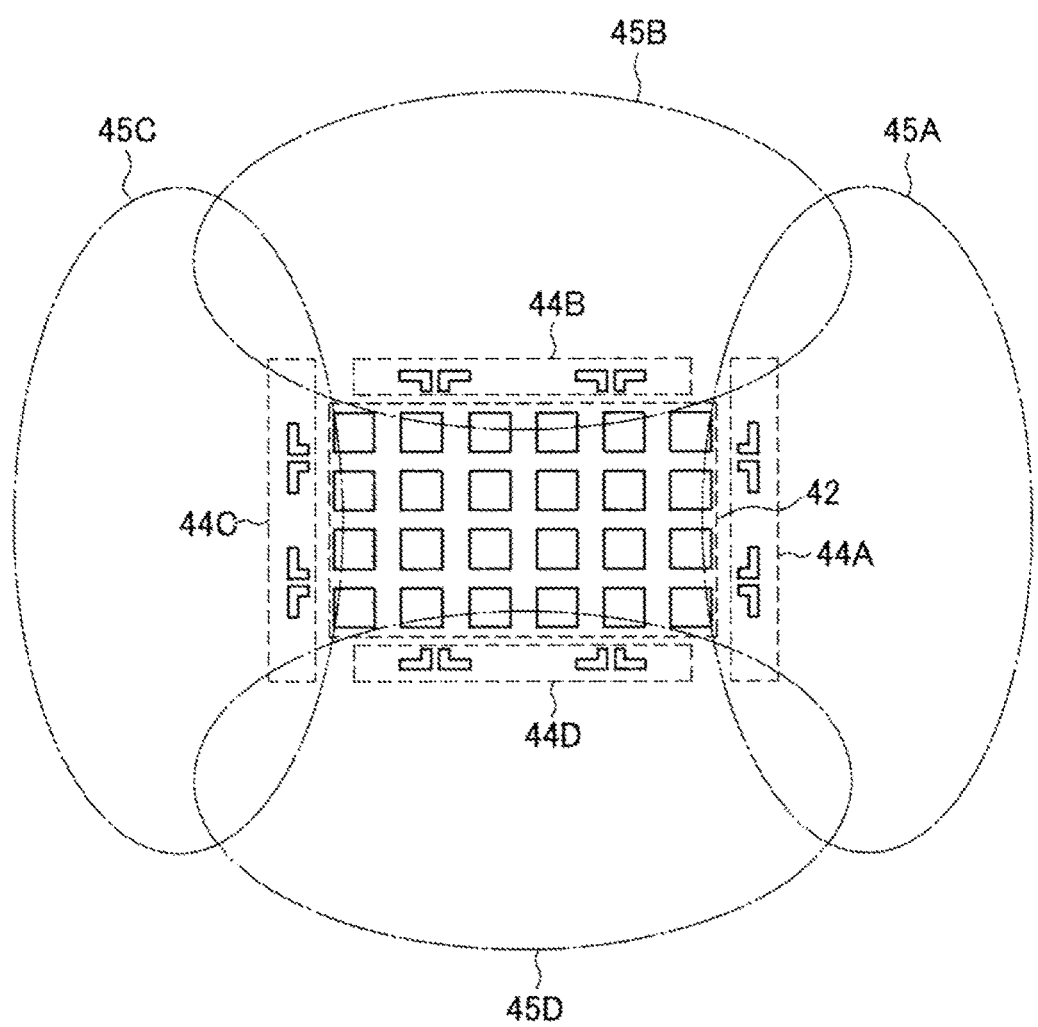
FIG. 23 is a diagram illustrating an example of an antenna directivity pattern formed by the terminal apparatus according to the present embodiment.

FIG. 23 is a diagram illustrating an example of an antenna directivity pattern formed in the first communication mode by the terminal apparatus 300 according to the present embodiment. As illustrated in FIG. 23, the terminal apparatus 300 forms four antenna directivity patterns 45 by the quasi-omnidirectional antenna 44. Specifically, the terminal apparatus 300 forms an antenna directivity pattern 45A by a quasi-omnidirectional antenna 44A, forms an antenna directivity pattern 45B by a quasi-omnidirectional antenna 44B, forms an antenna directivity pattern 45C by a quasi-omnidirectional antenna 44C, and forms an antenna directivity pattern 45D by a quasi-omnidirectional antenna 44D. In this manner, antenna directivity patterns are formed in all directions by the four antenna directivity patterns 45.

Figure 24:
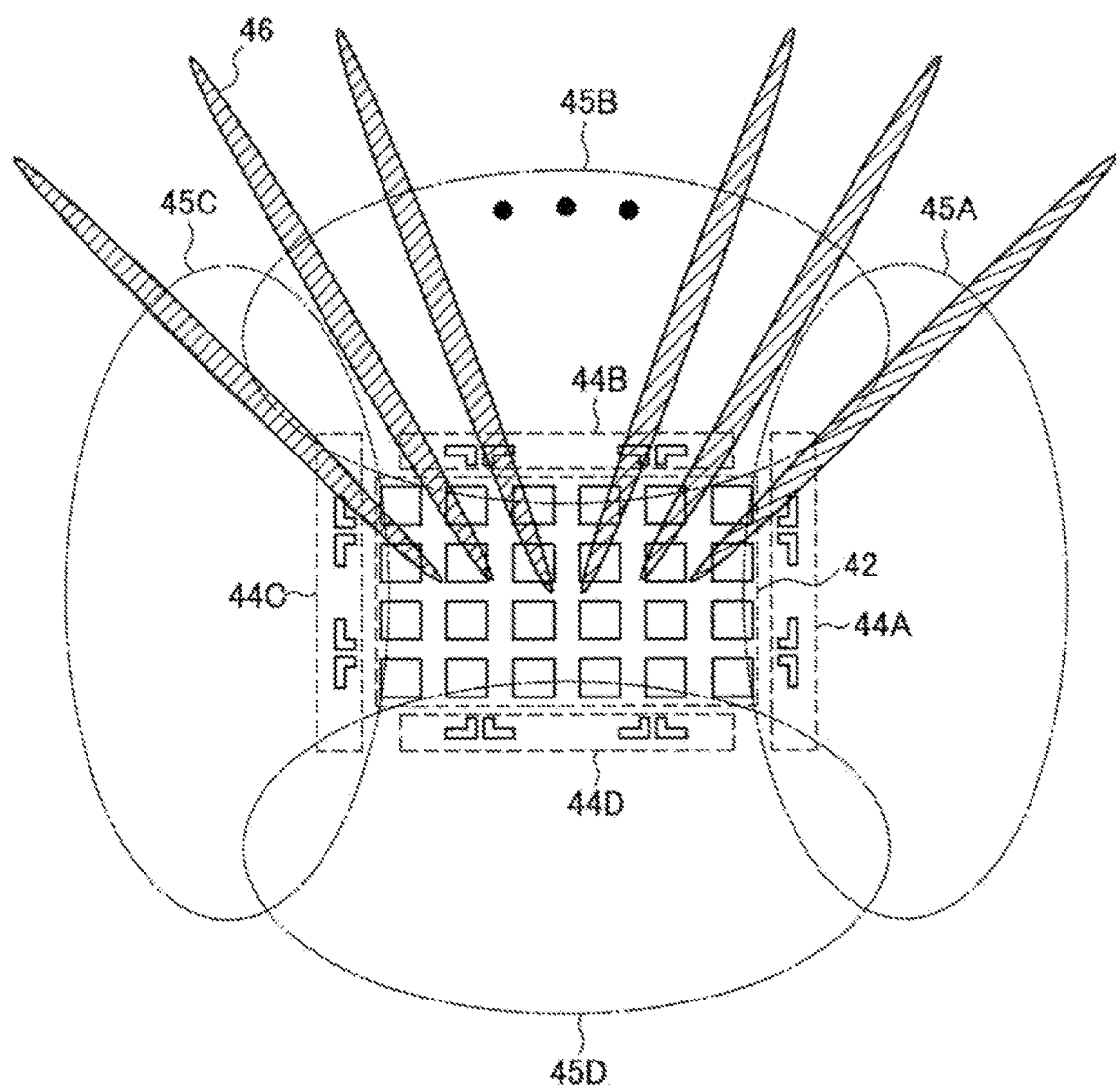
FIG. 24 is a diagram illustrating an example of an antenna directivity pattern formed by the terminal apparatus according to the present embodiment.

FIG. 24 is a diagram illustrating an example of an antenna directivity pattern formed in the second communication mode by the terminal apparatus 300 according to the present embodiment. As illustrated in FIG. 24, the terminal apparatus 300 forms the antenna directivity pattern 45 in all directions by the quasi-omnidirectional antenna 44. Then, antenna directivity patterns are formed in all directions according to the four antenna directivity patterns 45. Further, the terminal apparatus 300 forms multiple beams 46 by the patch antenna 42.

Figure 25:
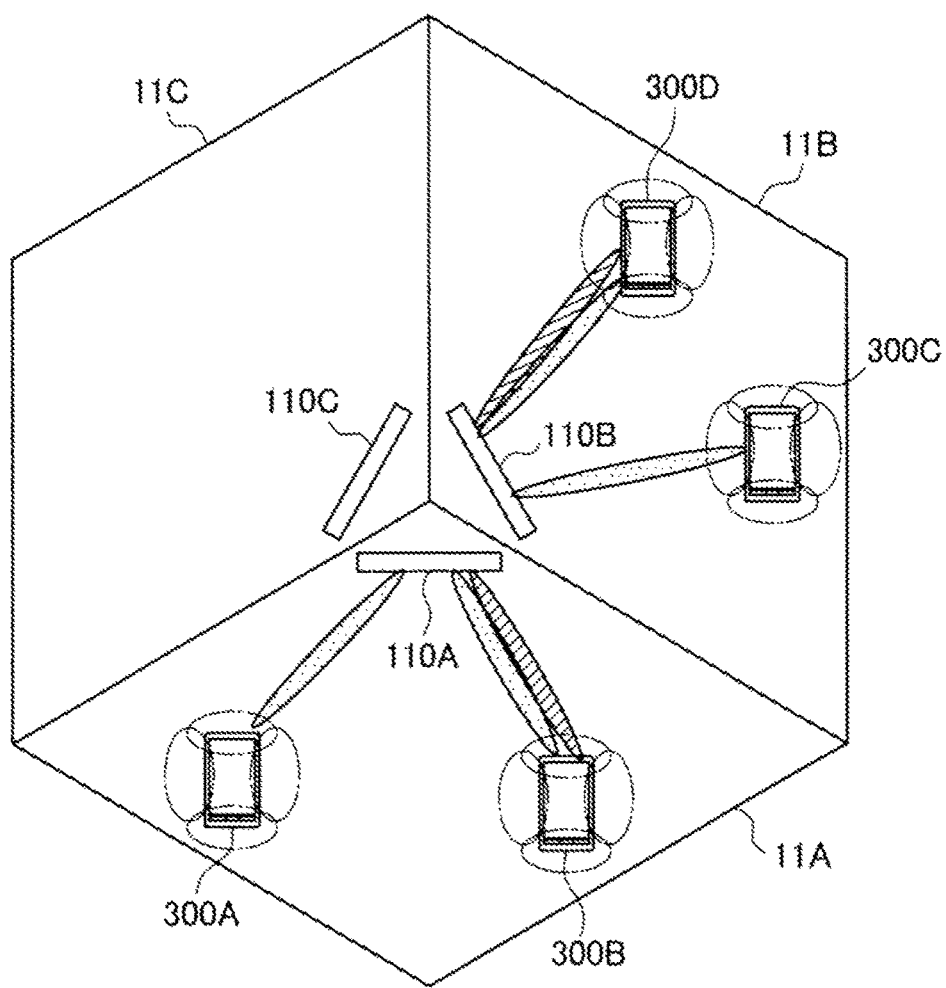
FIG. 25 is a diagram for describing a first communication mode and a second communication mode according to the present embodiment.

FIG. 25 is a diagram for describing the first communication mode and the second communication mode according to the present embodiment. As illustrated in FIG. 25, the small cell base station 100 divides one small cell 11 into three sectors (11A, 11B and 11C) and allocates an array antenna 110A, 110B or 110C to each sector. For example, the small cell base station 100 uses the array antenna 110A and communicates with the terminal apparatuses 300A and 300B within the sector 11A by performing first eNB beamforming. In addition, the small cell base station 100 uses the array antenna 110B and communicates with terminal apparatuses 300C and 300D within the sector 11B by performing first eNB beamforming. On the other hand, the terminal apparatus 300A and the terminal apparatus 300C perform communication using their omnidirectional antennas. That is, the terminal apparatuses 300A and 300C are operated in the first communication mode. Beams from the small cell base station 100 capture the terminal apparatuses 300A and 300C that are operated in the first communication mode. Accordingly, it is possible to achieve a high data rate according to massive-MIMO. In addition, the terminal apparatus 300B and the terminal apparatus 300D perform communication using an omnidirectional antenna and a directional antenna. That is, the terminal apparatuses 300B and 300D are operated in the second communication mode. Beams from the small cell base station 100 capture the terminal apparatuses 300B and 300D that are operated in the second communication mode and beams from the terminal apparatuses 300B and 300D that are operated in the second communication mode capture the small cell base station 100. In this manner, since 2-stream MIMO communication is performed in parallel, it is possible to achieve a very high data rate.

A beamforming synchronization procedure of UE beamforming is similar to the first eNB beamforming synchronization procedure. However, a beam group may not be formed in the terminal apparatus 300 since the number of antenna elements is small. A beam ID (corresponding to second identification information) is allocated as identification information to a beam formed by the terminal apparatus 300.

Information for UE Beamforming Synchronization

The terminal apparatus 300 (for example, the communication control unit 341) transmits information for UE beamforming synchronization to the small cell base station 100. More specifically, the terminal apparatus 300 transmits a beam ID of a beam used in communication with the small cell base station 100 among beam IDs allocated to multiple beams that are formed by the directional antenna to the small cell base station 100. Accordingly, the small cell base station 100 can learn about the beam ID of the beam used in communication with the small cell base station 100.

Here, the terminal apparatus 300 transmits a beam ID using a beam corresponding to the beam. For example, the beam ID that is included in a synchronization signal, which will be described. and the above-described self-contained frame is transmitted using a beam corresponding to the beam ID. Accordingly, the small cell base station 100 can learn about the beam ID of the beam when the beam is received. In addition, it is possible to establish UE beamforming synchronization based on the synchronization signal, which will be described, and it is possible to track UE beamforming synchronization based on the self-contained frame.

In the beam ID, cyclically shifted sequences may be transmitted in correspondence to sequences having orthogonality with each other. For example, the beam ID may correspond to the ZC sequence. More specifically, an amount of cyclic shift of a sequence to be transmitted may correspond to the beam ID. In this manner, it is possible to reliably notify the small cell base station 100 of the beam ID when the beam ID corresponds to the ZC sequence.

ZC sequences that uniquely correspond one-to-one with C-RNTIs allocated to the terminal apparatuses 300 are allocated in advance for UE beamforming. When the ZC sequence is used as a root sequence and an amount of cyclic shift corresponding to a beam ID is used, ZC sequences that correspond one-to-one with beam IDs of beams that are formed by the terminal apparatus 300 and are orthogonal to each other are allocated. The small cell base station 100 or the macro cell base station 200 may allocate the ZC sequence and an amount of cyclic shift. Here, as described above in the paragraph "First eNB beamforming synchronization procedure," a sweeping transmission method of a synchronization signal for UE beamforming may also be periodically repeated a predetermined number of times. Likewise, in order to reduce a sweep time and avoid blocking from an obstacle, while simultaneously transmitting a plurality of beams, the terminal apparatus 300 may perform sweeping transmission so that the beams do not overlap. Here, the number of times of repetition, the number of beams sweepingly transmitted at the same time, and the like can be set by, for example, the terminal apparatus 300.

UE Beamforming Synchronization Procedure

The terminal apparatus 300 (for example, the communication control unit 341) performs transmission of a synchronization signal (corresponding to a second synchronization signal) including a beam ID of a beam using the beam with respect to the candidate beams. The synchronization signal includes the above-described ZC sequence and is transmitted using a beam corresponding to the ZC sequence.

Figure 26:
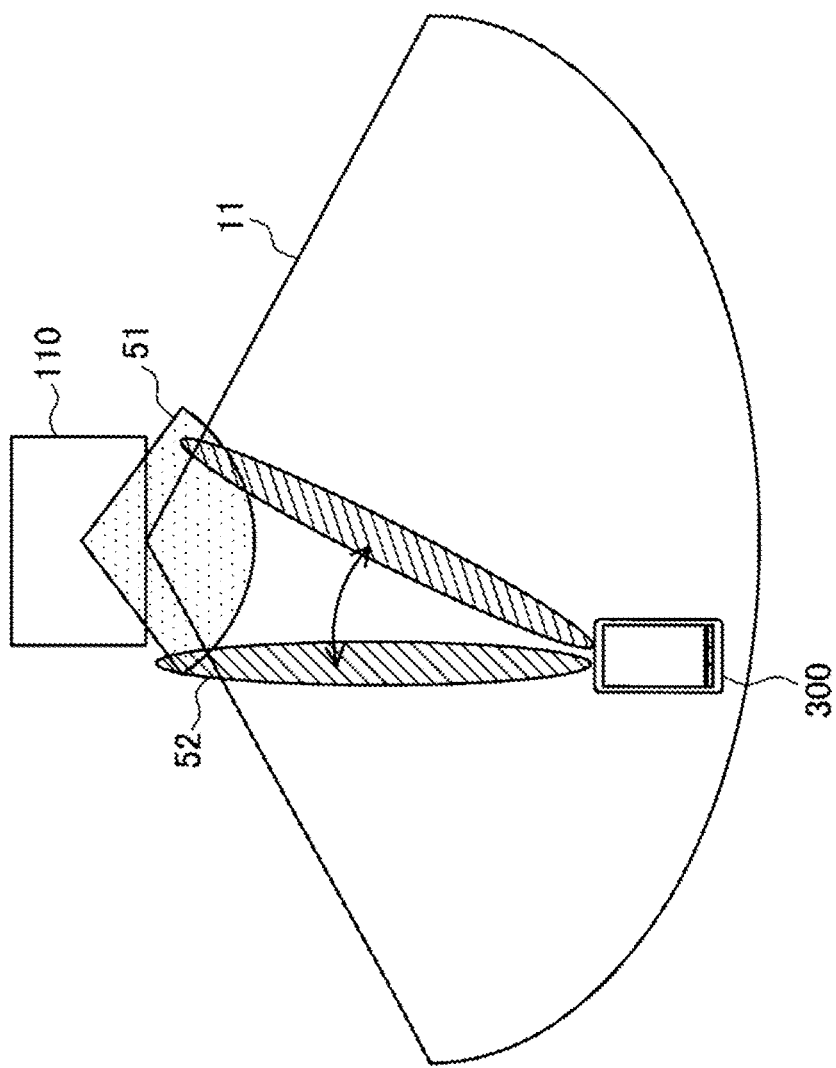
FIG. 26 is a diagram for describing antenna directivity of a small cell base station according to the present embodiment.

In order to be able to reliably receive this synchronization signal, the small cell base station 100 sets the antenna directivity 51 of the array antenna 110 to quasi-omni directivity as shown in FIG. 26. FIG. 26 is a diagram for describing antenna directivity of the small cell base station 100 according to the present embodiment. As shown in FIG. 26, the terminal apparatus 300 forms a beam 52 by using a directional antenna and transmits a synchronization signal in each direction. Conversely, for the small cell base station 100, first eNB beamforming synchronization is established, and thus it seems that a direction in which a synchronization signal arrives is known already. However, the directional antenna 42 and the quasi-omnidirectional antenna 44 of the terminal apparatus 300 shown in FIG. 22 are provided at different locations and/or angles in some cases. In these cases, the relationship between the quasi-omnidirectional antenna 44 of the terminal apparatus 300 and the small cell base station 100 and the relationship between the directional antenna 42 of the terminal apparatus 300 and the small cell base station 100 may be different. That is, a direction of a synchronization signal transmitted from the small cell base station 100 in the first eNB beamforming synchronization procedure and a direction of a synchronization signal arriving at the small cell base station 100 in a UE beamforming synchronization procedure differ in some cases. Therefore, even when first eNB beamforming synchronization has been established, it should be noted that, for the small cell base station 100, it is uncertain from which direction a synchronization signal arrives. Therefore, the small cell base station 100 sets the antenna directivity 51 to quasi-omni directivity in order to be able to reliably receive a synchronization signal even when the synchronization signal arrives from any location in the sector 11 that is a communication target area.

Conversely, the small cell base station 100 (for example, the communication control unit 153) transmits a beam ID of a beam available for communication with the terminal apparatus 300 among beam IDs that are allocated to beams formed by the terminal apparatus 300 to the terminal apparatus 300. Accordingly, the terminal apparatus 300 can learn about the beam ID of the beam available for communication with the small cell base station 100.

Specifically, the small cell base station 100 transmits an acknowledgment including the beam ID of the beam available for communication with the terminal apparatus 300 based on a reception result of the synchronization signal that is transmitted for each beam and includes the beam ID of the beam using the beam to the terminal apparatus 300. For example, the small cell base station 100 first learns about a beam ID corresponding to an amount of cyclic shift of a ZC sequence that is included in a synchronization signal whose reception quality is most favorable among received synchronization signals as an optimal (that is, an available) beam ID for communication with the terminal apparatus 300. Then, the small cell base station 100 feeds the learned optimal beam ID back to the terminal apparatus 300 as an acknowledgment for the received synchronization signal. The ZC sequence may be used in this feedback. That is, the small cell base station 100 may feedback the ZC sequence corresponding to the optimal beam ID. In this case, it is possible to temporally separate feedback signals to the multiple terminal apparatuses 300 within a small cell.

The terminal apparatus 300 receives the acknowledgment for the synchronization signal from the small cell base station 100. Then, the terminal apparatus 300 decides a beam to be used in communication with the small cell base station 100 based on the acknowledgment for the synchronization signal from the small cell base station 100 and transmits the ACK signal including a beam ID of the beam to the small cell base station 100 and which is typically decided as the beam ID included in the acknowledgment. Accordingly, the small cell base station 100 can confirm the beam that is allocated to the small cell base station 100 by the terminal apparatus 300.

Figure 27:
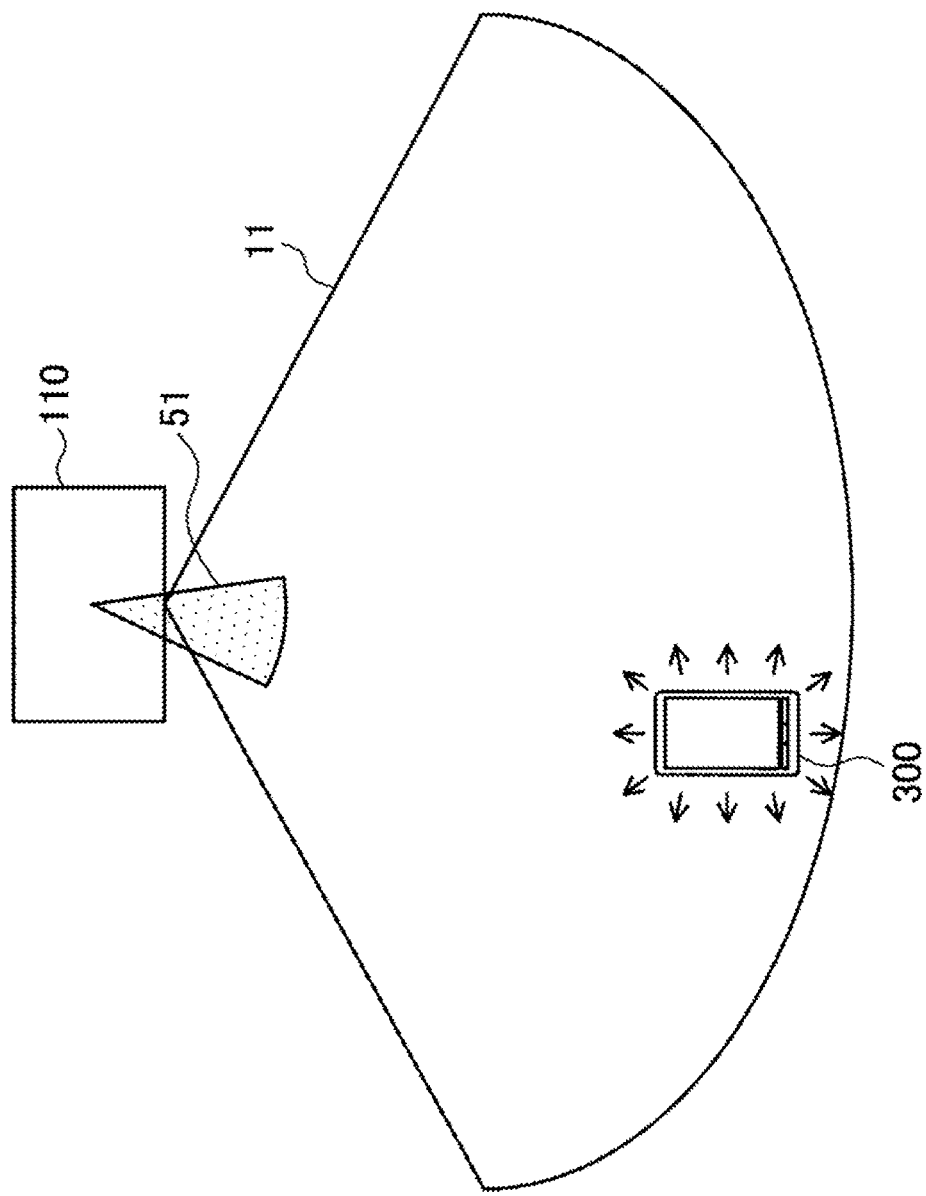
FIG. 27 is a diagram for describing antenna directivity of a small cell base station according to the present embodiment.

In order to receive this ACK signal, as shown in FIG. 27, the small cell base station 100 sets the antenna directivity 51 of the array antenna 110 to be narrow according to the location of the terminal apparatus 300 so as to be able to reliably receive the ACK signal from the terminal apparatus 300. FIG. 27 is a diagram for describing antenna directivity of the small cell base station 100 according to the present embodiment. As shown in FIG. 27, the terminal apparatus 300 transmits an ACK signal in all directions by using the quasi-omnidirectional antenna 44. Conversely, for the small cell base station 100, first eNB beamforming synchronization has been established, and thus a direction in which a synchronization signal arrives is known already. This is because the ACK signal is transmitted by using the quasi-omnidirectional antenna 44 which has been used in the first eNB beamforming synchronization procedure. Therefore, the small cell base station 100 narrows and sets the antenna directivity 51 to a direction in which the ACK signal arrives. That is, it is unnecessary for the small cell base station 100 to set the antenna directivity 51 to quasi-omni directivity.

According to such procedures, UE beamforming synchronization between the small cell base station 100 and the terminal apparatus 300 is established. Hereinafter, a UE beamforming synchronization procedure will be described in detail with reference to FIG. 28.

Figure 28:
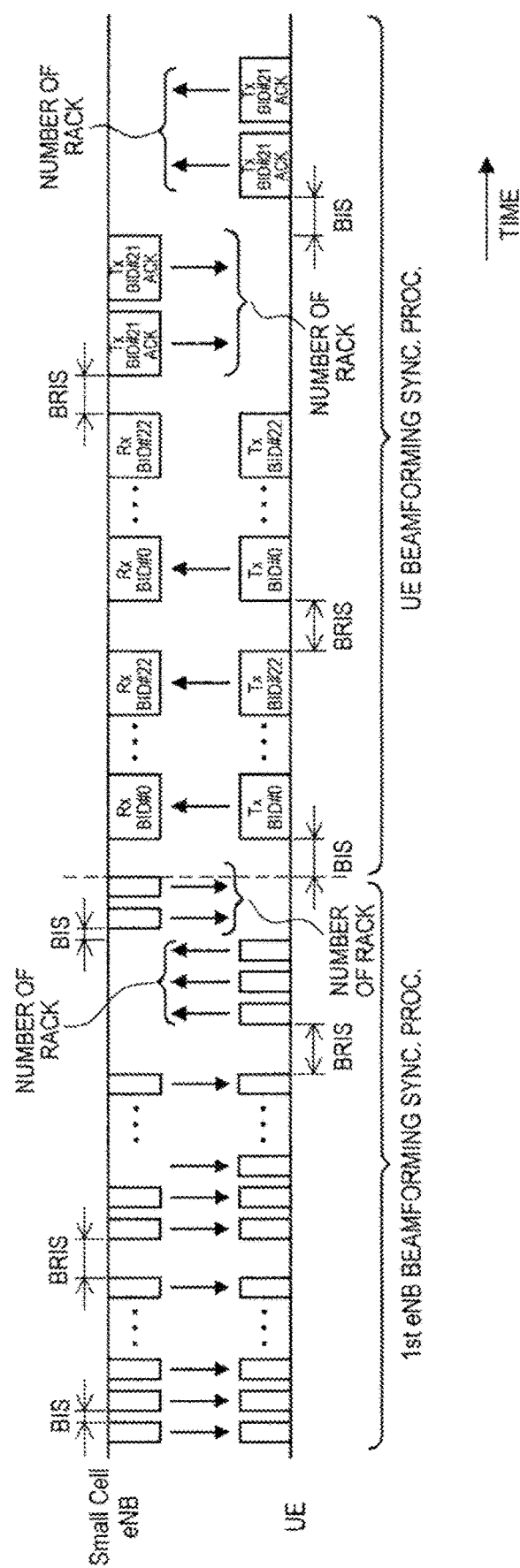
FIG. 28 is a diagram for describing an example of a UE beamforming synchronization procedure according to the present embodiment.

FIG. 28 is a diagram for describing an example of the UE beamforming synchronization procedure according to the present embodiment. Here, for simplification, a case of sweepingly transmitting one synchronization signal sequentially over time is described. As illustrated in FIG. 28, first, the small cell base station 100 and the terminal apparatus 300 establish first eNB beamforming synchronization. Since the first eNB beamforming synchronization procedure is the same as that in the above description, details thereof will not be described here. Then, the UE beamforming synchronization procedure is performed. Specifically, first, the terminal apparatus 300 transmits a synchronization signal including a ZC sequence corresponding to a beam ID to the small cell base station 100 using a beam corresponding to the beam ID. Specifically, the terminal apparatus 300 sequentially transmits multiple ZC sequences that are generated from a root ZC sequence allocated to the terminal apparatus 300 and that correspond to beam IDs of beams at intervals of BIS using corresponding beams. For example, when 23 beams are formed, the terminal apparatus 300 sequentially transmits 23 synchronization signals including ZC sequences corresponding to beam IDs #0 to #22. In addition, the terminal apparatus 300 repeatedly transmits radio frames including multiple ZC sequences corresponding to the number of beams at intervals of BRIS a predetermined number of times. In order to be able to reliably receive this synchronization signal, the small cell base station 100 sets antenna directivity to quasi-omni directivity.

The small cell base station 100 learns about a beam ID corresponding to an amount of cyclic shift of a ZC sequence whose reception quality is most favorable among received ZC sequences as an optimal beam ID for communication with the terminal apparatus 300. Then, the small cell base station 100 repeatedly transmits an ACK signal including information indicating the optimal beam ID to the terminal apparatus 300 a predetermined number of times. For example, the small cell base station 100 determines that reception quality of a beam of a beam ID #21 is most favorable, and repeatedly transmits an ACK signal including information indicating the beam ID #21 to the terminal apparatus 300 the predetermined number of times (a number of eNB RACK). In addition, the terminal apparatus 300 repeatedly transmits an ACK signal including information indicating that a feedback of the beam ID is received, that is, that UE beamforming synchronization is established, to the small cell base station 100 a predetermined number of times. For example, the terminal apparatus 300 repeatedly transmits an ACK signal including information indicating the beam ID #21 to the small cell base station 100 the predetermined number of times. In order to receive this ACK signal, the small cell base station 100 narrows and sets the antenna directivity 51 to a direction in which the ACK signal arrives. Accordingly, UE beamforming synchronization is established.

The above-described BIS, BRIS and number of repetitions are set in advance by the macro cell base station 200. The small cell base station 100 and the terminal apparatus 300 acquire such information from the macro cell base station 200. In addition, the BIS, the BRIS, and the number of repetitions of the small cell base station 100 side may be the same as or different from those of the terminal apparatus 300 side.

3.6. Second eNB Beamforming

The small cell base station 100 that performs first eNB beamforming using a beam group has been described above. After first eNB beamforming synchronization is established, the small cell base station 100 (for example, the communication control unit 153) may transition to communication using individual beams. In this case, the small cell base station 100 selects a beam to be used in communication with the terminal apparatus 300 continuously thereafter from multiple beams included in a beam group that is used in communication with the terminal apparatus 300. Beams other than the selected beam may be used in communication with another terminal apparatus 300. Accordingly, the small cell base station 100 can increase the number of terminal apparatuses 300 that can perform communication by performing beamforming within a cell. Hereinafter, eNB beamforming performed by the small cell base station 100 using a beam will also be referred to as second eNB beamforming.

For example the small cell base station 100 may establish synchronization of second eNB beamforming after first eNB beamforming synchronization is established or after first eNB beamforming and UE beamforming synchronization are established. In this case, the small cell base station 100 establishes second beamforming synchronization using any beam included in a beam group in which synchronization has already been established according to the first eNB beamforming synchronization procedure. Therefore, the number of frames for synchronization that are sequentially transmitted to establish second eNB beamforming synchronization may be a number that corresponds to the number of beams included in the beam group in which first eNB beamforming synchronization is established. Therefore, synchronization can be established through second eNB beamforming in a shorter period than through first eNB beamforming.

Here, as transmission of a synchronization signal, sweep transmission may be performed, as in the first eNB beamforming synchronization procedure. However, here, the sweeping transmission is performed in a partial area corresponding to a beam group in which first eNB beamforming synchronization has been established. Specifically, the small cell base station 100 transmits a synchronization signal periodically and sequentially over time to each of a plurality of areas obtained by subdividing a partial area corresponding to a beam group in which first eNB beamforming synchronization has been established, by using each beam included in the beam group.

A second eNB beamforming synchronization procedure is the same as the above-described first eNB beamforming synchronization procedure. Hereinafter, a second beamforming synchronization procedure will be described in detail with reference to FIG. 29.

Figure 29:
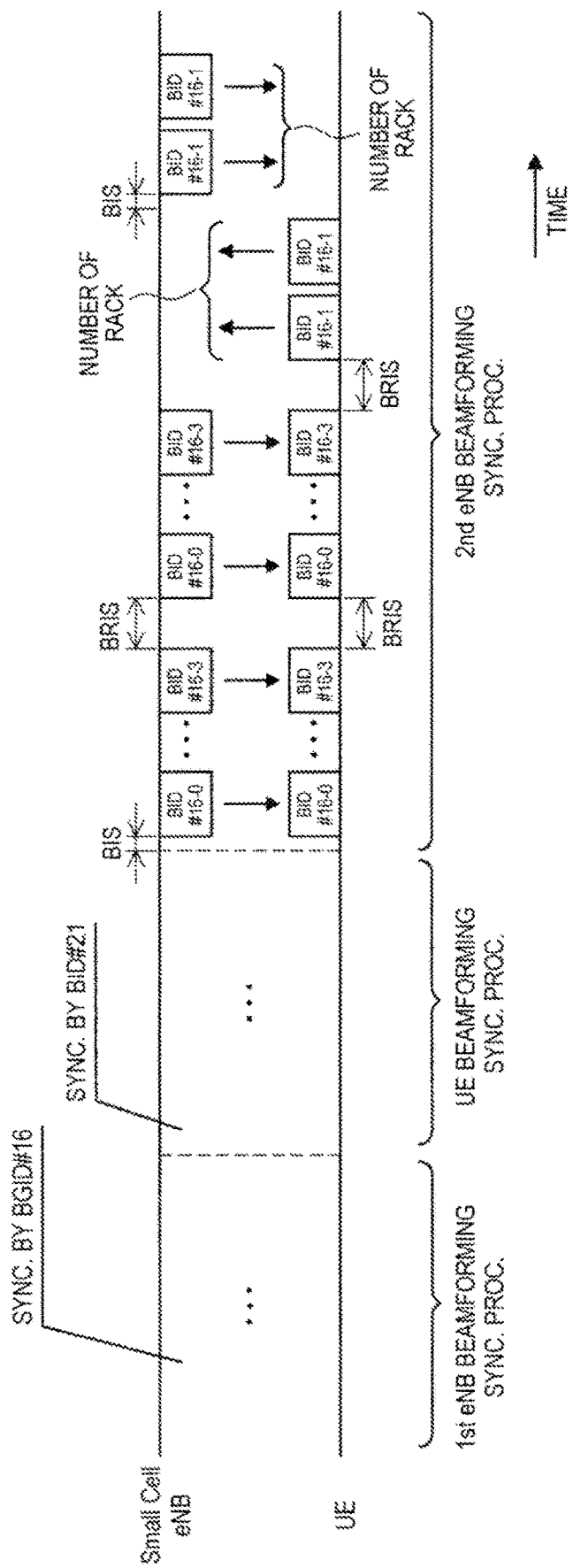
FIG. 29 is a diagram for describing an example of a second eNB beamforming synchronization procedure according to the present embodiment.

FIG. 29 is a diagram for describing an example of the second eNB beamforming synchronization procedure according to the present embodiment. As illustrated in FIG. 29, first, the small cell base station 100 and the terminal apparatus 300 establish first eNB beamforming synchronization and then establish UE beamforming synchronization. Here, first eNB beamforming synchronization is established by a beam group of a BGID #16 and UE beamforming synchronization is established by a beam of a BID #21. Since the first eNB beamforming synchronization procedure and the UE beamforming synchronization procedure are the same as those in the above description, details thereof will not be described here. Then, the second eNB beamforming synchronization procedure is performed.

Specifically, first, the small cell base station 100 transmits a synchronization signal including a ZC sequence corresponding to a beam ID to the terminal apparatus 300 using a beam corresponding to the beam ID. Specifically, the small cell base station 100 sequentially transmits multiple ZC sequences that are generated from a root ZC sequence corresponding to one sector and that correspond to beam IDs of beams at intervals of BIS using corresponding beams. For example, when four beams are included in a beam group that is used in first eNB beamforming, the small cell base station 100 sequentially transmits four synchronization signals including ZC sequences corresponding to beam IDs #16-0 to #16-3. In addition, the small cell base station 100 repeatedly transmits radio frames including multiple ZC sequences corresponding to the number of beams at intervals of BRIS a predetermined number of times. Here, as for transmission of a synchronization signal, sweeping transmission is performed in a partial area corresponding to a beam group in which first eNB beamforming synchronization has been established, as described above. Then, in order to receive an ACK signal from the terminal apparatus 300, the small cell base station 100 narrows and sets antenna directivity to a direction in which the ACK signal arrives for the same reason as described above with reference to FIG. 27.

Next, the terminal apparatus 300 learns about a beam ID corresponding to an amount of cyclic shift of a ZC sequence whose reception quality is most favorable among received ZC sequences as an optimal beam ID for communication with the small cell base station 100. Then, the terminal apparatus 300 repeatedly transmits an ACK signal including information indicating the optimal beam ID to the small cell base station 100 a predetermined number of times. For example, the terminal apparatus 300 determines that reception quality of the beam ID #16-1 is most favorable and repeatedly transmits an ACK signal including information indicating the beam ID #16-1 to the small cell base station 100 the predetermined number of times. In addition, the small cell base station 100 repeatedly transmits an ACK signal including information indicating that a feedback of the beam ID is received, that is, that second eNB beamforming synchronization is established, to the terminal apparatus 300 a predetermined number of times. For example, the small cell base station 100 repeatedly transmits an ACK signal including information indicating the beam ID #16-1 to the terminal apparatus 300 the predetermined number of times.

According to the above procedure, the second eNB beamforming synchronization is established. As described above, in the initial access procedure of the present disclosure in which the second eNB beamforming synchronization is performed subsequently to the first eNB beamforming synchronization, phased beamforming is performed, and thus the terminal apparatus 300 can rapidly establish eNB beamforming synchronization with a beam width which is broad to a certain degree in the first eNB beamforming synchronization. In the subsequent second eNB beamforming synchronization, it is possible to further increase the number of terminal apparatuses 300 that can perform communication by using a sharper beam width, and capacity-up which is a 5G massive-MIMO characteristic can be implemented.

BIS, BRIS and the number of repetitions are set in advance by the macro cell base station 200. The small cell base station 100 and the terminal apparatus 300 acquire such information from the macro cell base station 200. In addition, the BIS, the BRIS, and the number of repetitions of the small cell base station 100 side may be the same as or different from those of the terminal apparatus 300 side.

<3.7. Process Flow>

Hereinafter, an example of a process flow in a series of initial access procedures including the above-described first eNB beamforming synchronization procedure, UE beamforming synchronization procedure, and second eNB beamforming synchronization procedure will be described with reference to FIG. 30.

Figure 30:
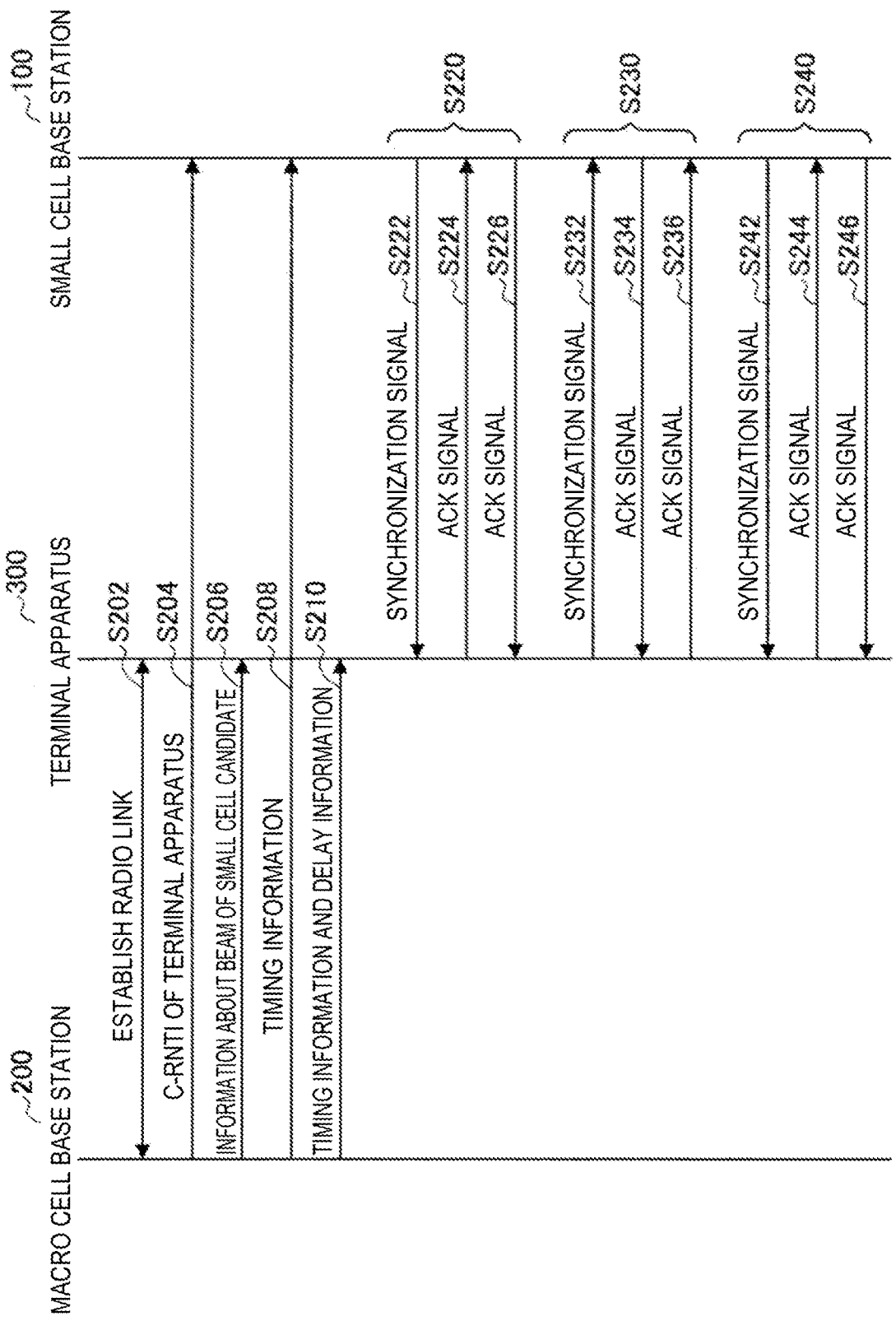
FIG. 30 is a sequence diagram illustrating an example of a process flow in an initial access procedure performed in a system according to the present embodiment.

FIG. 30 is a sequence diagram illustrating an example of a process flow in an initial access procedure performed in the system 1 according to the present embodiment.

As illustrated in FIG. 30, first, the macro cell base station 200 and the terminal apparatus 300 establish a radio link through FD-MIMO (Step S202).

Next, the macro cell base station 200 transmits a C-RNTI of the terminal apparatus 300 to the small cell base station 100 (Step S204). Specifically, first, the macro cell base station 200 learns about a unique C-RNTI allocated to the terminal apparatus 300 from information about a radio link with the terminal apparatus 300 in a macro cell. In addition, the macro cell base station 200 learns about a candidate for a small cell with which the terminal apparatus 300 will establish a connection of a user plane from the information about a radio link with the terminal apparatus 300 in the macro cell. Then, the macro cell base station 200 transmits the C-RNTI of the terminal apparatus 300 to all of the small cell base stations 100 that operate the small cell candidate. The transmission of the C-RNTI is performed by each of the terminal apparatuses 300 in which a link of a control plane is established. An X2 interface or an S1 interface is used to transmit the C-RNTI.

Next, the macro cell base station 200 transmits frequency channel information and information about a beam of the small cell candidate to the terminal apparatus 300 (Step S206). The information about a beam of the small cell candidate is, for example, information including a root ZC sequence that is allocated to each sector of the small cell candidate in which the terminal apparatus 300 is assumed to be located, and is generated from a unique C-RNTI of the terminal apparatus 300. Information about a beam of the small cell candidate to which a priority is assigned and that has a form of a list may be transmitted. The information about a beam of the small cell candidate may be generated based on, for example, the information about a radio link with the terminal apparatus 300 in the macro cell.

Next, the macro cell base station 200 transmits timing information to all candidates for the small cell base station 100 (Step S208). Here, the timing information may include, for example, frame timing information or symbol timing information. The timing information may be generated based on, for example, the information about a radio link with the terminal apparatus 300 in the macro cell. An X2 interface or an S1 interface is used to transmit the timing information.

Next, the macro cell base station 200 transmits timing information and delay information to the terminal apparatus 300. The delay information includes timing information of each of the terminal apparatuses 300 in a control plane in which a radio link is established and delay information indicating a deviation of a small cell unique frame timing or symbol timing. The delay information may be generated based on, for example, the information about a radio link with the terminal apparatus 300 in the macro cell.

According to the above-described process, the small cell base station 100 learns about first synchronization information and the terminal apparatus 300 learns about second synchronization information. According to such information, the terminal apparatus 300 can approximately predict a symbol synchronization timing and a frame synchronization timing with the small cell base station 100. The reason why the result goes no further than the prediction is that a timing in a macro cell which is an LTE signal of 6 GHz or less and a propagation delay timing in an actual environment of a small cell which is a 5G signal of a millimeter wave are, to be exact, different. Subsequently to the prediction, the terminal apparatus 300 can exactly establish symbol synchronization, frame synchronization and beamforming synchronization by using a procedure of receiving, one after another, synchronization signals sweepingly transmitted in sequence by the small cell base station 100. A process of establishing exact synchronization will be described below.

First, the small cell base station 100 and the terminal apparatus 300 perform the first eNB beamforming synchronization procedure (Step S220). First, the small cell base station 100 transmits a synchronization signal including ZC sequences that are generated from a root ZC sequence corresponding to each sector, correspond one-to-one with beam group IDs, and are orthogonal to each other to the terminal apparatus 300 using a beam group corresponding to the beam group ID (Step S222). Here, as for the transmission of a synchronization signal, sweeping transmission is performed in a communication target area (for example, a cell or a sector) of the small cell base station 100. Next, the terminal apparatus 300 feeds an ACK signal including information indicating a beam group ID corresponding to an amount of cyclic shift of a ZC sequence whose reception quality is most favorable among received ZC sequences back to the small cell base station 100 (Step S224). In order to be able to reliably receive this ACK signal, the small cell base station 100 sets antenna directivity from the terminal apparatus 300 to quasi-omni directivity as described above. Next, the small cell base station 100 transmits an ACK signal including information indicating that first eNB beamforming synchronization is established to the terminal apparatus 300 (Step S226). According to the above procedure, the first eNB beamforming synchronization is established. A radio link established by the present procedure is preferably maintained constantly.

Next, optionally, the small cell base station 100 and the terminal apparatus 300 perform the UE beamforming synchronization procedure (Step S230). First, the terminal apparatus 300 transmits a synchronization signal including ZC sequences that correspond one-to-one with beam IDs generated from a root ZC sequence allocated to the terminal apparatus 300 and that are orthogonal to each other to the small cell base station 100 using a beam corresponding to the beam ID (Step S232). In order to be able to reliably receive this synchronization signal, the small cell base station 100 sets antenna directivity from the terminal apparatus 300 to quasi-omni directivity as described above. Next, the small cell base station 100 feeds an ACK signal including information indicating a beam ID corresponding to an amount of cyclic shift of a ZC sequence whose reception quality is most favorable among received ZC sequences back to the terminal apparatus 300 (Step S234). Next, the terminal apparatus 300 transmits an ACK signal including information indicating that UE beamforming synchronization is established to the small cell base station 100 (Step S236). In order to receive this ACK signal, the small cell base station 100 narrows and sets the antenna directivity 51 to a direction in which the ACK signal arrives. According to the above procedure, the UE beamforming synchronization is established.

Next, optionally, the small cell base station 100 and the terminal apparatus 300 perform the second eNB beamforming synchronization procedure (Step S240). First, the small cell base station 100 transmits a synchronization signal including ZC sequences that correspond one-to-one with beam IDs generated from a root ZC sequence corresponding to each sector and that are orthogonal to each other to the terminal apparatus 300 using a beam corresponding to the beam ID (Step S242). Here, as for the transmission of a synchronization signal, sweeping transmission is performed in a partial area corresponding to a beam group in which first eNB beamforming synchronization has been established. Next, the terminal apparatus 300 feeds an ACK signal including information indicating a beam ID corresponding to an amount of cyclic shift of a ZC sequence whose reception quality is most favorable among received ZC sequences back to the small cell base station 100 (Step S244). In order to receive this ACK signal, the small cell base station 100 narrows and sets the antenna directivity 51 to a direction in which the ACK signal arrives. Next, the small cell base station 100 transmits an ACK signal including information indicating that second eNB beamforming synchronization is established to the terminal apparatus 300 (Step S246). According to the above procedure, the second eNB beamforming synchronization is established. A radio link established by the present procedure is preferably maintained constantly.

Accordingly, the process ends.

<3.8. SIC Execution Instruction>

Massive-MIMO and MUST are applied to the small cell base station 100. For example, the small cell base station 100 (for example, the communication control unit 153) multiplexes the multiple terminal apparatuses 300 on multiple beams included in a single beam group using non-orthogonal resources. That is, the terminal apparatus 300 is multiplexed with another terminal apparatus 300 that is positioned on multiple beams included in the same beam group using non-orthogonal resources. The terminal apparatus 300 (for example, the SIC processing unit 343) performs communication with the small cell base station 100 using non-orthogonal resources. Specifically, when the terminal apparatus 300 corresponds to Near-UE, it performs SIC to remove interference and thus acquires a self-addressed signal. Hereinafter, a mechanism of instructing the terminal apparatus 300 corresponding to the Near-UE to perform SIC will be described.

Here, reduced complexity maximum likelihood (R-ML), symbol level interference cancellation (SLIC), maximum likelihood (ML) and the like are proposed in 3GPP TR36.859 as an SIC method. A plurality of pieces of information are considered to be necessary for the Near-UE to perform R-ML or SLIC. This information is disclosed in the following table in 3GPP TR36.859 as assistance information.

TABLE 2

| Assistance Information | Comment of TR36.859 [2]-5.3.1 section |
|---|---|
| Existence/processing of MUST interference per spatial layer | — |
| Transmission power allocation of its PDSCH and MUST far UE's PDSCH | It may be information per spatial layer if different power can be allocated to each spatial layer. |
| Spatial precoding vector | Codebook subset restriction(s). Full rank PMI used for virtualization of transmit diversity. |
| Modulation order of each codeword | Only if not restricted to QPSK only. |
| Resource allocation | If all the scheduled RBs of the MUST near UE have superposed transmission and all assistance information of all the paired far UEs is the same, this information is not needed. |
| DMRS information of MUST far UE | Only if DMRS information is used to estimate effective channel of MUST far UE or to derive power allocation of MUST far UE. |
| PDSCH RE mapping information | Only if it is different from its own PDSCH RE mapping information, e.g. PDSCH starting symbol or PDSCH RE mapping at DMRS RE. |
| Transmission scheme | Only if mixed transmission schemes, e.g. transmit diversity and closed-loop spatial multiplexing |
| Enhanced HARQ information | Only if needed. |

As shown in the above table, the assistance information may include information indicating whether there is MUST interference for each spatial layer. The Near-UE can learn about whether to perform SIC according to this information.

In addition, the assistance information may include transmission power allocation information of PDSCH of the Near-UE and PDSCH of Far-UE. When beamforming is performed by MIMO toward the Far-UE, transmission power information is necessary for each stream. In addition, the assistance information may include spatial precoding matrix information. This information includes, for example, a PMI and a rank indicator (RI) of MIMO. In addition, the assistance information may include modulation order information of each codeword. In addition, the assistance information may include resource allocation information. This information is unnecessary when all resource blocks (RBs) allocated to the Near-UE and the Far-UE multiplexed by MUST overlap and the assistance information is the same. In addition, the assistance information may include DMRS information of the Far-UE. This information is necessary for channel estimation and power allocation of the Far-UE. In addition, the assistance information may include PDSCH resource element mapping information. This information is necessary when resource element mapping information of PRSCH and DMRS is different. In addition, the assistance information may include transmission scheme information. This information is necessary when transmission diversity and closed-loop MIMO are applied. In addition, the assistance information may include enhanced hybrid automatic repeat request (E-HARQ) information. This information is necessary when E-HARQ is performed.

The small cell base station 100 transmits the assistance information that is information for performing SIC to the terminal apparatus 300 that performs SIC. Therefore, the small cell base station 100 determines the terminal apparatus 300 that performs SIC and a timing at which SIC will be performed based on a beam group ID or a beam ID in which first or second eNB beamforming synchronization is established and an RSSI or a CQI value of the terminal apparatus 300. Then, the small cell base station 100 transmits the assistance information to the terminal apparatus 300 that performs SIC according to the timing at which SIC will be performed. Accordingly, when the terminal apparatus 300 should perform SIC by itself, it can acquire the assistance information at the timing at which SIC will be performed.

The above determination will be described in detail. For example, as described above with reference to FIG. 19, the terminal apparatus 300 includes the beam group ID (or the beam ID) in which synchronization is established in a UE uplink acknowledgment in the self-contained frame. Accordingly, the small cell base station 100 can learn about the multiple terminal apparatuses 300 that are multiplexed in the same beam group (or the same beam). In addition, the terminal apparatus 300 measures an RSSI and an SQI of a received signal and includes information indicating a measurement result in the UE uplink acknowledgment in a similar manner. Accordingly, the small cell base station 100 can learn about a perspective relation of the multiple terminal apparatuses 300 that are multiplexed in the same beam group (or the same beam). Accordingly, the terminal apparatus 300 can instruct a close terminal apparatus 300 to perform SIC at the timing at which SIC will be performed based on the perspective relation.

Conversely, the terminal apparatus 300 performs successive interference cancellation for removing interference from a signal addressed to another terminal apparatus 300 that is multiplexed on multiple beams included in the same beam group based on the assistance information received from the small cell base station 100. By receiving the assistance information according to the timing at which SIC will be performed, the terminal apparatus 300 can acquire a self-addressed signal by performing SIC even when massive-MIMO and MUST are combined.

The assistance information may be transmitted in various manners. For example, the assistance information may be transmitted from the small cell base station 100 as signaling information through DL data of a user plane. In addition, the assistance information may be transmitted from the macro cell base station 200 as signaling information through an individual control physical channel of a control plane. In addition, the assistance information may be blind-detected based on minimum UE pair information.

<3.9. Handover>

In LTE, a handover may be performed based on a comparison result between a reception strength from an adjacent cell and a reception strength from a serving cell. For example, when a reception strength from an adjacent cell is greater than a reception strength from a serving cell and a predetermined conditional expression is satisfied in a trigger event A3, a measurement report is reported from UE to an eNB. Thus, a handover in which an eNB having the greatest reception strength is set as a target eNB is decided when the trigger event A3 is continuously satisfied for a predetermined period or longer.

In LTE, an eNB does not perform beamforming through massive-MIMO. On the other hand, the small cell base station 100 according to the present embodiment performs first or second eNB beamforming through massive-MIMO. Then, the system 1 according to the present embodiment performs a handover from a serving cell to a target cell while beamforming synchronization is established. While first eNB beamforming will be described below, the description applies to second eNB beamforming in a similar manner.

Information Sharing

Figure 31:
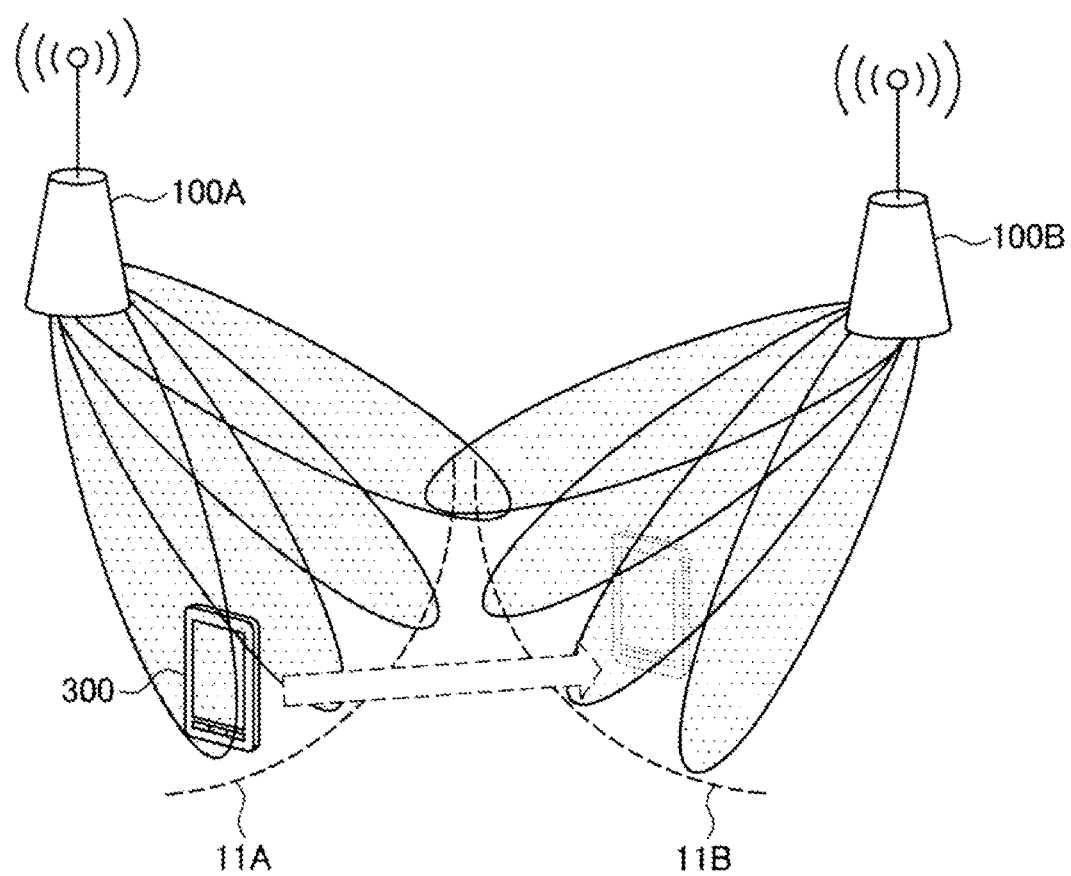
FIG. 31 is a diagram for describing a handover in the system according to the present embodiment.

FIG. 31 is a diagram for describing a handover in the system 1 according to the present embodiment. As illustrated in FIG. 31, the small cell base station 100A that operates the small cell 11A and the small cell base station 100B that operates the small cell 11B are adjacent to each other and each form multiple beams through massive-MIMO. Thus, the terminal apparatus 300 performs a handover using the small cell base station 100A as a source eNB and the small cell base station 100B as a target NB.

The small cell base stations 100 may share information for a handover (hereinafter referred to as handover information) with each other. For example, the small cell base station 100A (for example, the information sharing unit 151) transmits the handover information to the small cell base station 100B through an X2 interface.

For example, the handover information may include an RSSI and a CQI value that are reported from the terminal apparatus 300 in a connection state. In addition, the handover information may include a beam group ID in which first eNB beamforming synchronization is established with the terminal apparatus 300 in the connection state and a ZC sequence corresponding to the beam group ID. In addition, the handover information may include information indicating a channel environment around the terminal apparatus 300 in the connection state and a small cell candidate for a handover destination. Here, the connection state refers to a state in which the initial access procedure is performed, symbol synchronization, frame synchronization and first eNB beamforming synchronization are established, and transmission and reception using a user plane are performed.

The small cell base station 100A first acquires the above-described handover information from the terminal apparatus 300 in the connection state. For example, the small cell base station 100A acquires an RSSI and a CQI value from the UE uplink acknowledgment included in the self-contained frame and the beam group ID, and further acquires a ZC sequence corresponding to the acquired beam group ID. In addition, the small cell base station 100 acquires a channel environment around the terminal apparatus 300 based on a reception result of the UE uplink acknowledgment. Then, the small cell base station 100A shares handover information of the terminal apparatus 300 in the connection state with another small cell base station 100 including the small cell base station 100B.

In addition, based on a beam group that is used in communication with the terminal apparatus 300, the small cell base station 100A may transmit a beam group ID of a candidate for a beam group that is used in communication with the small cell base station 100B of a handover destination to the terminal apparatus 300 to be handed over. Accordingly, the terminal apparatus 300 can establish first eNB beamforming synchronization with the small cell base station 100B more rapidly because beam group IDs serving as candidates are reduced. Beam group ID candidates to which a priority is assigned may be notified thereof. This notification may be notified of as, for example, signaling information in DL data of a user plane.

Here, the small cell base station 100A can find out the location of the terminal apparatus 300 based on the location of a partial area corresponding to a beam group ID in which the small cell base station 100A establishes first eNB beamforming synchronization with the terminal apparatus 300. When second eNB beamforming synchronization with the terminal apparatus 300 is established, the small cell base station 100A can find out the location of the terminal apparatus 300 in further detail. Therefore, based on the location of the terminal apparatus 300, the small cell base station 100A can estimate to which position in the communication target area of the small cell base station 100B the terminal apparatus 300 moves. As described above, a beam group ID corresponds to a position in a communication target area, and thus the small cell base station 100A can specify beam group IDs serving as candidates according to estimation results of a movement destination of the terminal apparatus 300. This specification of beam group IDs serving as candidates may be performed by the small cell base station 100B.

First eNB Beamforming Synchronization

The small cell base station 100B (for example, the communication control unit 153) establishes first eNB beamforming synchronization with the terminal apparatus 300 that has been handed over based on the handover information that is shared from the small cell base station 100A. For example, first, the small cell base station 100B predicts a position of the terminal apparatus 300 and a timing at which the terminal apparatus 300 will be handed over based on the handover information. Then, the small cell base station 100B performs the first eNB beamforming synchronization procedure based on the handover information at the predicted timing. Since details of the procedure are the same as those in the above description, details thereof will not be described here. However, here, in the first eNB beamforming synchronization procedure, the small cell base station 100B may reduce beam group IDs serving as candidates based on the handover information. Accordingly, it is possible to establish first eNB beamforming synchronization more rapidly.

Figure 32:
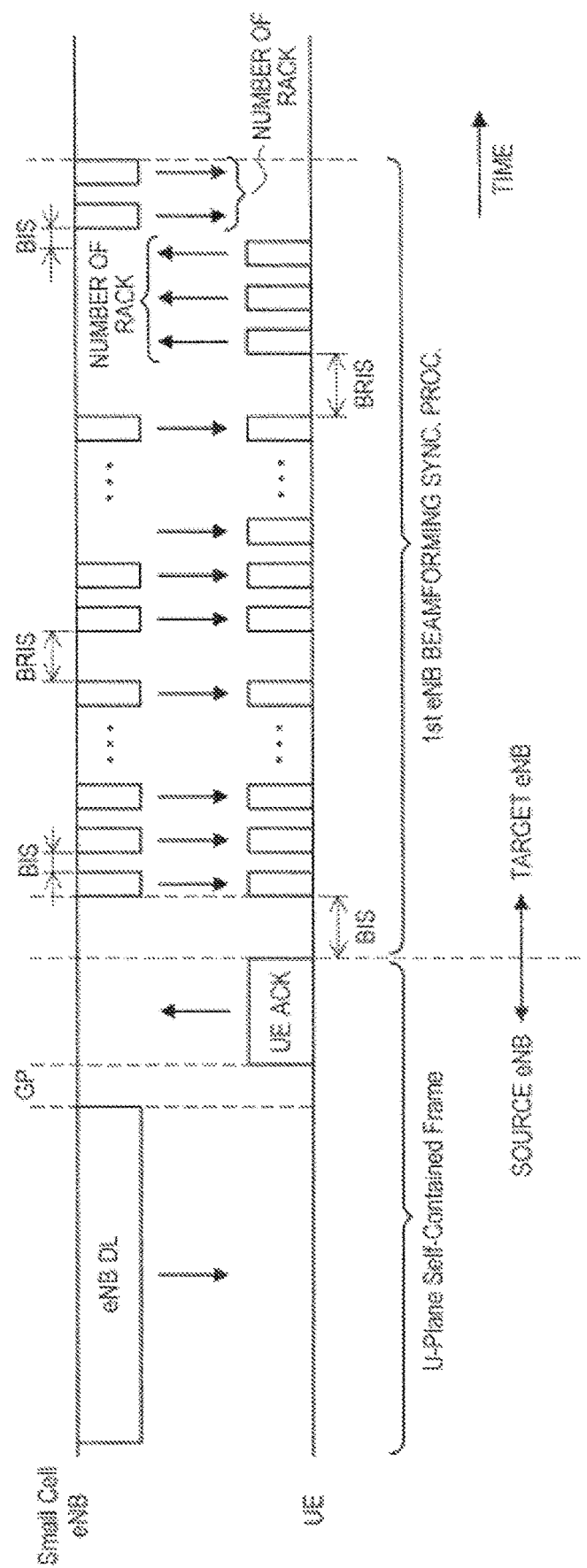
FIG. 32 is a diagram illustrating an example of information that is transmitted and received during a handover.

FIG. 32 is a diagram illustrating an example of information that is transmitted and received during a handover. As illustrated in FIG. 32, the terminal apparatus 300 continuously performs communication with the small cell base station 100A of a handover source using the self-contained frame and receives a synchronization signal for first eNB beamforming from the small cell base station 100B of a handover destination. Specifically, the terminal apparatus 300 receives DL data from the small cell base station 100A and transmits the UE uplink acknowledgment. Then, the terminal apparatus 300 receives a synchronization signal from the small cell base station 100B in order to establish first eNB beamforming synchronization with the small cell base station 100B. Since the same frequency band is used in the small cell 11A and the small cell 11B, it is possible to mix and map the self-contained frame and the synchronization signal along a radio frame as illustrated in FIG. 32.

When a handover is decided, a reception strength when first eNB beamforming is performed may be considered. For example, in the trigger event A3, a reception strength of an adjacent cell may be replaced by a reception strength that is assumed when first eNB beamforming is performed. Accordingly, a handover suitable for massive-MIMO is implemented.

COMP During Handover

During a handover, CoMP may be implemented.

Therefore, for example, the small cell base station 100A (for example, the communication control unit 153) transmits a signal of a user plane in cooperation with the small cell base station 100B (corresponding to another second base station) of a handover destination of the terminal apparatus 300 to the terminal apparatus 300 that is connected to the small cell base station 100A to transmit and receive a signal of the user plane and that is connected to the macro cell base station 200 (corresponding to another first base station) to transmit and receive information of a control plane. In addition, when the terminal apparatus 300 that is connected to the small cell base station 100A to transmit and receive the signal of a user plane and that is connected to the macro cell base station 200 to transmit and receive the information of a control plane is handed over to the small cell base station 100B, the small cell base station 100B (for example, the communication control unit 153) transmits a signal of the user plane in cooperation with the small cell base station 100A of a handover source. Accordingly, it is possible to reduce or eliminate a communication interruption time of a user plane during a handover. This is similar to a soft handover in 3G.

Specifically, in the present embodiment, the small cell base station 100B of a handover destination estimates a position and a timing of the terminal apparatus 300, reduces beam group IDs serving as candidates, and performs the first eNB beamforming synchronization procedure based on the handover information. That is, the small cell base station 100B can form appropriate beams quickly. Accordingly, it is possible to reduce interference that may occur in beams from the small cell base station 100A and beams from the small cell base station 100B when COMP is implemented.

In this manner, the small cell base station 100A and the small cell base station 100B each establish beamforming synchronization with the terminal apparatus 300 when a handover is performed.

Accordingly, performing of a smooth handover is implemented and a decrease in throughput of a fringe area is prevented. Therefore, it is possible to reduce or eliminate communication interruption of a user plane.

In consideration of implementation of COMP during the above-described handover, it should be noted that it is effective for the terminal apparatus 300 to have an omnidirectional antenna. This is because, when an omnidirectional antenna is included, a burden on the terminal apparatus 300 side can be reduced and it is possible to easily receive beams in multiple directions of a handover source and a handover destination during a handover.

4. Application Examples

The technology according to the present disclosure is applicable to a variety of products. For example, a base station 100 or 200 may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the base station 100 or 200 may be realized as any other types of base stations such as a NodeB and a base transceiver station (BTS). The base station 100 or 200 may include a main body (that is also referred to as a base station apparatus) configured to control radio communication, and one or more remote radio heads (RRH) disposed in a different place from the main body. Additionally, various types of terminals to be discussed later may also operate as the base station 100 or 200 by temporarily or semi-permanently executing a base station function.

For example, a terminal apparatus 300 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The terminal apparatus 300 may also be realized as a terminal (that is also referred to as a machine type communication (MTC) terminal) that performs machine-to-machine (M2M) communication. Furthermore, the terminal apparatus 300 may be a radio communication module (such as an integrated circuit module including a single die) mounted on each of the terminals.

<4-1. Application Examples Regarding Base Station>

First Application Example

Figure 33:
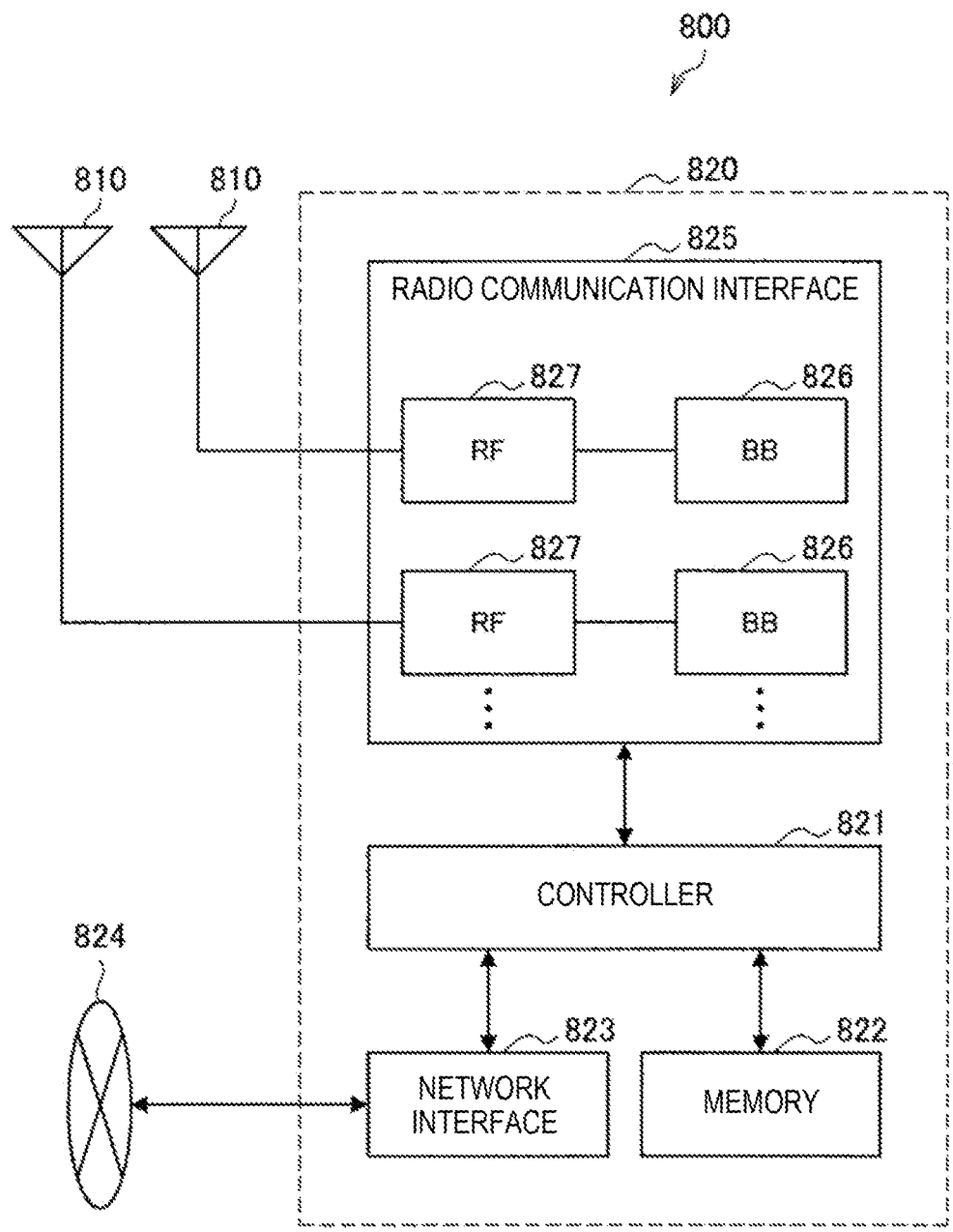
FIG. 33 is a block diagram illustrating a first example of a schematic configuration of an eNB.

FIG. 33 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 33. For example, the multiple antennas 810 may be compatible with multiple frequency bands used by the eNB 800. Although FIG. 33 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 33. For example, the multiple BB processors 826 may be compatible with multiple frequency bands used by the eNB 800. The radio communication interface 825 may include the multiple RF circuits 827, as illustrated in FIG. 33. For example, the multiple RF circuits 827 may be compatible with multiple antenna elements. Although FIG. 33 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 33, one or more components (the information sharing unit 151 and/or the communication control unit 153 or the information sharing unit 251 and/or the communication control unit 253) included in the control unit 150 or 250 described with reference to FIG. 4 or FIG. 5 may be mounted in the radio communication interface 825. Alternatively, at least some of such components may be mounted in the controller 821. As an example, in the eNB 800, a module including a part (for example, the BB processor 826) or all of the radio communication interface 825 and/or the controller 821 is installed and the one or more components may be mounted in the module. In this case, the module may store a program causing a processor to function as the one or more components (in other words, a program causing a processor to execute operations of the one or more components) and execute the program. As another example, a program causing a processor to function as the one or more components is installed in the eNB 800, and the radio communication interface 825 (for example, the BB processor 826) and/or the controller 821 may execute the program. As described above, the eNB 800, the base station apparatus 820 or the module may be provided as an apparatus including the one or more components, and a program causing a processor to function as the one or more components may be provided. In addition, a readable recording medium recording the program may be provided.

In addition, the radio communication unit 120 or 220 described with reference to FIG. 4 or FIG. 5 may be mounted in the radio communication interface 825 (for example, the RF circuit 827) in the eNB 800 shown in FIG. 33. In addition, the antenna unit 110 or 210 may be mounted in the antenna 810. In addition, the network communication unit 130 or 230 may be mounted in the controller 821 and/or the network interface 823. In addition, the storage unit 140 or 240 may be mounted in the memory 822.

Second Application Example

Figure 34:
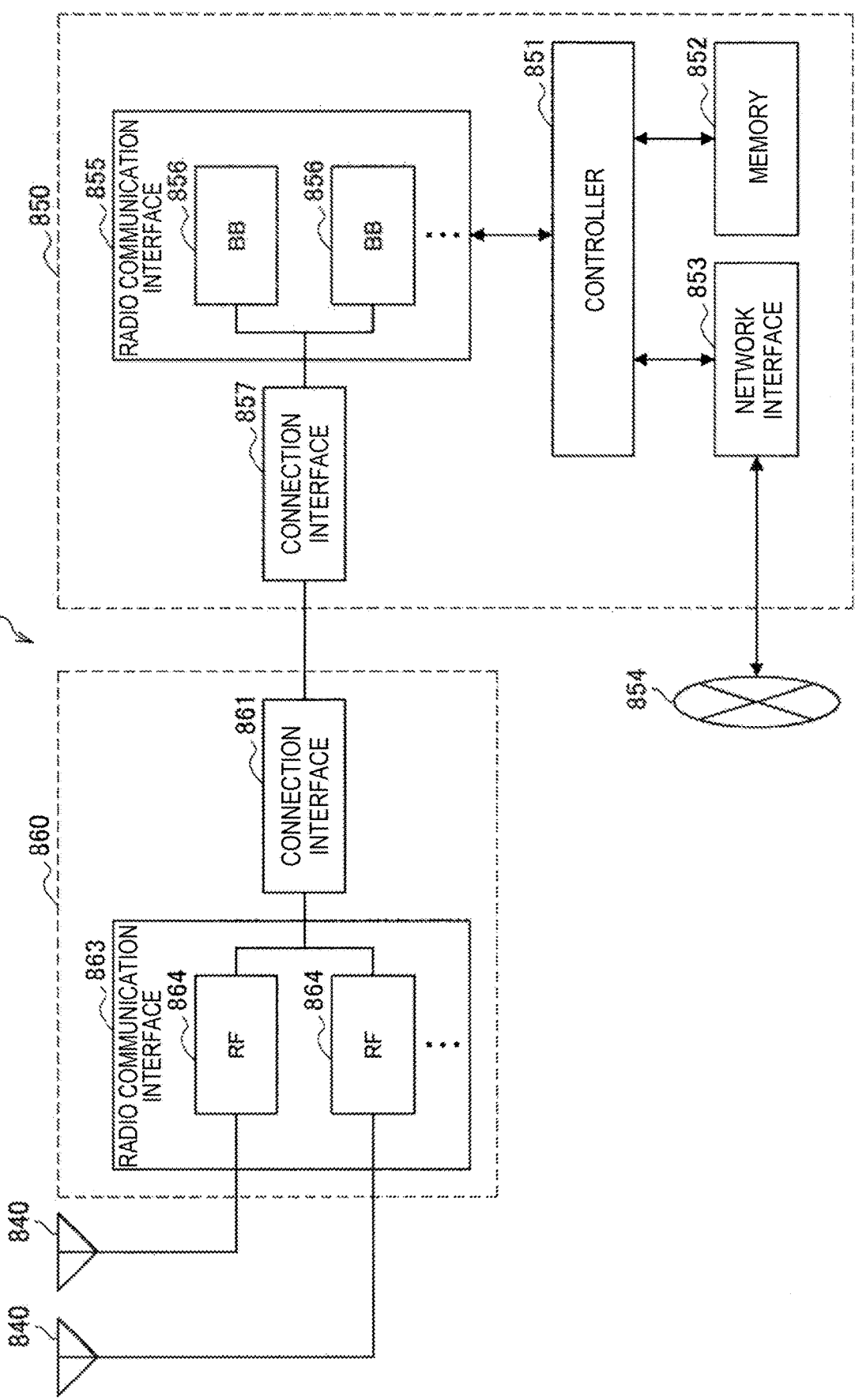
FIG. 34 is a block diagram illustrating a second example of a schematic configuration of an eNB.

FIG. 34 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 34. For example, the multiple antennas 840 may be compatible with multiple frequency bands used by the eNB 830. Although FIG. 34 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 33.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 33, except the BB processor 856 is connected to the RF circuit 864 of the RRH 860 via the connection interface 857. The radio communication interface 855 may include the multiple BB processors 856, as illustrated in FIG. 34. For example, the multiple BB processors 856 may be compatible with multiple frequency bands used by the eNB 830. Although FIG. 34 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 34. For example, the multiple RF circuits 864 may support multiple antenna elements. Although FIG. 34 illustrates the example in which the radio communication interface 863 includes the multiple RF circuits 864, the radio communication interface 863 may also include a single RF circuit 864.

In the eNB 830 shown in FIG. 34, one or more components (the information sharing unit 151 and/or the communication control unit 153 or the information sharing unit 251 and/or the communication control unit 253) included in the control unit 150 or 250 described with reference to FIG. 4 or FIG. 5 may be mounted in the radio communication interface 855 and/or the radio communication interface 863. Alternatively, at least some of such components may be mounted in the controller 851. As an example, in the eNB 830, a module including a part (for example, the BB processor 856) or all of the radio communication interface 855 and/or the controller 851 is installed and the one or more components may be mounted in the module. In this case, the module may store a program causing a processor to function as the one or more components (in other words, a program causing a processor to execute operations of the one or more components) and execute the program. As another example, a program causing a processor to function as the one or more components is installed in the eNB 830, and the radio communication interface 855 (for example, the BB processor 856) and/or the controller 851 may execute the program. As described above, the eNB 830, the base station apparatus 850 or the module may be provided as an apparatus including the one or more components, and a program causing a processor to function as the one or more components may be provided. In addition, a readable recording medium recording the program may be provided.

In addition, for example, the radio communication unit 120 or 220 described with reference to FIG. 4 or FIG. 5 may be mounted in the radio communication interface 863 (for example, the RF circuit 864) in the eNB 830 shown in FIG. 34. In addition, the antenna unit 110 or 210 may be mounted in the antenna 840. In addition, the network communication unit 130 or 230 may be mounted in the controller 851 and/or the network interface 853. In addition, the storage unit 140 or 240 may be mounted in the memory 852.

<4.2. Application Examples Regarding Terminal Apparatus>

First Application Example

Figure 35:
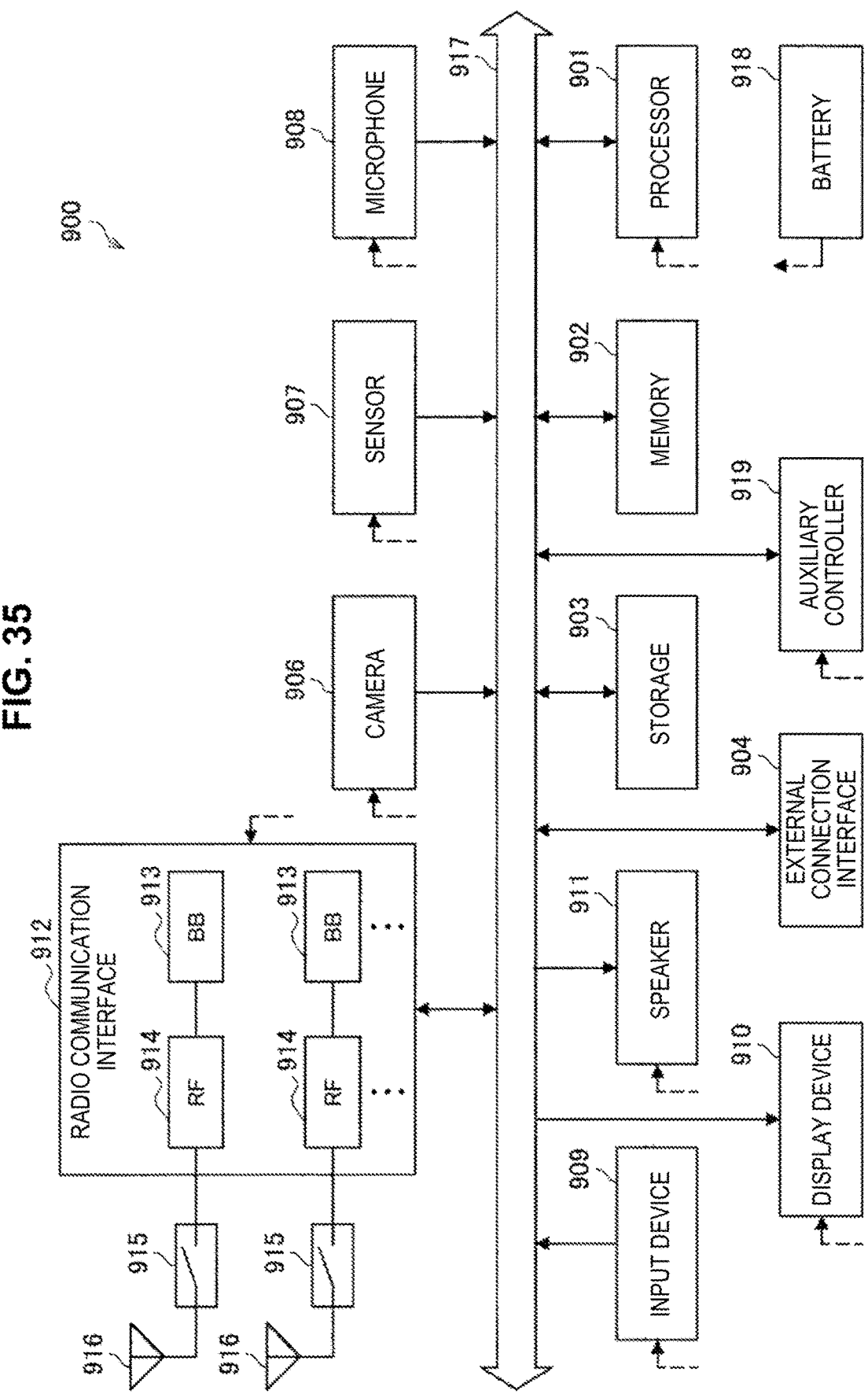
FIG. 35 is a block diagram illustrating an example of a schematic configuration of a smartphone.

FIG. 35 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 35. Although FIG. 35 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 35. Although FIG. 35 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 35 via feeder lines, which are partially shown as dashed lines in the figure. The auxiliary controller 919 operates a minimum necessary function of the smartphone 900, for example, in a sleep mode.

In the smartphone 900 shown in FIG. 35, one or more components (the communication control unit 341 and/or the SIC processing unit 343) included in the control unit 340 described with reference to FIG. 6 may be mounted in the radio communication interface 912. Alternatively, at least some of such components may be mounted in the processor 901 or the auxiliary controller 919. As an example, in the smartphone 900, a module including a part (for example, the BB processor 913) or all of the radio communication interface 912, the processor 901, and/or the auxiliary controller 919 is installed and the one or more components may be mounted in the module. In this case, the module may store a program causing a processor to function as the one or more components (in other words, a program causing a processor to execute operations of the one or more components) and execute the program. As another example, a program causing a processor to function as the one or more components is installed in the smartphone 900, and the radio communication interface 912 (for example, the BB processor 913), the processor 901, and/or the auxiliary controller 919 may execute the program. As described above, the smartphone 900, or the module may be provided as an apparatus including the one or more components, and a program causing a processor to function as the one or more components may be provided. In addition, a readable recording medium recording the program may be provided.

In addition, for example, the radio communication unit 320 described with reference to FIG. 6 may be mounted in the radio communication interface 912 (for example, the RF circuit 914) in the smartphone 900 shown in FIG. 35. In addition, the antenna unit 310 may be mounted in the antenna 916. In addition, the storage unit 330 may be mounted in the memory 902.

Second Application Example

Figure 36:
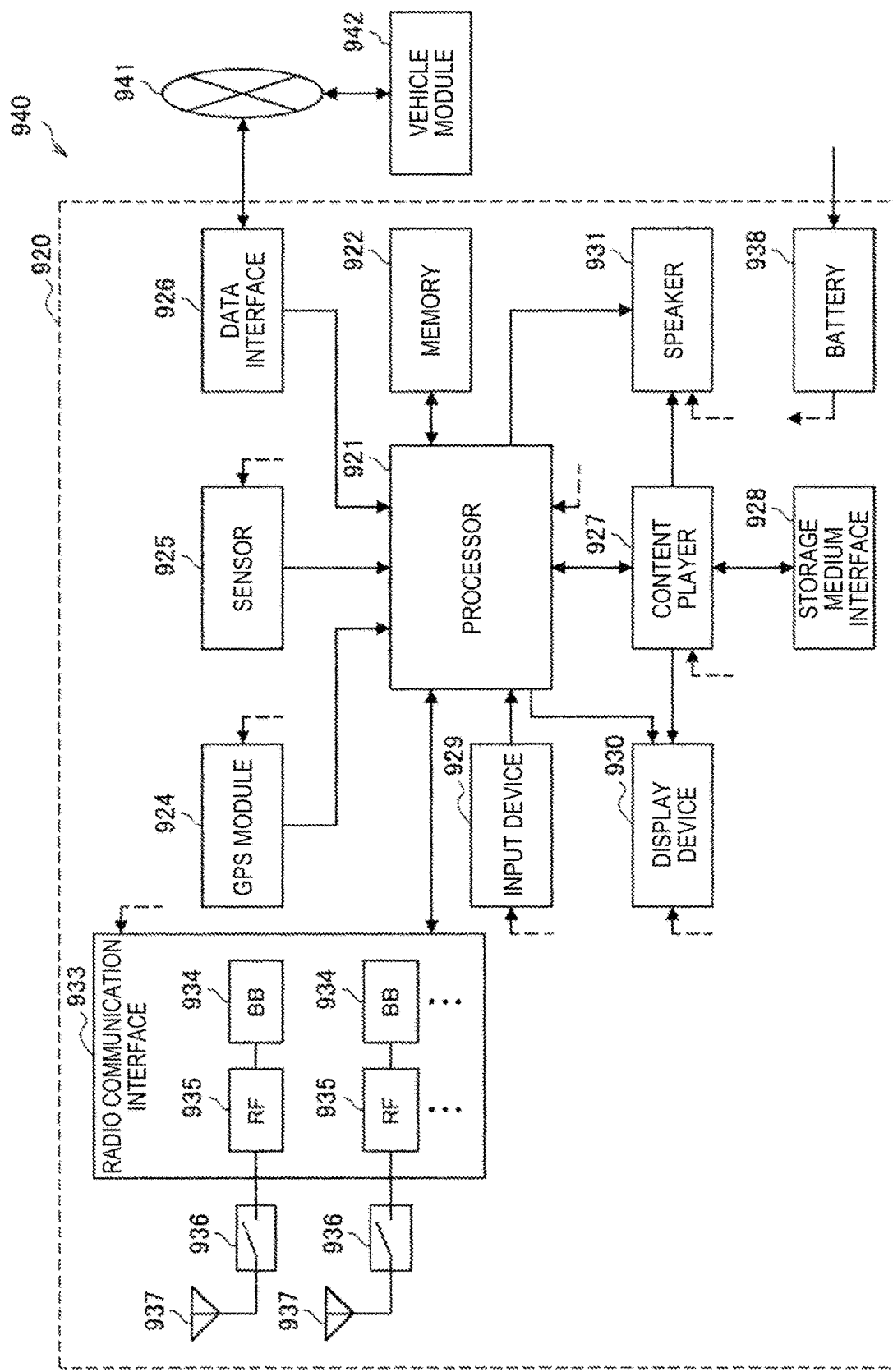
FIG. 36 is a block diagram illustrating an example of a schematic configuration of a car navigation apparatus.

FIG. 36 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 36. Although FIG. 36 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 36. Although FIG. 36 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 36 via feeder lines that are partially shown as dashed lines in the figure. The battery 938 accumulates power supplied form the vehicle.

In the car navigation apparatus 920 shown in FIG. 36, one or more components (the communication control unit 341 and/or the SIC processing unit 343) included in the control unit 340 described with reference to FIG. 6 may be mounted in the radio communication interface 933. Alternatively, at least some of such components may be mounted in the processor 921. As an example, in the car navigation apparatus 920, a module including a part (for example, the BB processor 934) or all of the radio communication interface 933, and/or the processor 921 is installed and the one or more components may be mounted in the module. In this case, the module may store a program causing a processor to function as the one or more components (in other words, a program causing a processor to execute operations of the one or more components) and execute the program. As another example, a program causing a processor to function as the one or more components is installed in the car navigation apparatus 920, and the radio communication interface 933 (for example, the BB processor 934), and/or the processor 921 may execute the program. As described above, the car navigation apparatus 920, or the module may be provided as an apparatus including the one or more components, and a program causing a processor to function as the one or more components may be provided. In addition, a readable recording medium recording the program may be provided.

In addition, for example, the radio communication unit 320 described with reference to FIG. 6 may be mounted in the radio communication interface 933 (for example, the RF circuit 935) in the car navigation apparatus 920 shown in FIG. 36. In addition, the antenna unit 310 may be mounted in the antenna 937. In addition, the storage unit 330 may be mounted in the memory 922.

The technology of the present disclosure may also be realized as an in-vehicle system (or a vehicle) 940 including one or more blocks of the car navigation apparatus 920, the in-vehicle network 941, and a vehicle module 942. That is, the in-vehicle system (or the vehicle) 940 may be provided as an apparatus including the communication control unit 341 and/or the SIC processing unit 343. The vehicle module 942 generates vehicle data such as vehicle speed, engine speed, and trouble information, and outputs the generated data to the in-vehicle network 941.

5. Conclusion

The embodiments of the present disclosure have been described above with reference to FIG. 1 to FIG. 36. As described above, the small cell base station 100 according to the present embodiment forms multiple beams, communicates with the terminal apparatus 300, and transmits a beam group ID of a beam group used in communication with the terminal apparatus 300 among beam group IDs allocated to beam groups including multiple beams to be formed to the terminal apparatus 300. Therefore, the terminal apparatus 300 can learn about the beam group ID of the beam group that is used for communication between the small cell base station 100 and the terminal apparatus 300 and can establish beamforming synchronization accordingly.

In addition, the small cell base station 100 according to the present embodiment transmits a beam group ID of a candidate for a beam group that is used in communication with another small cell base station 100 of a handover destination to the terminal apparatus 300 to be handed over based on a beam group that is used in communication with the terminal apparatus 300. Accordingly, it is possible to establish first eNB beamforming synchronization in the handover destination more rapidly because beam group ID candidates used in the handover destination are reduced.

In addition, the small cell base station 100 according to the present embodiment transmits assistance information that is information for SIC execution to the terminal apparatus 300 that executes SIC. Accordingly, when the terminal apparatus 300 should execute SIC, it can acquire the assistance information at a timing at which SIC will be performed.

It should be understood by those skilled in the art that various modifications, combinations, sub-combinations and alterations may occur depending on design requirements and other factors insofar as they are within the scope of the appended claims or the equivalents thereof.

For example, while a case in which massive-MIMO is applied in the small cell base station 100 has been described in the above embodiment, the present technology is not limited thereto. Massive-MIMO may be applied to any apparatus, for example, the macro cell base station 200, a femto cell base station, the terminal apparatus 300 or a relay node. That is, the macro cell base station 200, the femto cell base station, the terminal apparatus 300 or the relay node has the above-described technical features of the small cell base station 100, and may, for example, form a beam group and notify of the beam group ID.

While a case in which a beam group is defined in massive-MIMO has been described above, the present technology is not limited thereto. For example, the beam group may be defined in any MIMO such as FD-MIMO.

Note that it is not necessary for the processing described in this specification with reference to the flowchart to be executed in the order shown in the flowchart. Some processing steps may be performed in parallel. Further, some of additional steps can be adopted, or some processing steps can be omitted.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) A base station including:
 a communication unit configured to form multiple beams and perform communication with a terminal apparatus; and
 a control unit configured to transmit, to the terminal apparatus, first identification information of a group that is used in communication with the terminal apparatus among the first identification information allocated to groups each of which includes multiple beams to be formed.

(2) The base station according to (1),
 in which the control unit transmits the first identification information by using multiple beams included in the group corresponding to the first identification information.

(3) The base station according to (2),
 in which the control unit transmits, with regard to each candidate for the group, a first synchronization signal including the first identification information of the group by using multiple beams included in the group and transmits, to the terminal apparatus, the first identification information of the group that is used in communication with the terminal apparatus based on an acknowledgment for the first synchronization signal from the terminal apparatus.

(4) The base station according to (3), in which
 one of the first synchronization signal is transmitted to one of partial areas included in a communication target area of the base station, and
 the control unit transmits the first synchronization signal to each of the partial areas included in the communication target area periodically and sequentially over time.

(5) The base station according to (3) or (4),
 in which, when the communication target area of the base station is within a range according to mobility of the terminal apparatus, the control unit transmits the first synchronization signal in the communication target area within the range.

(6) The base station according to (5),
 in which the range according to the mobility of the terminal apparatus corresponds to some small cells among a plurality of small cells included in a macro cell.

(7) The base station according to any one of (3) to (6),
 in which the control unit sets antenna directivity to quasi-omni directivity to receive the acknowledgment.

(8) The base station according to any one of (1) to (7),
 in which, in the first identification information, cyclically shifted sequences are transmitted as sequences that have orthogonality with each other.

(9) The base station according to (8),
 in which the sequences to be transmitted have an amount of cyclic shift that corresponds to the first identification information.

(10) The base station according to (8) or (9),
 in which the sequences to be transmitted have a root sequence that corresponds to position information of the terminal apparatus.

(11) The base station according to any one of (1) to (10),
 in which the control unit transmits downlink data and the first identification information of the group that is used in transmission of the downlink data.

(12) The base station according to (11),
 in which, in one self-contained frame, the control unit performs transmission of the downlink data and the first identification information and reception of an acknowledgment including the first identification information of the group that is used in reception of the downlink data by the terminal apparatus.

(13) The base station according to any one of (1) to (12),
in which the control unit transmits, to the terminal apparatus, second identification information of a beam available for communication with the terminal apparatus among second identification information allocated to beams formed by the terminal apparatus.

(14) The base station according to (13),
in which the control unit transmits, to the terminal apparatus, an acknowledgment including the second identification information of the beam available for communication with the terminal apparatus based on a reception result of a second synchronization signal that includes the second identification information of the beam and that is transmitted by using each of the beams.

(15) The base station according to (14),
in which the control unit selects a beam to be continuously used in communication with the terminal apparatus from among multiple beams included in the group that has been used in communication with the terminal apparatus.

(16) The base station according to (14) or (15),
in which the control unit sets antenna directivity to quasi-omni directivity to receive the second synchronization signal.

(17) The base station according to any one of (1) to (16),
in which the control unit transmits, to the terminal apparatus to be handed over, the first identification information of a candidate for the group that is to be used in communication with another base station of a handover destination based on the group that is used in communication with the terminal apparatus.

(18) The base station according to any one of (1) to (17),
in which the control unit transmits a signal of a user plane in cooperation with a second base station that is different from the base station and that is a handover destination of the terminal apparatus, to the terminal apparatus that is connected to the base station to transmit and receive a signal of the user plane and that is connected to a first base station different from the base station to transmit and receive information of a control plane.

(19) The base station according to any one of (1) to (18),
in which the control unit multiplexes a plurality of the terminal apparatuses on multiple beams included in one of the groups by using non-orthogonal resources and transmits information for executing successive interference cancellation to the terminal apparatus that executes the successive interference cancellation.

(20) A terminal apparatus including:
a communication unit configured to perform communication with a base station that forms multiple beams and performs communication; and
a control unit configured to transmit, to the base station, first identification information of a group available for communication with the base station among the first identification information allocated to groups each of which includes multiple beams to be formed.

(21) The terminal apparatus according to (20),
in which the control unit transmits, to the base station, an acknowledgment including the first identification information of the group available for communication with the base station based on a reception result of a first synchronization signal that includes the first identification information of the group using multiple beams included in the group and that is transmitted with regard to each of the groups.

(22) The terminal apparatus according to (20) or (21),
in which the control unit transmits, to the base station, an acknowledgment including the first identification information of the group that is used in reception of downlink data from the base station.

(23) The terminal apparatus according to any one of (20) to (22), in which
the communication unit includes a directional antenna and an omnidirectional antenna, and
the control unit performs communication with the base station by using the omnidirectional antenna and selectively performs communication with the base station by using the directional antenna.

(24) The terminal apparatus according to (23),
in which the control unit transmits, to the base station, second identification information of a beam that is used in communication with the base station among the second identification information allocated to multiple beams to be formed by the directional antenna.

(25) The terminal apparatus according to (24),
in which the control unit transmits the second identification information by using a beam corresponding to the second identification information.

(26) The terminal apparatus according to (25),
in which the control unit transmits, with regard to each candidate for the beams, a second synchronization signal including the second identification information of the beam by using the beam, and transmits, to the base station, the second identification information of the beam that is used in communication with the base station based on an acknowledgment for the second synchronization signal from the base station.

(27) The terminal apparatus according to any one of (24) to (26),
in which, in the second identification information, cyclically shifted sequences are transmitted as sequences that have orthogonality with each other.

(28) The terminal apparatus according to (27),
in which the sequences to be transmitted have an amount of cyclic shift that corresponds to the second identification information.

(29) The terminal apparatus according to any one of (23) to (28),
in which the control unit performs communication with the base station by using the omnidirectional antenna at least at a time of an initial access procedure and a handover procedure.

(30) The terminal apparatus according to any one of (20) to (29),
in which, when a handover is performed, the control unit continuously performs communication with a handover source by using a self-contained frame and reception of a first synchronization signal from a handover destination.

(31) The terminal apparatus according to any one of (20) to (30),
in which the control unit performs communication with the base station by using non-orthogonal resources and executes successive interference cancellation for removing interference due to a signal addressed to another terminal apparatus that is multiplexed on multiple beams included in the same group based on information received from the base station.

(32) A communication method that is performed by a processor, the communication method including:
forming multiple beams and performing communication with a terminal apparatus; and
transmitting, to the terminal apparatus, first identification information of a group that is used in communication with the terminal apparatus among the first identification information allocated to groups each of which includes multiple beams to be formed.
(33) A communication method that is performed by a processor, the communication method including:
performing communication with a base station that forms multiple beams and performs communication; and
transmitting, to the base station, first identification information of a group available for communication with the base station among the first identification information allocated to groups each of which includes multiple beams to be formed.
(34) A recording medium having a program recorded therein, the program causing a computer to function as:
a communication unit configured to form multiple beams and perform communication with a terminal apparatus; and
a control unit configured to transmit, to the terminal apparatus, first identification information of a group that is used in communication with the terminal apparatus among the first identification information allocated to groups each of which includes multiple beams to be formed.
(35) A recording medium having a program recorded therein, the program causing a computer to function as:
a communication unit configured to perform communication with a base station that forms multiple beams and performs communication; and
a control unit configured to transmit, to the base station, first identification information of a group available for communication with the base station among the first identification information allocated to groups each of which includes multiple beams to be formed.

REFERENCE SIGNS LIST 1 system
100 base station, small cell base station
110 antenna unit
120 radio communication unit
130 network communication unit
140 storage unit
150 control unit
151 information sharing unit
153 communication control unit
200 base station, macro cell base station
210 antenna unit
220 radio communication unit
230 network communication unit
240 storage unit
250 control unit
251 information sharing unit
253 communication control unit
300 terminal apparatus
310 antenna unit
320 radio communication unit
330 storage unit
340 control unit
341 communication control unit
343 processing unit

What is claimed is:

1. A base station comprising:
circuitry comprising a transceiver and a processor, the circuitry being configured to:
transmit a plurality of beams included in a beam group, each beam comprising a synchronization signal for a terminal device to perform a time synchronization with the base station, wherein the one or more beams are included in a beam group and wherein the synchronization signal comprises a time synchronization signal for the time synchronization and a broadcast signal for an initial access procedure,
wherein the plurality of beams are orthogonal to each other,
send, to the terminal device, synchronization information, the synchronization information being for a synchronization in a time domain between the terminal device and the base station and comprising:
timing information regarding the synchronization in the time domain between the terminal device and the base station, and
information regarding the beam group; and
receive, from the terminal device, information indicating a beam identifier of a beam from among the transmitted plural beams in the beam group,
wherein the beam is determined by the terminal device based on a reception quality of the transmitted plural beams included in the beam group.

2. The base station according to the claim 1, wherein the processor is further configured to periodically transmit the plural beams.

3. The base station according to the claim 2, wherein the beam-group specific synchronization signal is used by the terminal device to perform a cell search.

4. The base station according to the claim 2, wherein the processor is further configured to perform cell search by using the beam-group specific synchronization signal.

5. A terminal device comprising:
circuitry comprising a transceiver and a processor, the circuitry being configured to:
receive from a base station, a plurality of beams included in a beam group, plural beams comprising a beam-group specific synchronization signal, each beam comprising a synchronization signal for a terminal device to perform a time synchronization with the base station, wherein the one or more beams are included in a beam group and wherein the synchronization signal comprises a time synchronization signal for the time synchronization and a broadcast signal for an initial access procedure,
wherein the plurality of beams are orthogonal to each other,
receive synchronization information, the synchronization information being for a synchronization in a time domain between the terminal device and the base station and comprising:
timing information regarding the synchronization in the time domain between the terminal device and the base station, and
information regarding the beam group; and
transmit, to the base station, information indicating a beam identifier of a beam from among the transmitted plural beams in the beam group,
wherein the beam is determined by the terminal device based on a reception quality of the transmitted plural beams included in the beam group.

6. The terminal device according to the claim 5, wherein the plural beams are periodically transmitted from the base station.

7. A method for a base station, the method comprising:
transmitting a plurality of beams included in a beam group, each beam comprising a synchronization signal for a terminal device to perform a time synchronization with the base station, wherein the one or more beams are included in a beam group and wherein the synchronization signal comprises a time synchronization signal for the time synchronization and a broadcast signal for an initial access procedure,
wherein the plurality of beams are orthogonal to each other,
sending, to the terminal device, synchronization information, the synchronization information being for a synchronization in a time domain between the terminal device and the base station and comprising:
  timing information regarding the synchronization in the time domain between the terminal device and the base station, and
  information regarding the beam group; and
receiving, from the terminal device, information indicating a beam identifier of a beam from among the transmitted plural beams in the beam group,
wherein the beam is determined by the terminal device based on a reception quality of the transmitted plural beams included in the beam group.

8. A method for a terminal device, the method comprising:
receiving from a base station, a plurality of beams included in a beam group, plural beams comprising a beam-group specific synchronization signal, each beam comprising a synchronization signal for a terminal device to perform a time synchronization with the base station, wherein the one or more beams are included in a beam group and wherein the synchronization signal comprises a time synchronization signal for the time synchronization and a broadcast signal for an initial access procedure,
wherein the plurality of beams are orthogonal to each other,
receiving synchronization information, the synchronization information being for a synchronization in a time domain between the terminal device and the base station and comprising:
  timing information regarding the synchronization in the time domain between the terminal device and the base station, and
  information regarding the beam group; and
transmitting, to the base station, information indicating a beam identifier of a beam from among the transmitted plural beams in the beam group,
wherein the beam is determined by the terminal device based on a reception quality of the transmitted plural beams included in the beam group.

* * * * *